United States Patent
Becker et al.

(10) Patent No.: US 11,987,668 B2
(45) Date of Patent: May 21, 2024

(54) RESORBABLE COMPLEX SHAPE MEMORY POLY(PROPYLENE FUMARATE) STAR SCAFFOLDS FOR 4D PRINTING APPLICATIONS

(71) Applicants: Matthew Becker, Chapel Hill, NC (US); Garrett Fredric Bass, Durham, NC (US)

(72) Inventors: Matthew Becker, Chapel Hill, NC (US); Garrett Fredric Bass, Durham, NC (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 18/005,643

(22) PCT Filed: Jul. 15, 2021

(86) PCT No.: PCT/US2021/041837
§ 371 (c)(1),
(2) Date: Jan. 16, 2023

(87) PCT Pub. No.: WO2022/015989
PCT Pub. Date: Jan. 22, 2022

(65) Prior Publication Data
US 2023/0272159 A1 Aug. 31, 2023

Related U.S. Application Data

(60) Provisional application No. 63/052,168, filed on Jul. 15, 2020.

(51) Int. Cl.
*C08G 63/83* (2006.01)

(52) U.S. Cl.
CPC .................. *C08G 63/83* (2013.01)

(58) Field of Classification Search
CPC ....... C08G 63/52; C08G 63/83; C08G 63/918
See application file for complete search history.

(56) References Cited

U.S. PATENT DOCUMENTS 6,355,755 B1 * 3/2002 Peter .................. A61L 24/0084
526/320
2019/0359766 A1 * 11/2019 Becker ............... C08G 63/6858

FOREIGN PATENT DOCUMENTS

WO 2020014699 A1 1/2020
WO 2020055816 A1 3/2020

OTHER PUBLICATIONS

Shigenobu Takenouchi et al "Effects of Geometrical Difference of Unsaturated Aliphatic Polyesters on Their Biodegradability II. Isomerization of Poly(maleic anhydride-co-propylene oxide) in the Presence of Morpholine", Polymer Journal, vol. 34, No. 1, pp. 36-42 (2002). (Year: 2002).*
Hai-Mu Ye et al "Isomorphism in Poly(butylene succinate-co-butylene fumarate) and Its Application as Polymeric Nucleating Agent for Poly(butylene succinate)", Macromolecules 2012, 45, 5667-5675. (Year: 2012).*
Angela M. DiCiccio et al "Ring-Opening Copolymerization of Maleic Anhydride with Epoxides: A Chain-Growth Approach to Unsaturated Polyesters", J. Am. Chem. Soc. 2011, 133, 10724-10727 (Year: 2011).*
Marchand, A. P.; Reddy, G. M. "Mild and highly selective ultrasound promoted zinc/acetic acid reduction of C=C bonds in a,β-unsaturated γ-dicarbonyl compounds." Synthesis Sep. 17, 2002 (Sep. 17, 2002), vol. 1991, pp. 198-200.
Wilson, J. A.; Luong, D.; Kleinfehn, A. P.; Sallam, S.; Wesdemiotis, C.; Becker, M. L. "Magnesium Catalyzed Polymerization of End Functionalized Poly(propylene maleate) and Poly(propylene fumarate) for 3D Printing of Bioactive Scaffolds." J. Am. Chem. Soc. 2018, 140, 277-284.
Kolb et al. "Preparation of succinct acid from maleic anhydride: A simple organic laboratory reduction", Journal of Chemical Education, vol. 51. p. 345.
Shin et al. "Alternating ring-opening copolymerization of epoxides with saturated and unsaturated cyclic anhydrides: reduced viscosity poly(propylene fumarate) oligomers for use in cDLP 30 printing", Polymer Chemistry, Apr. 21, 2020 (Apr. 21, 2020). vol. 11, pp. 3313-3321.
ISR for application PCT/US21/41637 dated Oct. 29, 2021.
Written Opinion for ISR for application PCT/US21/41637 dated Oct. 29, 2021.

* cited by examiner

*Primary Examiner* — Frances Tischler
*Assistant Examiner* — Gennadiy Mesh
(74) *Attorney, Agent, or Firm* — Renner, Kenner, Greive, Bobak, Taylor & Weber Co. LPA

(57) ABSTRACT

In one or more embodiments, the present invention provides am method of making a poly(propylene fumarate-co-succinate) (PPFS) copolymer containing a random incorporation of succinate groups and targetable reduction profiles without the need for three or more monomer units. To achieve this, a time-dependent sonication-promoted zinc/acetic acid reduction of the PPM unsaturated double bonds has been used to create a random PPMS copolymer which may be isomerized into the PPFS equivalent. By changing the sonication time as well as the ratios of acetic acid, zinc, and PPM unsaturated alkenes, partial reduction of the PPM alkenes has been shown to give PPMS products containing varying compositions of succinic and maleate units, which may then be isomerized to the PPFS product.

12 Claims, 30 Drawing Sheets

RESORBABLE COMPLEX SHAPE MEMORY POLY(PROPYLENE FUMARATE) STAR SCAFFOLDS FOR 4D PRINTING APPLICATIONS

CROSS REFERENCE TO RELATED APPLICATIONS

This application claims the benefit of International Application No: PCT/US2021/041837 entitled "Synthesis of Poly (Propylene Maleate-co-Succinate) by the Time-Dependent Reduction of Poly(Propylene Maleate) Double Bonds Mediated by Zinc and Acetic Acid," filed Jul. 15, 2021 which claims the benefit of U.S. provisional patent application Ser. No. 63/052,168 entitled "Synthesis of Poly(Propylene Maleate-co-Succinate) by the Time-Dependent Reduction of Poly(Propylene Maleate) Double Bonds Mediated by Zinc and Acetic Acid," filed Jul. 15, 2020, and incorporated herein by reference in its entirety.

STATEMENT REGARDING FEDERALLY SPONSORED RESEARCH OR DEVELOPMENT SUPPORT

This invention was made with government support under grant number CBET 1510612 awarded by the National Science Foundation. The government has certain rights in the invention.

NAMES OF THE PARTIES TO A JOINT RESEARCH AGREEMENT

The present application stems from work done pursuant to a Joint Research Agreement between The University of Akron of Akron, Ohio and 3D Bioactives of Akron, Ohio.

FIELD OF THE INVENTION

One or more embodiments of the present invention relates to 3D printable polymers and polymer resins. In certain embodiments, the present invention relates to production of 3D printable poly(propylene maleate-co-succinate) and poly (propylene fumarate-co-succinate) polymers.

BACKGROUND OF THE INVENTION

Stereolithography techniques such as continuous digital light processing (cDLP) and continuous liquid inter-face printing (CLIP) use ultraviolet (UV) or visible light as a photo-polymerization trigger for crosslinking and network formation between reactive oligomers. As such, they offer improved resolution over other 3D-printing modalities, affording the fabrication of complex geometries and architectures that can mimic the complex hierarchical nature of biological tissue. To benefit from the resolution capabilities of cDLP methods, formulated resins must maintain low viscosities (typically <2-10 Pa·s) to prevent defect formation and delamination from the build plates which arise from capillary forces as the structures are withdrawn from the resin vats. Printable viscosity regimes in most resin formulations are typically achieved using a reactive diluent or non-reactive solvent which dilutes the polymer mass fraction and significantly affects the properties of the printed networks. Moreover, a key goal in resin formulations, and biomaterials in general, is the minimization of additives or byproducts which may cause negative host reactions without affecting the materials ability to be fabricated in a scalable, reproducible, and feasible way. By reducing the viscosity of the polymer itself, fewer diluents, whether reactive or unreactive, may be required, ultimately providing a reduction in both cost of material fabrication and potential residual chemical agents that may cause a negative host response and lead to downstream regulatory problems.

Many polymers can be 3D printed photochemically. However, very few of these are degradable and even fewer are resorbable. Poly(propylene fumarate) (PPF) oligomers have been explored widely for 3D printed implants and patient specific devices due to its degradation into non-toxic byproducts. However, PPF solidifies above 3500 Da and reaching printable viscosities with PPF-based resins historically requires dilution with ~50 wt. % diethyl fumarate (DEF). While necessary, DEF is incorporated into the network during the printing process. Residual DEF can lead to toxicity concerns over leaching unreacted monomer but more importantly, the incorporation of DEF in the crosslinked network results in materials with a narrow range of mechanical properties. In addition, the amount of non-degradable carbon-carbon bond formation within the printed structure is significant. Thus, the amount of DEF required to print must be reduced or eliminated if devices and structures 3D printed from these materials are to be fully resorbable and advanced beyond academic curiosity and toward real clinical applications.

Recent synthetic advances for PPF have included the metal-mediated ring-opening copolymerization (ROCOP) of maleic anhydride (MA) and propylene oxide (PO) which yields poly(propylene maleate) (PPM) followed by isomerization to PPF. (See, e.g., Hua, Z.; Qi, G.; Chen, S., Ring-opening copolymerization of maleic anhydride with propylene oxide by double-metal cyanide. *J. App. Polym. Sci.* 2004, 93 (4), 1788-1792; DiCiccio, A. M.; Coates, G. W., Ring-Opening Copolymerization of Maleic Anhydride with Epoxides: A Chain-Growth Approach to Unsaturated Polyesters. *J. Am. Chem. Soc.* 2011, 133 (28), 10724-10727; Wilson, J. A.; Luong, D.; Kleinfehn, A. P.; Sallam, S.; Wesdemiotis, C.; Becker, M. L., Magnesium Catalyzed Polymerization of End Functionalized Poly(propylene maleate) and Poly(propylene fumarate) for 3D Printing of Bioactive Scaffolds. *J. Am. Chem. Soc.* 2018, 140 (1), 277-284, the disclosures of which are incorporated herein by reference in their entirety. However, while the results have shown the materials promise towards patient-specific, implantable biomaterials, there is the potential to modify the resin itself to achieve more desirable properties. Shin et al. recently reported the incorporation of a succinic anhydride (SA) comonomer to disrupt polymer chain interactions and increase backbone flexibility and mobility, resulting in lower polymer viscosities and DEF requirements. See, Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosure of which in incorporated herein by reference in its entirety. Accordingly, to reduce the viscosity of the PPF resin itself, propylene oxide has been copolymerized with maleic anhydride (MA) and succinic anhydride (SA) to afford poly(propylene maleate-co-succinate) (PPMS). Subsequent isomerization yields a poly(propylene fumarate-co-succinate) (PPFS) polymer, allowing for more desirable printing properties. However, reactivity ratio differences between MA and SA have resulted in a gradient compositional sequence within the poly(propylene fumarate-co-propylene succinate (PPFPS) copolymer backbone. While incorporation of the SA repeat unit in this compositional gradient resulted in a lower viscosity, it is believed that a random copolymer would result in further reduction of the viscosity. Being that the gradient nature of the PPFPS copolymer is intrinsic to the anhydride reactivity differences, a post-polymerization modification of PPM to poly(propylene maleate-co-propylene succinate) (PPMPS) followed by isomerization could offer a route to a truly random PPFPS copolymer.

While numerous reduction strategies for small-molecule conjugated alkenes have been reported, these transformations typically use transition metal catalysts such as Pd, Pt, and Ru, which bring toxicity concerns and high costs. Additionally, these systems often require detailed catalyst preparation, complex experimental procedures (i.e., pressurized $H_2$, electrolytic apparatuses), or additives (i.e., polysiloxanes, $Bu_4NBF_4$) that can be difficult to remove. Thus, an ideal post-polymerization reduction of PPM that could be performed at commercial scale should be low-cost, procedurally simple, and avoid the use of toxic transition metals.

Modifications of the Clemmensen reduction have used Zn/Acetic acid (AcOH) to reduce aryl carbonyls, nitroaromatics, disulfide cross-linked polymers, and conjugated alkenes. While the yields of the conjugated alkene reduction are typically high (ca. 70-85%), they often require harsh conditions (e.g. refluxing AcOH for extended periods of time), making it undesirable in degradable polyesters where chain scission via hydrolysis would render the material useless. More recently Marchand and Reddy showed that room-temperature sonication promotes the reduction in minutes. See, Marchand, A. P.; Reddy, G. M., Mild and Highly Selective Ultrasound-Promoted Zinc/Acetic Acid Reduction of C=C Bonds in α,β-Unsaturated γ-Dicarbonyl Compounds. *Synthesis* 1991, 1991 (03), 198-200, the disclosure of which in incorporated herein by reference in its entirety.

Accordingly, what is needed in the art is an inexpensive and rapid way of a PPFS copolymer containing random incorporation of succinate groups and targetable reduction profiles without the need for three or more monomer units, and that requires no modifications from the established synthesis of traditional PPF resins.

SUMMARY OF THE INVENTION

In one or more embodiments, the present invention provides an inexpensive and rapid way of producing a poly (propylene fumarate-co-succinate) copolymer (PPFS) (also referred to herein as poly(propylene fumarate-co-propylene succinate (PPFPS) copolymers) containing random incorporation of succinate groups and targetable reduction profiles without the need for three or more monomer units and requires no modifications from the established synthesis of traditional PPF resins. Only a quick and inexpensive additional step is required after the PPF is formed or between the polymerization and isomerization steps to form the PPFS. Based on the work discussed above, a PPFS copolymer containing random incorporation of succinate groups may offer a greater benefit towards 3D-printing applications than the previously mentioned copolymerization methods. To achieve this, a time-dependent sonication-promoted zinc/acetic acid reduction of the PPM unsaturated double bonds has been used to create a random PPMS copolymer which may be isomerized into the PPFS equivalent. By changing the sonication time as well as the ratios of acetic acid, zinc, and PPM unsaturated alkenes, partial reduction of the PPM alkenes has been shown to give PPMS products containing varying compositions of succinic and maleate units, which may then be isomerized to the PPFS product. A full reduction of the unsaturated alkene bonds in PPM or PPF, however, will form poly(propylene succinate) (PPS) rather than PPMS or PPFS. Moreover, since the use of alkene-based cross-linking systems is very prevalent in a variety of material engineering fields, this method may be widely applicable towards other resins and systems.

In addition, the time dependent reduction methods of the present invention address many of the drawbacks of known methods of producing PPMS and PPFS using a feed of 3 monomers (maleic anhydride, propylene oxide, and succinic anhydride). Among other things, the methods of the present invention completely avoid the need for a 3-monomer feed for easier synthesis and by doing so, eliminates the reactivity differences that cause formation of gradient polymers. These reactions are also faster and have lower energy costs since they use only the faster kinetics of maleic anhydride rather than a mix of anhydride and the less reactive succinic anhydride. Moreover, the properties of the PPFS polymers formed using the time dependent reduction methods of the present invention display molar extinction coefficients that are more consistent with traditional PPF, and have low absorbance in the ~400 nm wavelength regime where most printers emit. Moreover, since the use of alkene-based cross-linking systems is very prevalent in a variety of material engineering fields, this method may be widely applicable towards other resins and systems.

In short, it has been found that a zinc/acetic acid mediated Clemmensen reduction coupled with sonication affords a time dependent regio-random reduction of degradable poly (propylene maleate) oligomers to poly(propylene fumarate-co-propylene succinate) co-polymers. Characterization by $^1H$ and $^{13}C$ NMR spectroscopy, size exclusion chromatography, UV-vis spectroscopy, differential scanning calorimetry, and rheology demonstrates that the solvent used for the reduction can be tuned to afford copolymers with random succinate content not previously accessible without chain scission. These copolymers show lower molar extinction coefficients and reduced viscosities compared to previous unsaturated analogues. Together these features afford faster and improved 3D-printability using stereolithographic conditions. The variation in network properties, succinate stoichiometry, and polymer mass fraction allow the mechanical properties of the photochemically printed structures to be tuned widely.

In a first aspect, the present invention is directed to a method for making poly(propylene fumarate-co-succinate) polymer comprising the time-dependent partial reduction of poly(propylene maleate) double bonds by sonication mediated by zinc and acetic acid to form a poly(propylene maleate-co-succinate) intermediate, followed by isomerization of the poly(propylene maleate-co-succinate) intermediate using an organic base to produce the poly(propylene fumarate-co-succinate) polymer. In one or more embodiment, the method comprises: obtaining or synthesizing poly(propylene maleate) and dissolving it in acetic acid or a solvent combination comprising acetic acid; adding zinc to the poly(propylene maleate) solution; sonicating the combination to reduce at least some of the maleate groups in the poly(propylene maleate) to succinate groups to form a poly(propylene maleate-co-succinate) intermediate; dissolving the poly(propylene maleate-co-succinate) intermediate in a suitable solvent and isomerizing it with an organic base to produce a poly(propylene fumarate-co-succinate) polymer. In some embodiments, the acetic acid is glacial acetic acid. In some embodiments, the solvent combination comprising acetic acid comprises glacial acetic acid and a solvent selected from the group consisting of dichloromethane, chloroform, toluene, and combinations thereof. In some of these embodiments, the solvent combination comprising acetic acid is a co-solvent solution of glacial acetic acid and one of dichloromethane, chloroform, or both dichloromethane and chloroform. In some embodiments, the solvent combination comprising acetic acid is a co-solvent solution of glacial acetic acid and toluene.

In one or more embodiments, the method of the present invention includes any one or more of the above referenced embodiments of the first aspect of the present invention wherein the step of combining comprises adding an amount of zinc that is from about 0.5 to about 5.0 equivalents relative to the alkene bonds in the PPM polymer. In one or more embodiments, the method of the present invention includes any one or more of the above referenced embodiments of the first aspect of the present invention wherein the step of adding zinc comprises adding an amount of zinc that is from about 0.5 to about 3.0 equivalents relative to the alkene bonds in the PPM polymer.

In one or more embodiments, the method of the present invention includes any one or more of the above referenced embodiments of the first aspect of the present invention wherein the step of sonication comprises sonicating the combination for from about 1 to about 60 minutes. In one or more embodiments, the method of the present invention includes any one or more of the above referenced embodiments of the first aspect of the present invention wherein the step of sonication comprises sonicating the combination until a desired mole percent of succinate groups is present in the poly(propylene maleate-co-succinate) polymer produced.

In one or more embodiments, the method of the present invention includes any one or more of the above referenced embodiments of the first aspect of the present invention wherein the suitable solvent in the step of dissolving is an organic solvent. In one or more embodiments, the method of the present invention includes any one or more of the above referenced embodiments of the first aspect of the present invention wherein the suitable solvent in the step of dissolving is selected from the group consisting of chloroform, dichloromethane, and combinations thereof. In one or more embodiments, the method of the present invention includes any one or more of the above referenced embodiments of the first aspect of the present invention wherein the organic base is selected from the group consisting of diethylamine, trimethylamine, pyridine, and combinations thereof.

In a second aspect, the present invention is directed to a method for making poly(propylene fumarate-co-succinate) polymer comprising the time-dependent partial reduction of poly(propylene fumarate) double bonds by sonication mediated by zinc and acetic acid. In one or more embodiment, the comprises: obtaining or synthesizing poly(propylene fumarate), dissolving it in acetic acid or a solvent combination comprising acetic acid, and adding zinc; and sonicating the poly(propylene fumarate) solution to reduce at least some of the fumarate groups in the poly(propylene fumarate) to succinate groups to form the poly(propylene fumarate-co-succinate) polymer.

In one or more embodiments, the method of the present invention includes any one or more of the above referenced embodiments of the second aspect of the present invention wherein the solvent combination comprising acetic acid is a co-solvent solution of glacial acetic acid and one of dichloromethane, chloroform, and both dichloromethane and chloroform. In one or more embodiments, the method of the present invention includes any one or more of the above referenced embodiments of the first aspect of the present invention wherein the suitable solvent is a co-solvent solution of glacial acetic acid and toluene.

In one or more embodiments, the method of the present invention includes any one or more of the above referenced embodiments of the first aspect of the present invention wherein the step of sonication comprises sonicating the solution for from about 1 to about 60 minutes. In one or more embodiments, the method of the present invention includes any one or more of the above referenced embodiments of the first aspect of the present invention wherein the step of sonication comprises sonicating the solution until a desired mole percent of succinate groups is present in the poly(propylene fumarate-co-succinate) polymer produced.

In one or more embodiments, the method of the present invention includes any one or more of the above referenced embodiments of the first aspect of the present invention wherein the step of adding comprises adding an amount zinc that is from about 0.5 to about 5.0 equivalents relative to the alkene bonds in the PPF polymer. In one or more embodiments, the method of the present invention includes any one or more of the above referenced embodiments of the first aspect of the present invention wherein the step of adding comprises adding an amount zinc that is from about 0.5 to about 3.0 equivalents relative to the alkene bonds in the PPF polymer.

In a third aspect, the present invention is directed to a poly(propylene fumarate-co-succinate) polymer made according to the methods described above. In one or more of these embodiments, the poly(propylene fumarate-co-succinate) polymer will have a reduced viscosity and/or a reduced molar extinction coefficient when compared to a poly(propylene fumarate-co-succinate) polymer of comparable size and succinate content formed by the ring opening copolymerization of propylene oxide, maleic anhydride, and succinic anhydride.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
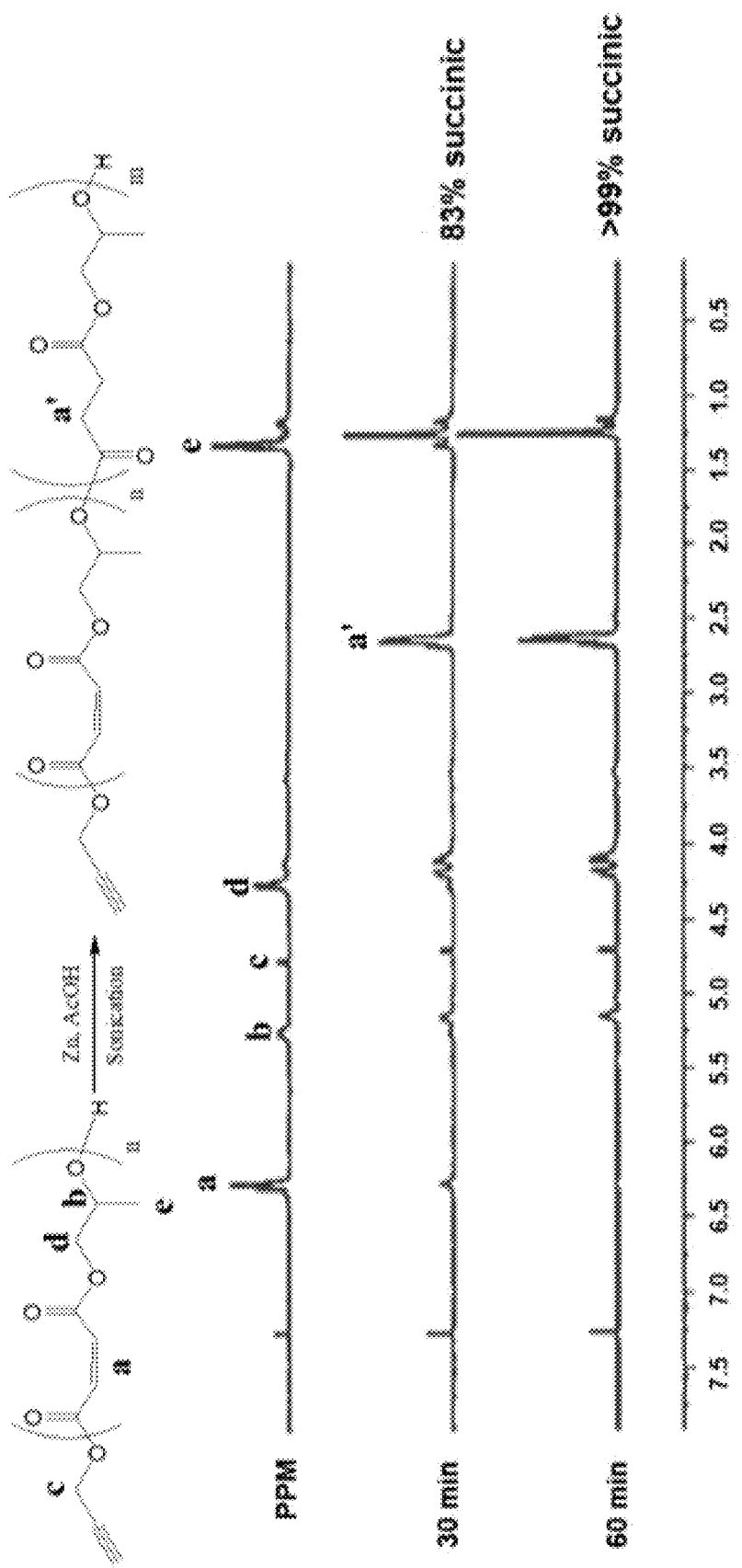
FIG. 1 is an annotated comparison of $^1$H NMR for poly(propylene maleate) (PPM) before sonication and after 30 min and 60 min of sonication showing reduction some of the maleate groups to succinate groups to form PPMS.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

In various embodiments, the present invention is directed to a provide an inexpensive and rapid way of a PPFS copolymer containing random incorporation of succinate groups and targetable reduction profiles without the need for three or more monomer units, and requires no modifications from the established synthesis of traditional PPF resins. To achieve this, a time-dependent sonication-promoted zinc/acetic acid reduction of the PPM unsaturated double bonds has been used to create a random PPMS copolymer which may be isomerized into the PPFS equivalent. By changing the sonication time as well as the ratios of acetic acid, zinc, and PPM unsaturated alkenes, partial reduction of the PPM alkenes has been shown to give PPMS products containing varying compositions of succinic and maleate units, which may then be isomerized to the PPFS product. Similarly, in some other embodiments, the time-dependent sonication-promoted zinc/acetic acid reduction of the PPF unsaturated double bonds has been used to create a random PPFS copolymer directly. In either these embodiments, care should be taken not to fully reduce the unsaturated alkene bonds in PPM or PPF, to avoid forming poly(propylene succinate) (PPS) rather than PPMS or PPFS.

As set forth above, the time dependent reduction methods of the present invention address many of the drawbacks of known methods of producing PPMS and PPFS using a feed of 3 monomers (maleic anhydride, propylene oxide, and succinic anhydride). Among other things, the methods of the present invention completely avoid the need for a 3-monomer feed for easier synthesis and by doing so, eliminates the reactivity differences that cause formation of gradient polymers as can be seen in Scheme 1, below.

Scheme 1

Prior Art

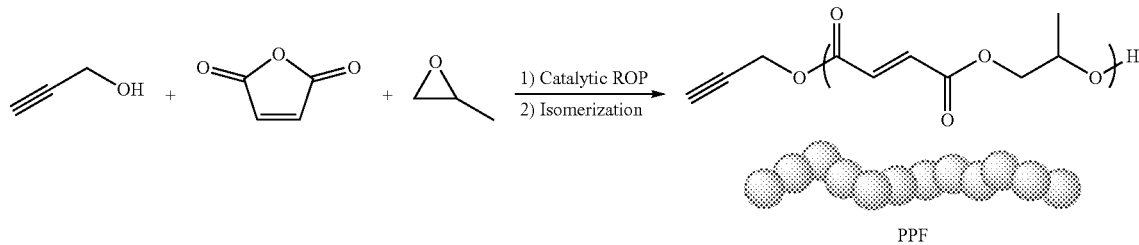

PPF

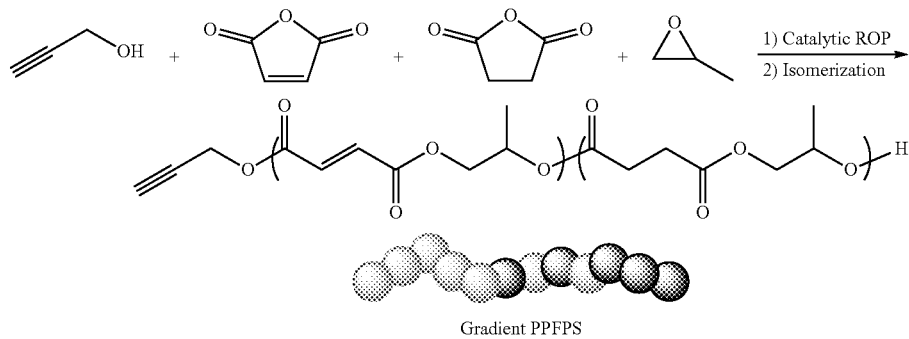

Gradient PPFPS

This Work

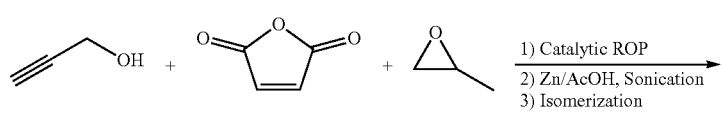

-continued

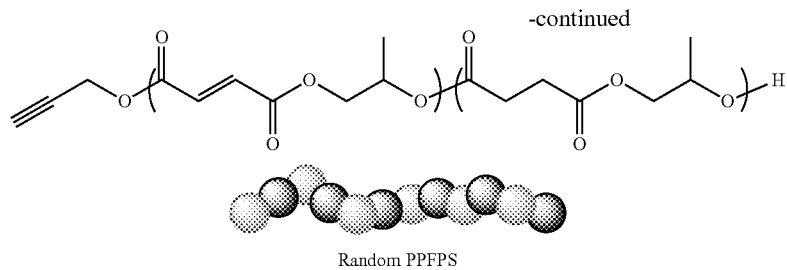

Random PPFPS

Scheme 1 shows synthesis of poly(propylene fumarate) (top) and poly(propylene maleate-co-propylene succinate) (middle) prepared by the one-pot method of Shin et al. (See, Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. Polym. Chem. 2020, 11 (19), 3313-3321, the disclosure of which in incorporated herein by reference in its entirety.) The bottom reaction shows the post-polymerization reduction method according to various embodiments of the present invention.

It is believed that this work demonstrates the first degradable polyester alkene reduction using a sonication-promoted Zn/AcOH system. The synthesis of PPMPS copolymers with varying succinate content was performed with subsequent isomerization to PPFPS. The kinetics and regioselectivity of the reduction in various solvents were assessed by proton nuclear magnetic resonance ($^1$H NMR) spectroscopy. Size exclusion chromatography (SEC) and $^1$H NMR spectroscopy confirm the absence of chain-scission events, and the PPFPS copolymers exhibit lower viscosities and molar extinction coefficients compared to the one-pot gradient PPFPS synthesis described by Shin et al., affording printability at higher polymer mass fraction (lower DEF content).

Further, these reactions are also faster and have lower energy costs since they use only the faster kinetics of maleic anhydride rather than a mix of anhydride and the less reactive succinic anhydride. Moreover, the properties of the PPFS polymers formed using the time dependent reduction methods of the present invention display molar extinction coefficients that are more consistent with traditional PPF and have low absorbance in the ~400 nm wavelength regime where most printers emit. Moreover, since the use of alkene-based cross-linking systems is very prevalent in a variety of material engineering fields, this method may be widely applicable towards other resins and systems.

The following terms may have meanings ascribed to them below, unless specified otherwise. As used herein, the terms "comprising" "to comprise" and the like do not exclude the presence of further elements or steps in addition to those listed in a claim. Similarly, the terms "a," "an" or "the" before an element or feature does not exclude the presence of a plurality of these elements or features, unless the context clearly dictates otherwise. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein. in the specification and the claim can be modified by the tern "about."

It should be also understood that the ranges provided herein are a shorthand for all of the values within the range and, further, that the individual range values presented herein can be combined to form additional non-disclosed ranges. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

All publications, patent applications, patents, and other references mentioned herein are expressly incorporated herein by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

Further, any compositions or methods provided herein can be combined with one or more of any of the other compositions and methods provided herein. The fact that given features, elements or components are cited in different dependent claims does not exclude that at least some of these features, elements or components maybe used in combination together.

In a first aspect, the present invention is directed to a 3D printable random poly(propylene fumarate-co-succinate) (abbreviated herein as PPFS or PPFPS) copolymer prepared by the partial reduction of the alkene bonds in a PPF polymer or in a PPM polymer, followed by isomerization to form the PPFS copolymer.

As set forth above, in various embodiments, the PPFS copolymers of the present invention have a lower succinate gradient and better properties that similar prior art PPFS copolymers prepared by ring opening co-polymerization of polypropylene, maleic anhydride and succinic anhydride, as set forth in Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. Polym. Chem. 2020, 11 (19), 3313-3321, the disclosure of which in incorporated herein by reference in its entirety) and illustrated in Scheme 1 above. Similarly, the PPFS copolymers of the present invention have a reduced viscosity when compared to a poly(propylene fumarate-co-succinate) polymer of comparable size and succinate content formed by the ring opening copolymerization methods of Shin et al. In various embodiments, the PPFS copolymers of the present invention also have a reduced molar extinction coefficient when compared to a poly(propylene fumarate-co-succinate) polymer of comparable size and succinate content formed by the ring opening copolymerization of Shin et al., allowing for better light penetration and affording faster and improved 3D-printability. For purposes of comparison, a "similar prior art PPFS copolymer(s)" refers to prior art PPFS polymer(s)

having a similar size and succinate content (mole %) as a PPFS polymer according to the present invention to which it is being compared. Similarly, a PPFS polymer having a "similar size and succinate content" to a particular PPFS polymer of the present invention will have a number average molecular weight ($M_n$) and succinate content (mole %) that are the same as the particular PPFS polymer of present invention to which it is being compared, within a range of normal tolerance in the art. In some embodiments, the normal tolerance in the art would be within 2 standard deviations of the mean. In some embodiments, the normal tolerance in the art for $M_n$ and succinate content would be within 10% of the $M_n$ and succinate content of the copolymer.

As used herein, the terms "isomerize" and "isomerization" refer broadly to the conversion of the cis-isomer (PPM) to its trans-isomer (PPF) form or, in the context of a chemical reaction or process (an "isomerization reaction") to a reaction or process that converts the cis-isomer (PPM) or (PPMS) to its trans-isomer (PPF) or (PPFS) form. In some embodiments, the PPFS copolymer of the present invention will comprise from about 1 to about 30 mole percent, preferably from about 1 to about 20 mole percent, and more preferably from about 1 to about 10 mole percent succinic anhydride groups. In some embodiments, the copolymer composition of the present invention will comprise from about 1 to about 25 mole percent, in other embodiments, from about 1 to about 15 mole percent, in other embodiments, from about 1 to about 5 mole percent, in other embodiments, from about 5 to about 30 mole percent, in other embodiments, from about 10 to about 30 mole percent, in other embodiments, from about 15 to about 30 mole percent, in other embodiments, from about 20 to about 30 mole percent, and in other embodiments, from about 25 to about 30 mole percent succinic anhydride groups. Here, as well as elsewhere in the specification and claims, individual range values can be combined to form additional non-disclosed ranges. As will be apparent, about 50 mole percent of these copolymers will comprise propylene oxide residues or functionalized variants (i.e., hydroxylated or chlorinated propylene oxide residues), with the balance being isomerized residues of maleic anhydride and residues of initiating alcohols used to form the initial PPM or PPF copolymer.

In one or more embodiments, the PPFS copolymer composition of the present invention will have a number average molecular weight ($M_n$) of from about 0.5 kDa to about 100 kDa, preferably from about 0.5 kDa to about 50 kDa, and more preferably from about 0.5 kDa to about 5 kDa, as measured by size exclusion chromatography (SEC) or MALDI mass spectrometry or gel permeation chromatography (GPC). In some embodiments, the (PPFS) copolymer composition of the present invention will have a number average molecular weight ($M_n$) of from about 1 kDa to about 100 kDa, in other embodiments, from about 1 kDa to about 75 kDa, in other embodiments, from about 1 kDa to about 50 kDa, in other embodiments, from about 1 kDa to about 25 kDa, in other embodiments, from about 1 kDa to about 15 kDa, in other embodiments, from about 10 kDa to about 100 kDa, in other embodiments, from about 40 kDa to about 100 kDa, and in other embodiments, from about 60 kDa to about 100 kDa as measured by size exclusion chromatography (SEC) or MALDI mass spectrometry or gel permeation chromatography (GPC). In some embodiments, the (PPFS) copolymer composition of the present invention will have a number average molecular weight ($M_n$) of from about 0.5 kDa to about 10 kDa, as measured by size exclusion chromatography (SEC), MALDI mass spectrometry or gel permeation chromatography (GPC). Here, as well as elsewhere in the specification and claims, individual range values can be combined to form additional non-disclosed ranges.

In one or more of these embodiments, the (PPFS) copolymer composition of the present invention will have a mass distribution ($Đ_m$) of from about 1 to about 2, preferably from about 1 to about 1.5, and more preferably from about 1 to about 1.2. In some embodiments, the (PPFS) copolymer composition of the present invention will have a mass distribution ($Đ_m$) of from about 1 to about 2, in other embodiments, from about 1.0 to about 1.8, in other embodiments, from about 1.0 to about 1.6, in other embodiments, from about 1.0 to about 1.4, in other embodiments, from about 1.0 to about 1.2, in other embodiments, from about 1.1 to about 2.0, in other embodiments, from about 1.3 to about 2.0, in other embodiments, from about 1.5 to about 2.0, in other embodiments, from about 1.7 to about 2.0, and in other embodiments, from about 1.9 to about 2.0. Here, as well as elsewhere in the specification and claims, individual range values can be combined to form additional non-disclosed ranges In one or more embodiments, the (PPFS) copolymer composition of the present invention will have a zero shear viscosity of from about 500 Pa·s to about 10,000 Pa·s, preferably from about 1,000 Pa·s to about 7,000 Pa·s, and more preferably from about 1,000 Pa·s to about 5,000 Pa·s, as measured by a rheometer. In some embodiments, the (PPFS) copolymer composition of the present invention will have a zero shear viscosity of from about 500 Pa·s to about 9,000 Pa·s, in other embodiments, from about 500 Pa·s to about 7,000 Pa·s, in other embodiments, from about 500 Pa·s to about 5,000 Pa·s, in other embodiments, from about 500 Pa·s to about 3,000 Pa·s, in other embodiments, from about 1000 Pa·s to about 10,000 Pa·s, in other embodiments, from about 3,000 Pa·s to about 10,000 Pa·s, in other embodiments, from about 6,000 Pa·s to about 10,000 Pa·s, and in other embodiments, from about 8,000 Pa·s to about 10,000 Pa·s, as measured by a rheometer. Here, as well as elsewhere in the specification and claims, individual range values can be combined to form additional non-disclosed ranges In one or more embodiments, the PPFS copolymer of the present invention is a random copolymer having the formula:

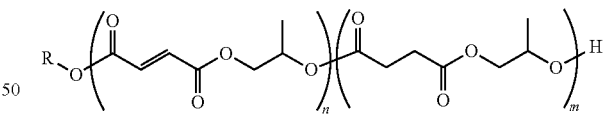

where R is the residue of the acid or alcohol initiator used to form the PPM or PPF polymer, n is the mole fraction of fumarate residues, and m is the mole fraction. As will be understood by those of ordinary skill in the art, R may be the residue of any one of a wide variety of acid or alcohol initiators that may be used to initiate this reaction. One of ordinary skill in the art will be able to select a suitable acid or alcohol initiator without undue experimentation. In various embodiments, R may be the residue of propargyl alcohol, benzyl alcohol, or meso-erythritol, among others. In one or more embodiments, R is an alkyl, alkene, alkyne or aromatic group. In some embodiments, R may be a functional group selected from the group consisting of alkyne groups, propargyl groups, allyl groups, alkene groups, 4-dibenzocyclooctyne groups, cyclooctyne groups, ketone groups, aldehyde groups, maleic acid, and combinations thereof. In some embodiments R may be a benzyl group. In some other embodiments R may be a propargyl group.

In some embodiments, n may be a mole fraction from about 0.50 to about 0.95, in other embodiments, from about 0.50 to about 0.85, in other embodiments, from about 0.50 to about 0.75, in other embodiments, from about 0.50 to about 0.65, in other embodiments, from about 0.50 to about 0.55, in other embodiments, from about 0.60 to about 0.99, in other embodiments, from about 0.70 to about 0.99, in other embodiments, from about 0.80 to about 0.99, in other embodiments, from about 0.90 to about 0.99, and in other embodiments, from about 0.95 to about 0.99. In some embodiments, m may be a mole fraction from about 0.01 to about 0.50, in other embodiments, from about 0.01 to about 0.40, in other embodiments, from about 0.01 to about 0.30, in other embodiments, from about 0.01 to about 0.20, in other embodiments, from about 0.01 to about 0.10, in other embodiments, from about 0.01 to about 0.05, in other embodiments, from about 0.05 to about 0.50, in other embodiments, from about 0.10 to about 0.50, in other embodiments, from about 0.15 to about 0.50, in other embodiments, from about 0.25 to about 0.50, in other embodiments, from about 0.35 to about 0.50, and in other embodiments, from about 0.45 to about 0.50. Here, as well as elsewhere in the specification and claims, individual range values can be combined to form additional non-disclosed ranges. In some embodiments, n is a mole fraction from about 0.50 to about 0.99 and m is a mole fraction from about 0.01 to about 0.50. Here, as well as elsewhere in the specification and claims, individual range values can be combined to form additional non-disclosed ranges.

In one or more embodiments, the PPFS copolymer of the present invention is a random copolymer having the formula:

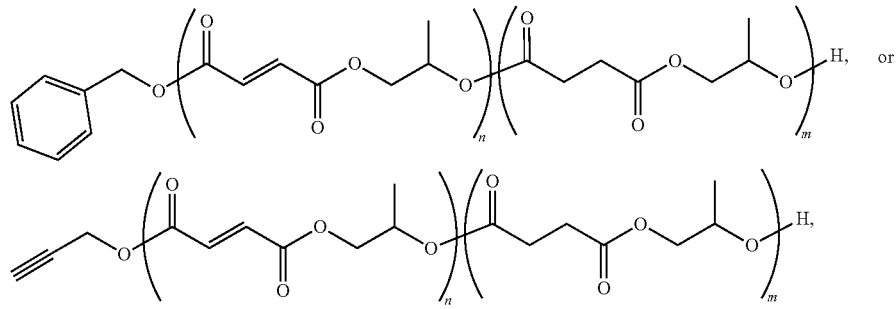

where n and m are as described above.

In a second aspect, the present invention is directed to a method for making the PPFS copolymers described above. In general outline, these methods are directed to formation of a PPF copolymer followed by the post-polymerization reduction of the unsaturated alkene bonds in the PPF to form the PPFS copolymer (See FIG. 1) or, alternatively, formation of a PPM copolymer followed by the post-polymerization reduction of the unsaturated alkene bonds in the PPM to form the PPMS copolymer, which is then isomerized to form the PPFS copolymer of the present invention. As will be apparent, the partial reduction step is not dependent upon the cis/trans configuration of the unsaturated alkene bonds and, as a result, the isomerization of the unsaturated alkene bonds from the cis isomer to the trans isomer can happen either before or after the partial reduction unsaturated alkene bonds.

In one or more embodiments, the method begins by the formation of a suitable PPM or PPF polymer, preferably by the ring opening copolymerization of propylene oxide and maleic anhydride, as is known in the art. U.S. Pat. No. 10,465,044, International Application Publication No. WO 2018/142384, or International Application Publication No. WO 2018/144849, the disclosures of which are incorporated herein by reference in their entirety.

In various embodiments, the PPM polymer placed in a suitable reaction vessel and dissolved in acetic acid or a solvent combination containing acetic acid. While other forms of acetic acid may be used, glacial acetic acid is preferred. In one or more of these embodiments, the acetic acid may be combined with a suitable co-solvent, such as dichloromethane, chloroform, toluene, and combinations thereof. In some of embodiments, the solvent is glacial acetic acid. In some other embodiments, a co-solvent solution of glacial acetic acid and dichloromethane, chloroform or both dichloromethane and chloroform may be used. In still other embodiments, a co-solvent solution of glacial acetic acid and toluene may be used.

Figure 2:
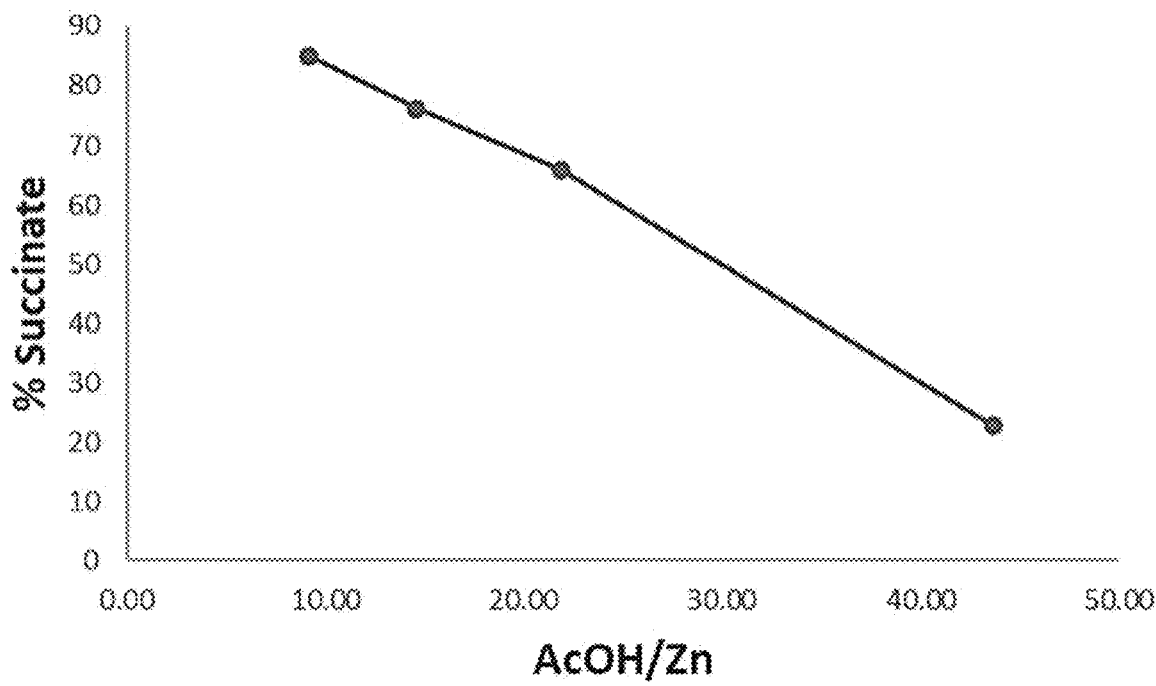
FIG. 2 is a graph showing the percent succinate formation as a function of the acetic acid to zinc ratio.

Next, zinc, preferably in the form of zinc dust, is added to the PPM solution as a reducing agent. In various embodiments, the ratio of molar equivalents of acetic acid to zinc will be from about 2.0 to about 50.0 (See, e.g., FIG. 2). While the zinc will preferably be used in powdered form, the invention is not so limit and zinc in other configurations like pellets or chunks may be used. In some embodiments, the ratio of molar equivalents of acetic acid to zinc will be from about 5.0 to about 50.0, in other embodiments, from about 5.0 to about 40.0, in other embodiments, from about 5.0 to about 30.0, in other embodiments, from about 5.0 to about 20.0, in other embodiments, from about 5.0 to about 15.0, in other embodiments, from about 5.0 to about 10.0, in other embodiments, from about 10.0 to about 50.0, in other embodiments, from about 15.0 to about 50.0, in other embodiments, from about 20.0 to about 50.0, in other embodiments, from about 25.0 to about 50.0, in other embodiments, from about 30.0 to about 50.0, in other embodiments, from about 35.0 to about 50.0, and in other embodiments, from about 40.0 to about 50.0.

Figure 3:
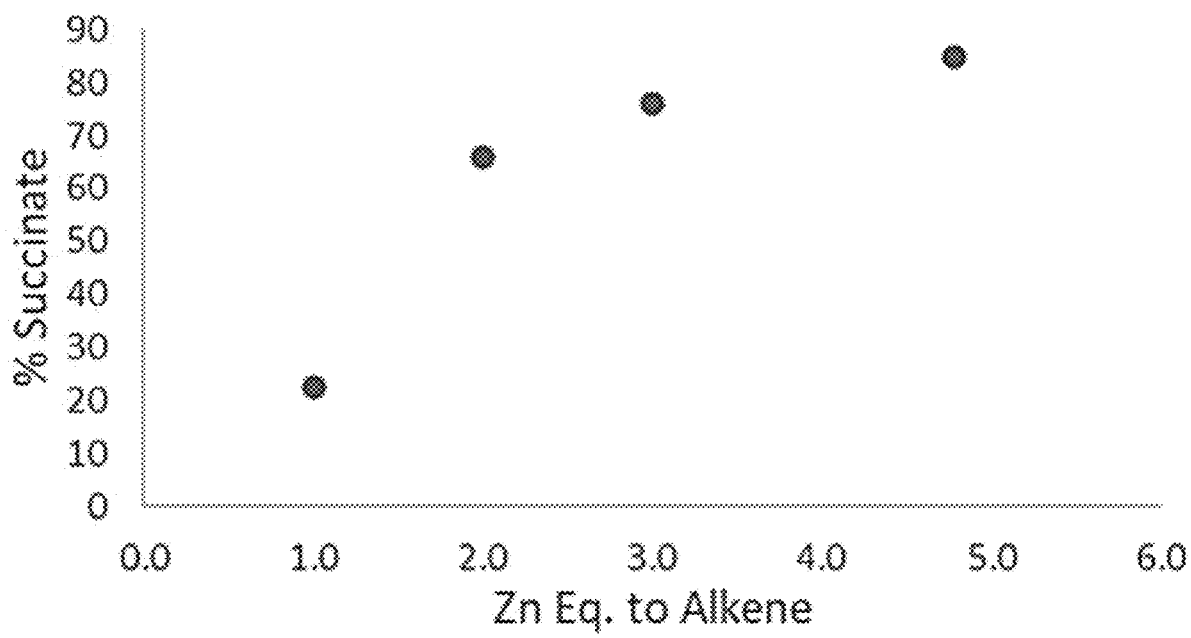
FIG. 3 is a graph showing the percent succinate formation as a function of the ratio of equivalents of zinc to the equivalents of alkene bonds in the PPM being reduced after 30 minutes.
Figure 4:
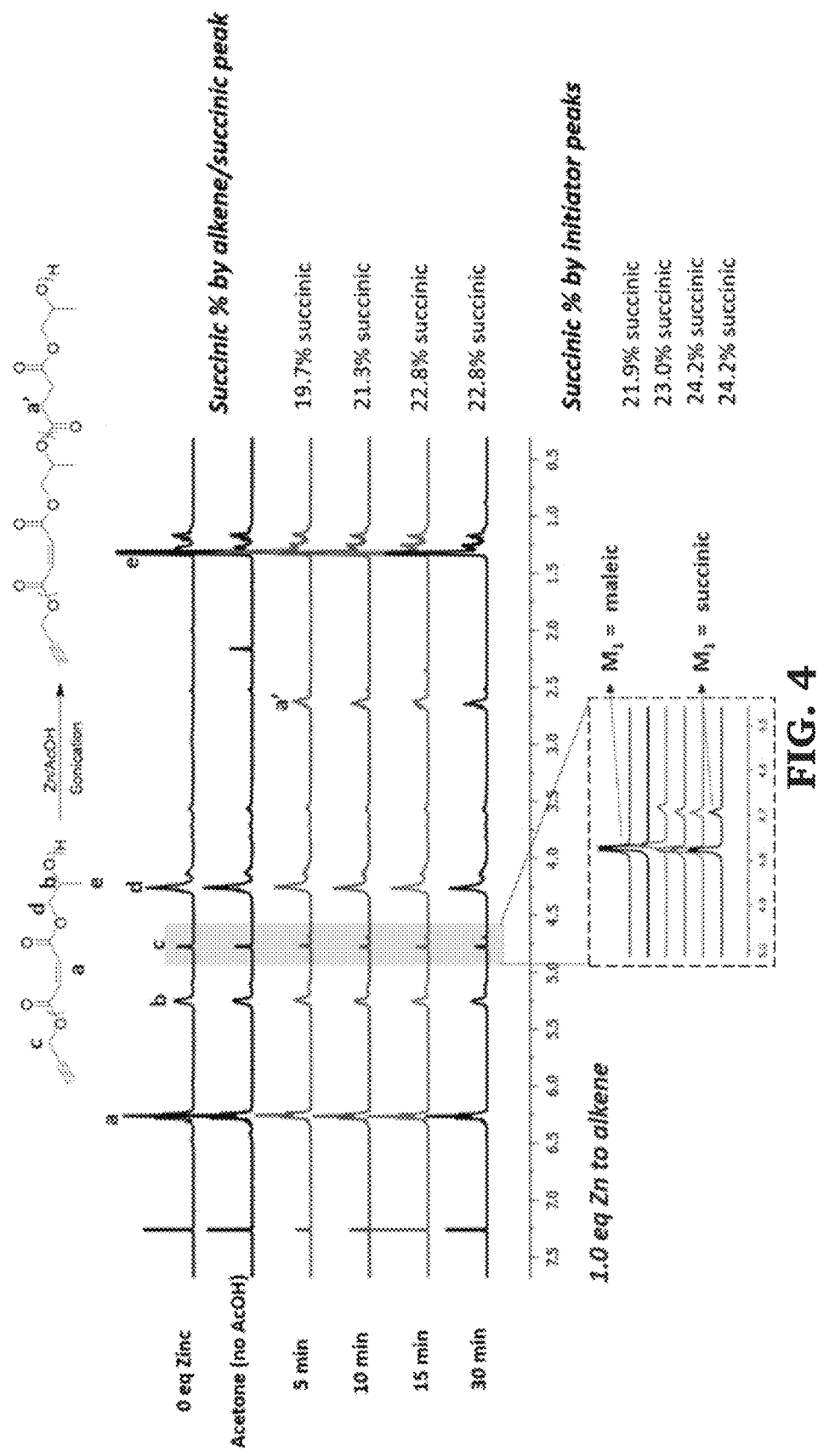
FIG. 4 is a schematic providing a $^1$H NMR analysis of the reduction of PPM using AcOH/Zn under sonication for 5, 10, 15, and 30 minutes with controls.

In one or more of these embodiments, the amount zinc is added will be from about 0.5 to about 5.0 equivalents relative to the alkene bonds in the PPM polymer. In some embodiments, the ratio of the molar equivalents of zinc to the equivalents of alkene bonds in the PPM solution will be from about 0.5 to about 4.5, in other embodiments from about 0.5 to about 4.0, in other embodiments, from about 0.5 to about 3.5, in other embodiments, from about 0.5 to about 3.0, in other embodiments, from about 0.5 to about 2.5, in other embodiments, from about 0.5 to about 2.0, in other embodiments, from about 0.5 to about 1.5, in other embodiments, from about 1.0 to about 5.0, in other embodiments, from about 1.5 to about 5.0, in other embodiments, from about 2.0 to about 5.0, in other embodiments, from about 2.5 to about 5.0, in other embodiments, from about 3.0 to about 5.0, in other embodiments, from about 3.5 to about 5.0, and in other embodiments from about 4.0 to about 5.0. (See FIG. 3). In some embodiments, the ratio of the molar equivalents of zinc to the equivalents of alkene bonds in the PPM solution will be from about 1.0 to about 2.0.

The mixture is then covered and sonicated for from about 1 to about 60 minutes to reduce some (but not all) of the unsaturated double bonds in the PPM. (See FIGS. 1, 4-11). In some embodiments, the sonication may be conducted as set forth in Marchand, A. P.; Reddy, G. M., *Synthesis* 1991, 198, the disclosure of which is incorporated herein by reference in its entirety. As will be apparent, reduction of these unsaturated double bonds will convert those maleate groups to succinate groups to produce a PPMS copolymer intermediate and, all other things being equal, the degree of partial reduction will depend upon the sonication time. That being said, however, the sonication time necessary to achieve a particular degree of reduction (i.e. mole fraction of succinic groups) will depend upon, among other things, the concentration of the polymer solution, the amount of zinc per mole of PPM used, Zn to acetic acid ratio, and the cosolvent composition. One of ordinary skill in the art will be able to determine the appropriate sonication time to achieve a desired mole percent of succinate groups in the PPMS copolymer intermediate without undue experimentation. See, e.g., FIG. 1, 4-11. As noted above, if the PPM is sonicated for too long all of the succinate groups could be reduced, and PPS produced.

In various embodiments, the PPM polymer may be sonicated for from about 1 to about 60 minutes. In some embodiments, the PPM polymer will be sonicated for from about 5 min to about 60 min, in other embodiments, from about 5 min to about 50 min, in other embodiments, from about 5 min to about 40 min, in other embodiments, from about 5 min to about 30 min, in other embodiments, from about 5 min to about 20 min, in other embodiments, from about 5 min to about 10 min, in other embodiments, from about 10 min to about 60 min, in other embodiments, from about 15 min to about 60 min, in other embodiments, from about 20 min to about 60 min, in other embodiments, from about 30 min to about 60 min, in other embodiments, from about 40 min to about 60 min, and in other embodiments, from about 50 min to about 60 min.

The PPMS copolymer intermediate is then collected and purified, as is known in the art. In one or more embodiments, the mixture containing the PPMS copolymer diluted with chloroform and filtered into a separatory funnel. Water is then added until phase separation occurred, and the organic layer was extracted. The aqueous layer is further extracted with dichloromethane or chloroform and the combined organic layer was washed with saturated aqueous $NaHCO_3$ until no gas formation was seen. The organic layer is then washed with brine, dried over sodium sulfate, and the solvent removed under reduced pressure.

In one or more embodiments, the PPMS copolymer intermediate may be formed as shown in Scheme 1, below:

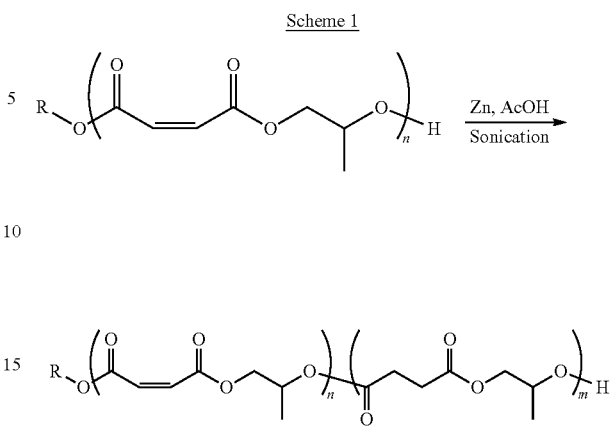

Scheme 1 where R, n, and m are as set forth above.

In these embodiments, the PPMS copolymer intermediate is then isomerized to form the PPFS copolymer of the present invention, generally using a catalytic amount of diethyl amine in chloroform. While the isomerization of the PPMS copolymer intermediate does result in some other changes to the polymer, it should be understood that most general characteristics of the PPF-based 3D printable polymer composition of the present invention, such as the approximate $M_n$, $Đ_m$, and $T_g$ ranges, are determined in the initial ROCOP reaction and do not change during the isomerization reaction. (See, FIG. 11)

In one or more of these embodiments, the poly(propylene maleate-co-succinate) copolymer intermediate is first dissolved in a suitable organic solvent. Suitable solvents for this purpose are not particularly limited provided that the reaction proceeds and may include, without limitation, chloroform, dichloromethane or a combination thereof. In one or more embodiments, the poly(propylene maleate-co-succinate) copolymer intermediate is dissolved in chloroform. Next, a quantity of an organic base, such as diethylamine, trimethylamine, or pyridine is added to the solution and it is heated to reflux temperature under an inert atmosphere to produce the poly(propylene fumarate-co-succinate) copolymer of the present invention.

In some of these embodiments, the solution is heated it to a reflux temperature under an inert atmosphere for from about 1 to about 48 hours (or until substantially all of poly(propylene maleate-co-succinate) copolymer intermediate has isomerized) to produce the poly(propylene fumarate-co-succinate) copolymer of the present invention. In some embodiments, the solution is refluxed for from about 1 hours to about 36 hours, in other embodiments, from about 1 hours to about 30 hours, in other embodiments, from about 1 hours to about 24 hours, in other embodiments, from about 6 hours to about 48 hours, in other embodiments, from about 12 hours to about 48 hours, in other embodiments, from about 18 hours to about 48 hours, in other embodiments, from about 24 hours to about 48 hours, and in other embodiments, from about 36 hours to about 48 hours to produce the poly(propylene fumarate-co-succinate) copolymer of the present invention.

In one or more embodiments, the PPMS copolymer intermediate may be isomerized to form the PPFS copolymer of the present invention as shown in Scheme 2, below:

Scheme 2

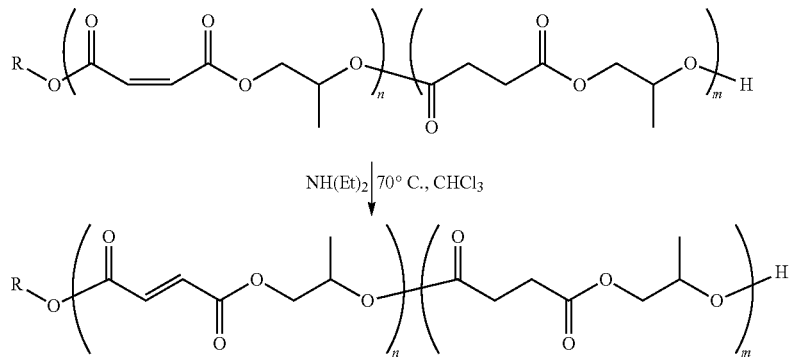

where R, n, and m are as set forth above.

Finally, the poly(propylene fumarate-co-succinate) copolymer composition of the present invention may be washed with a buffer solution, such as a phosphate buffer solution, to remove residual monomer and amine and then dried to recover the poly(propylene fumarate-co-succinate) copolymer of the present invention. In one or more embodiments, the poly(propylene fumarate-co-succinate) copolymer composition of the present invention may be washed with a phosphate buffer solution and then dried by vacuum evaporation. The PPFS copolymer may be purified by any suitable method known in the art for that purpose. In some of these embodiments, the poly(propylene fumarate-co-succinate) copolymer is purified by repeated washing in an excess of phosphate buffer saline solution or a suitable acid solution, combining the organic layers, and drying the resulting polymer in vacuo to produce the purified polymer.

As set forth above, it is believed that the above described reduction method works with equal facility on both the cis and trans isomers. As a result, the poly(propylene fumarate-co-succinate) copolymer composition of the present invention may be also prepared directly from the corresponding PPF polymer, as shown in Scheme 3, below:

partial reduction of PPM and PPF according to the present invention and by the previously reported one-pot method of Shin et al. (See, Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosure of which is incorporated herein by reference.) (the "one pot method" and the properties and 3D printed resins prepared therefrom were compared and evaluated by $^1$H NMR spectroscopy, $^{13}$C NMR spectroscopy, SEC, UV-visible spectroscopy, viscometry, differential scanning calorimetry (DSC), and mechanical testing, as set forth below.

To investigate the impact of cosolvents on the alkene reduction, PPM oligomers with a degree of polymerization ($DP_n$) of 10 were synthesized as reported previously. (See, e.g., Wilson, J. A.; Luong, D.; Kleinfehn, A. P.; Sallam, S.; Wesdemiotis, C.; Becker, M. L., Magnesium Catalyzed Polymerization of End Functionalized Poly(propylene maleate) and Poly(propylene fumarate) for 3D Printing of Bioactive Scaffolds. *J. Am. Chem. Soc.* 2018, 140 (1), 277-284, the disclosure of which is incorporated herein by reference.) The polymer was dissolved in bulk AcOH or Scheme 3

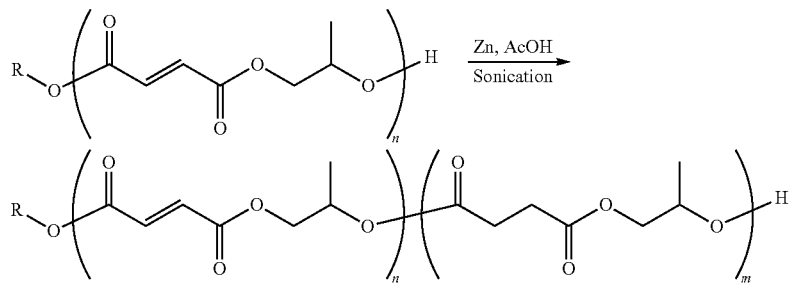

where R, n, and m are as set forth above. The reduction and purification methods used for embodiments using the PPF is the same as set forth above using the PPM copolymer except that no isomerization is done as part of the method. (See, e.g., Example 10, below.)

EXPERIMENTAL

To more fully illustrate and reduce the invention to practice, PPSM and PPSF copolymers were prepared by AcOH containing 1:1 (v/v) toluene or CHCl$_3$ cosolvent and sonicated in the presence of varying mole ratios of zinc dust to alkene (1.0 to 2.0 eq.). (See, FIGS. 5A-B, 7A-B, and 9A-C). After gravity filtration of the zinc dust, conversion was assessed by $^1$H NMR spectroscopy and the total amount of succinate was determined by the integration ratios of the maleate resonance ($\delta$=6.30 ppm) and the succinate resonance ($\delta$=2.70 ppm). By using propargyl alcohol as the ROCOP initiator, the $M_1$ subunit succinate content could be quantified by a shift in the $^1$H NMR resonance of the initiator methylene from δ=4.78 ppm ($M_1$=maleate) to δ=4.70 ppm ($M_1$=succinate), providing an indicator of regioselectivity. While the impact of an $M_1$ subunit bias may be negligible at increased molecular masses, the requirements of oligomeric PPF and PPFPS copolymers in the 3D printing process provides a significant contribution of the $M_1$ subunit to the overall polymer properties.

Figure 9A:
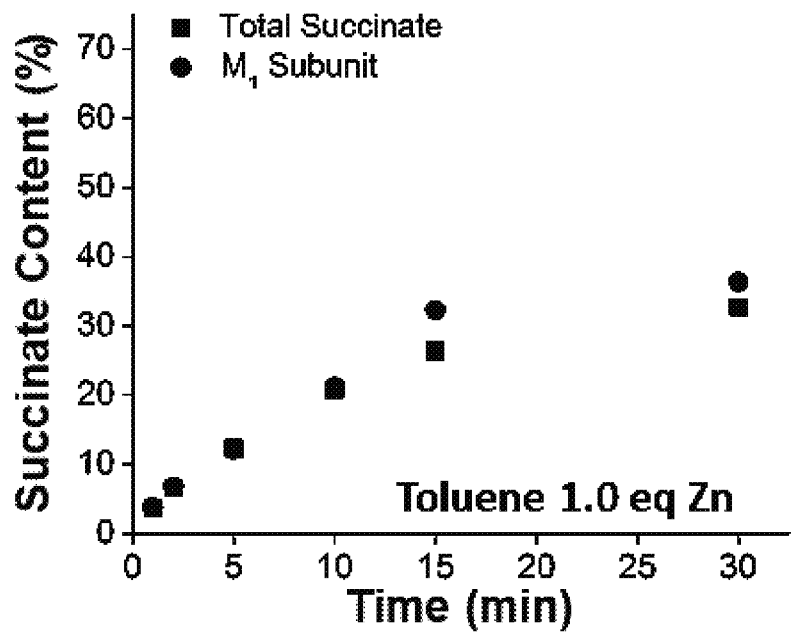
FIGS. 9A-C are graphs showing the results of kinetic investigation of the reduction of PPM using AcOH/Zn with a toluene cosolvent (1:1 AcOH:toluene) under sonication using either 1.0 zinc equivalents (FIG. 9A) or 2.0 zinc equivalents (FIG. 9B) and a graph comparing sonication using 1.0 equivalents and 1.5 zinc equivalents (FIG. 9C)
Figure 9B:
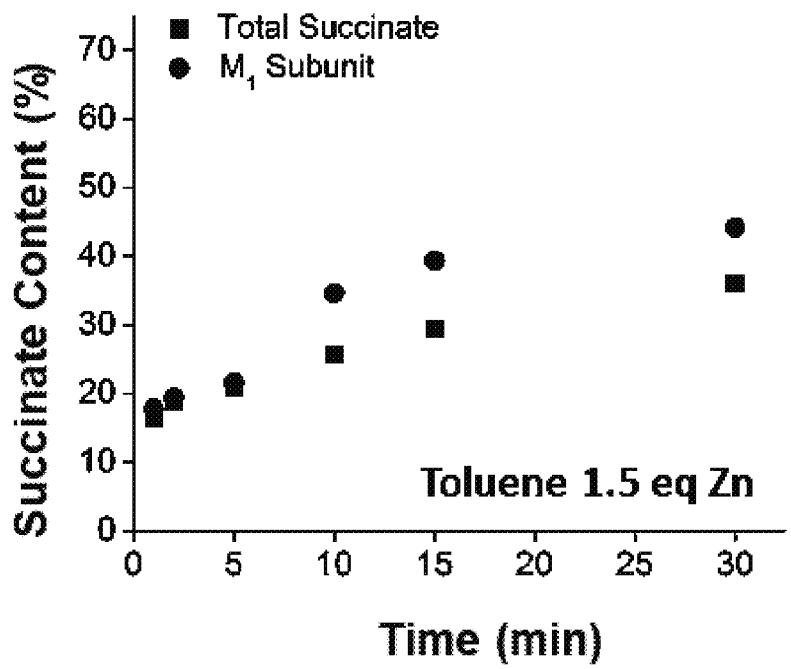
Figure 9C:
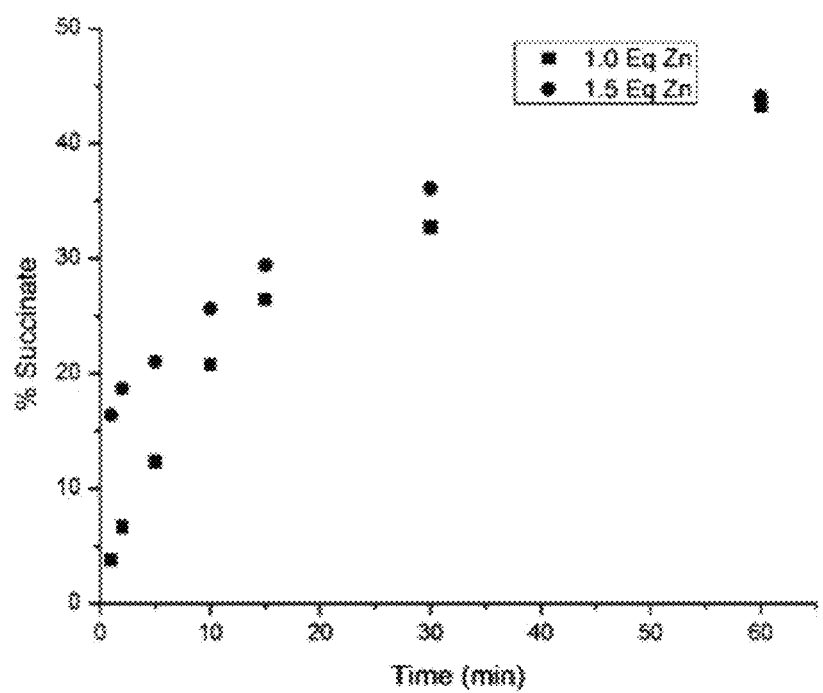
Figure 10:
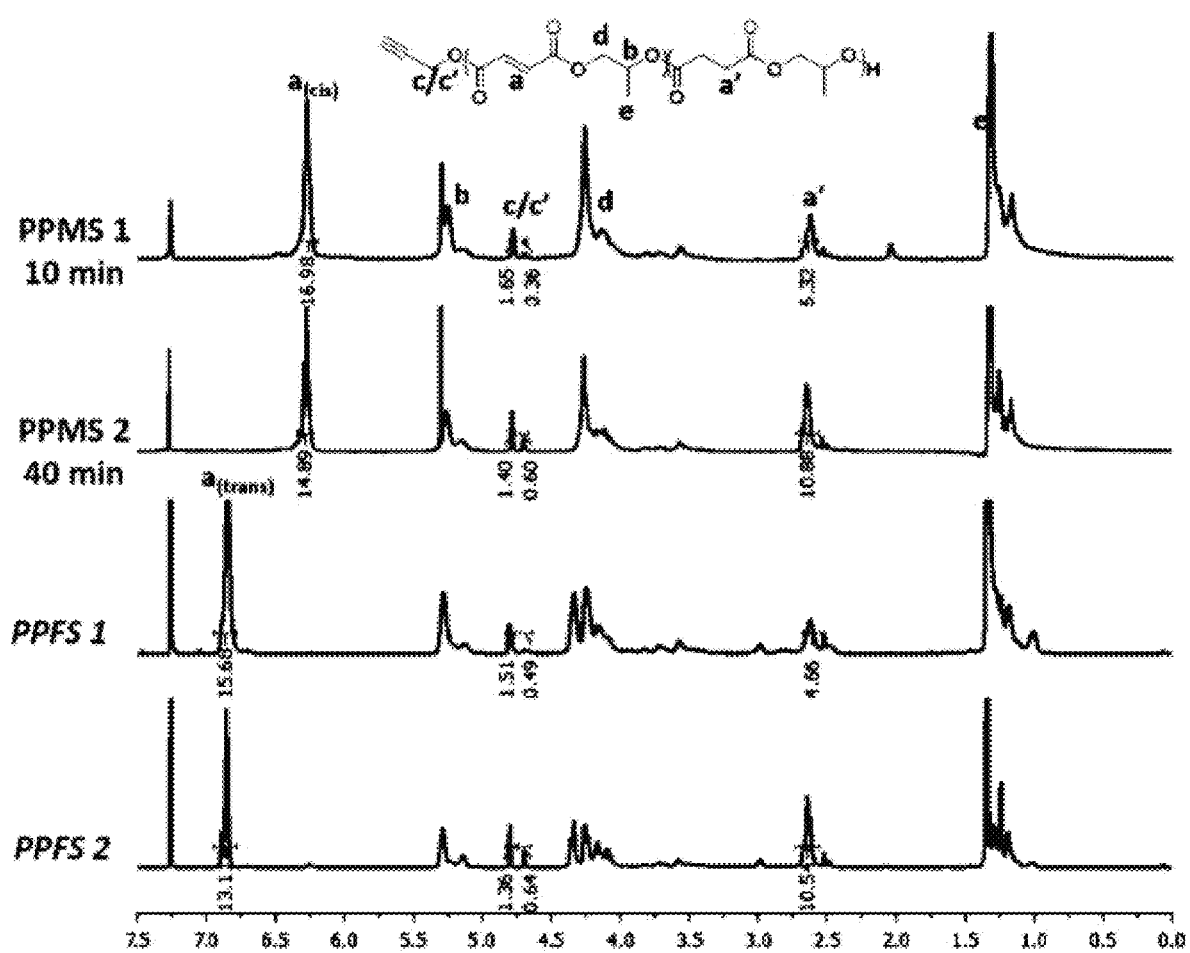
FIG. 10 is an annotated $^1$H NMR analysis of the isomerization of poly(propylene maleate-co-succinate) to poly(propylene fumarate-co-succinate) using refluxing diethylamine in chloroform. Two PPMS polymers were used, synthesized by the reduction of PPM to PPMS with 10 minutes (PPMS 1) or 40 minutes (PPMS 2) of sonication.
Figure 11:
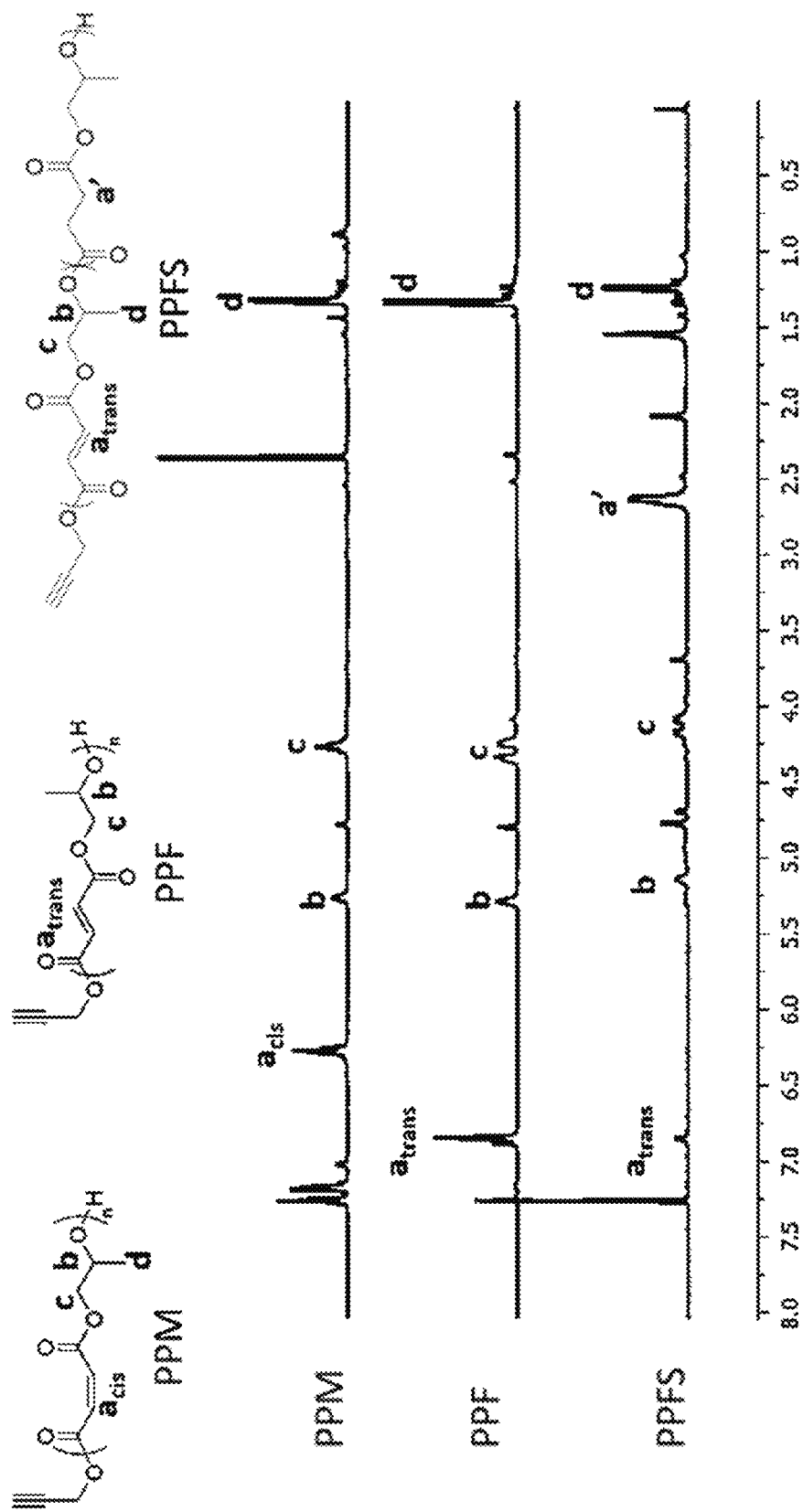
FIG. 11 is an annotated $^1$H NMR analysis of the isomerization of poly(propylene maleate) to poly(propylene fumarate) as in method 4 (Example 8), followed by a subsequent reduction as in methods 1-3 (See Examples 5-7, below)

Initially, a toluene cosolvent was investigated as a one-pot ROCOP/reduction strategy of the crude PPM mixture. Over the course of 30 minutes, kinetic results using a toluene cosolvent achieved reductions of ca. 35% succinate content with both 1.0 and 1.5 eq. of Zn (FIGS. 9A-B). The disparity between total succinate content and $M_1$ subunit content was minimal, indicating no significant regioselectivity in the reduction. However, the low solubility of PPM in toluene led to difficulty in purification by aqueous washes. Furthermore, batch variation due to residual amounts of MA monomer in the crude mixture could lead to the inability to target reduction content making scale up difficult.

Figure 7A:
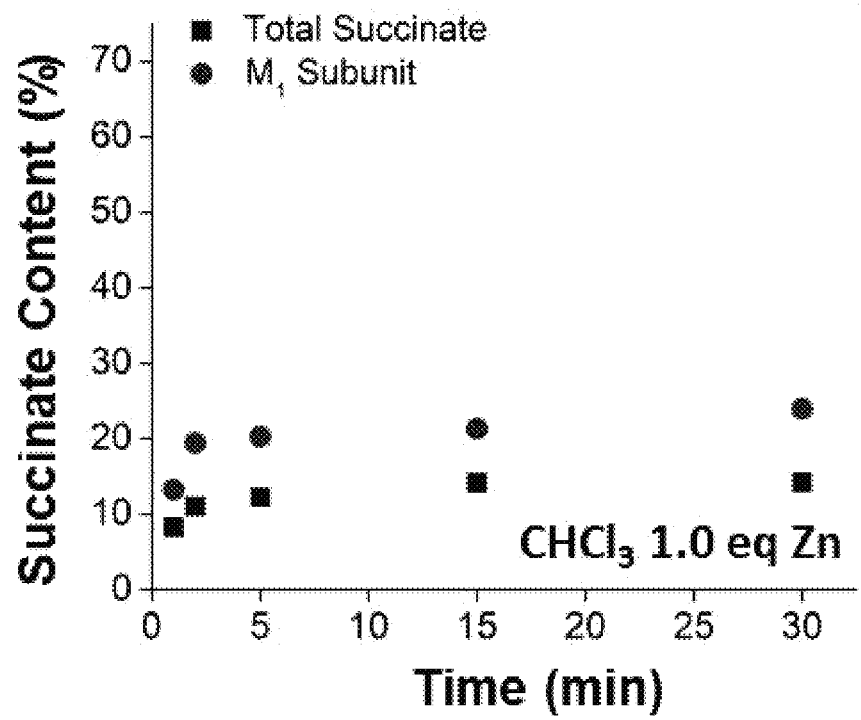
FIGS. 7A-B are graphs showing the results of a kinetic investigation of the reduction of PPM using AcOH/Zn with a chloroform cosolvent (1:1 AcOH:CHCl$_3$) under sonication using either 1.0 equivalents (FIG. 7A) or 2.0 equivalents (FIG. 7B) of zinc.
Figure 7B:
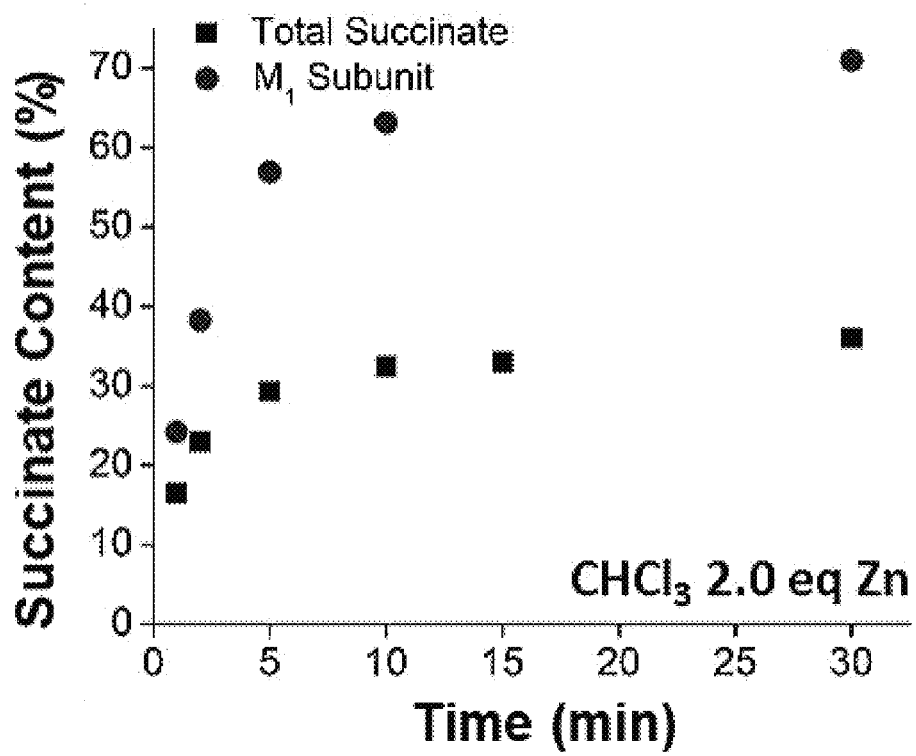
Figure 8A:
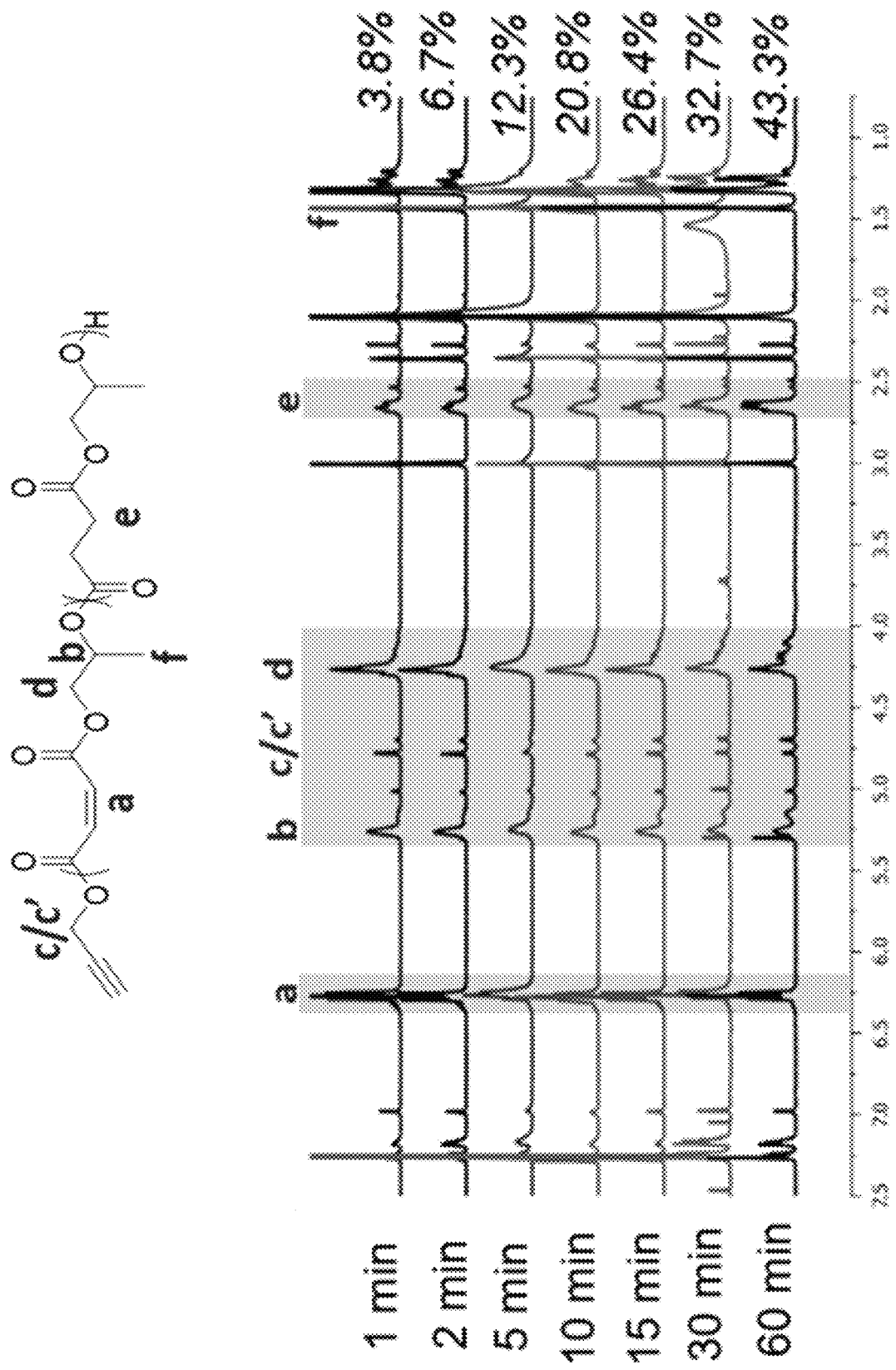
FIGS. 8A-B are $^1$H NMR analyses of the time-dependence of reduction of PPM using AcOH/Zn with the same toluene cosolvent with 1 eq Zn to alkene (FIG. 8A) and 1.5 eq Zn to alkene (FIG. 8B) under sonication.
Figure 8B:
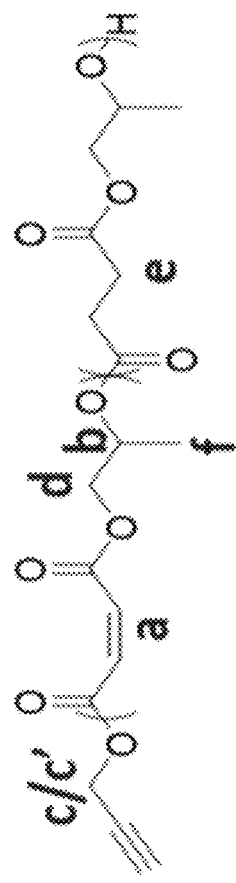
Figure 8B:
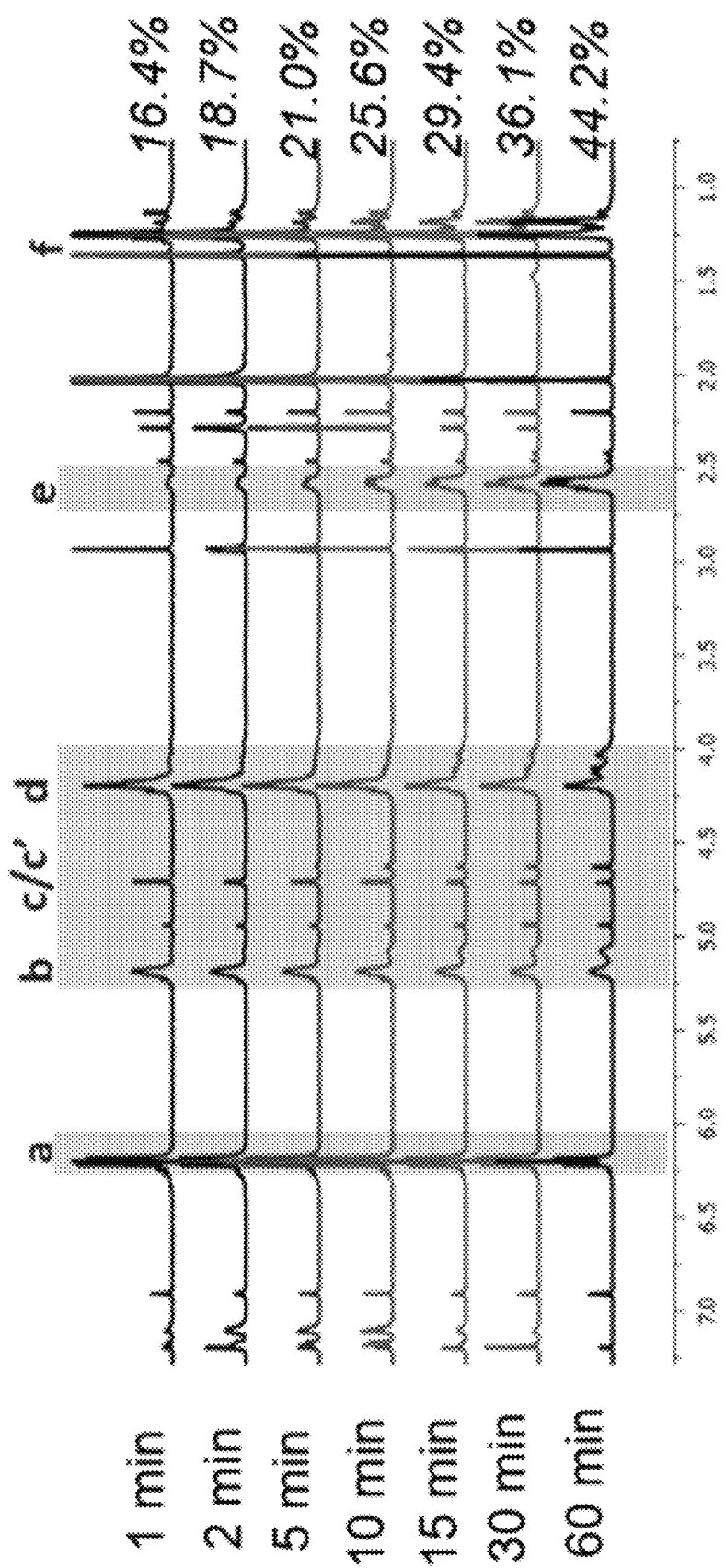

Using CHCl$_3$ and bulk AcOH solvents, PPM was precipitated from hexanes and dried under reduced pressure prior to reduction. Using a 1:1 (v/v) AcOH/CHCl$_3$ solution the total succinate content over 30 min was ca. 15% and 35% succinate using 1.0 eq. and 2.0 eq. of Zn, respectively (FIG. 7A-B). Experiments run using CHCl$_3$ as a cosolvent displayed high disparity between the total succinate content and the $M_1$ subunit succinate content, demonstrating preferential reduction in the maleate unit adjacent to the initiator site. Furthermore, a vigorous exotherm was observed when scaling the reduction to a 10 g scale, presumably due to reactivity of the CHCl$_3$ solvent with Zn. These factors precluded the further use of CHCl$_3$ as a cosolvent.

Figure 5A:
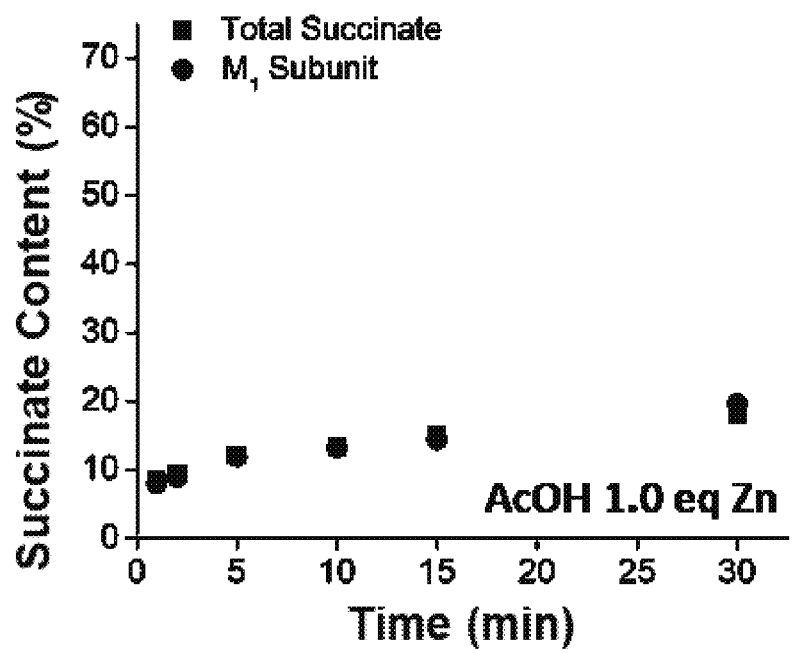
FIGS. 5A-B are graphs showing the results of kinetic investigations of the reduction of PPM using AcOH/Zn under sonication using either 1.0 equivalents (FIG. 5A) or 2.0 equivalents (FIG. 5B) of zinc and bulk acetic acid.
Figure 5B:
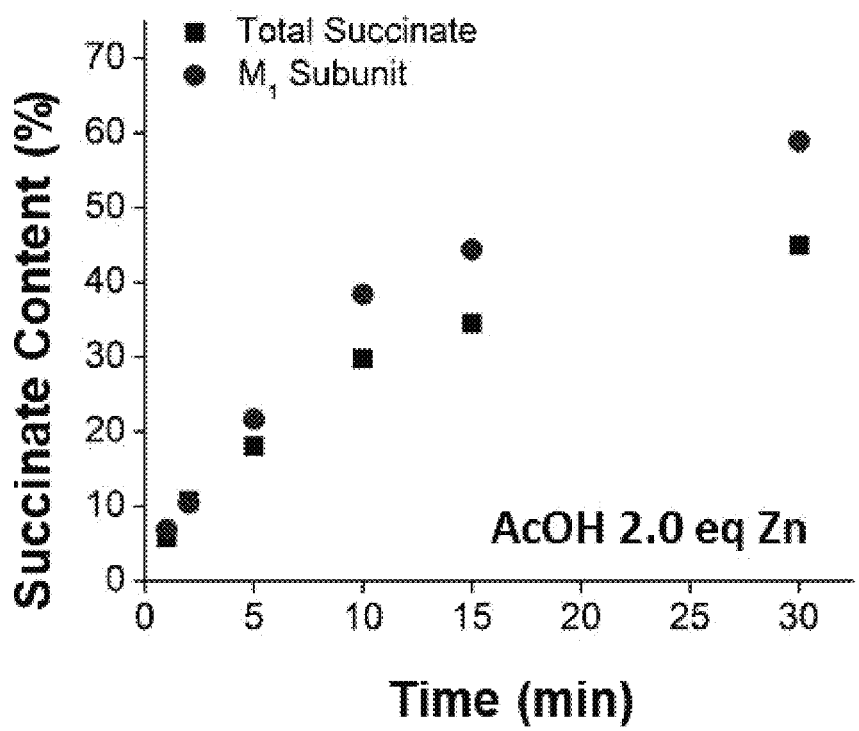
Figure 6:
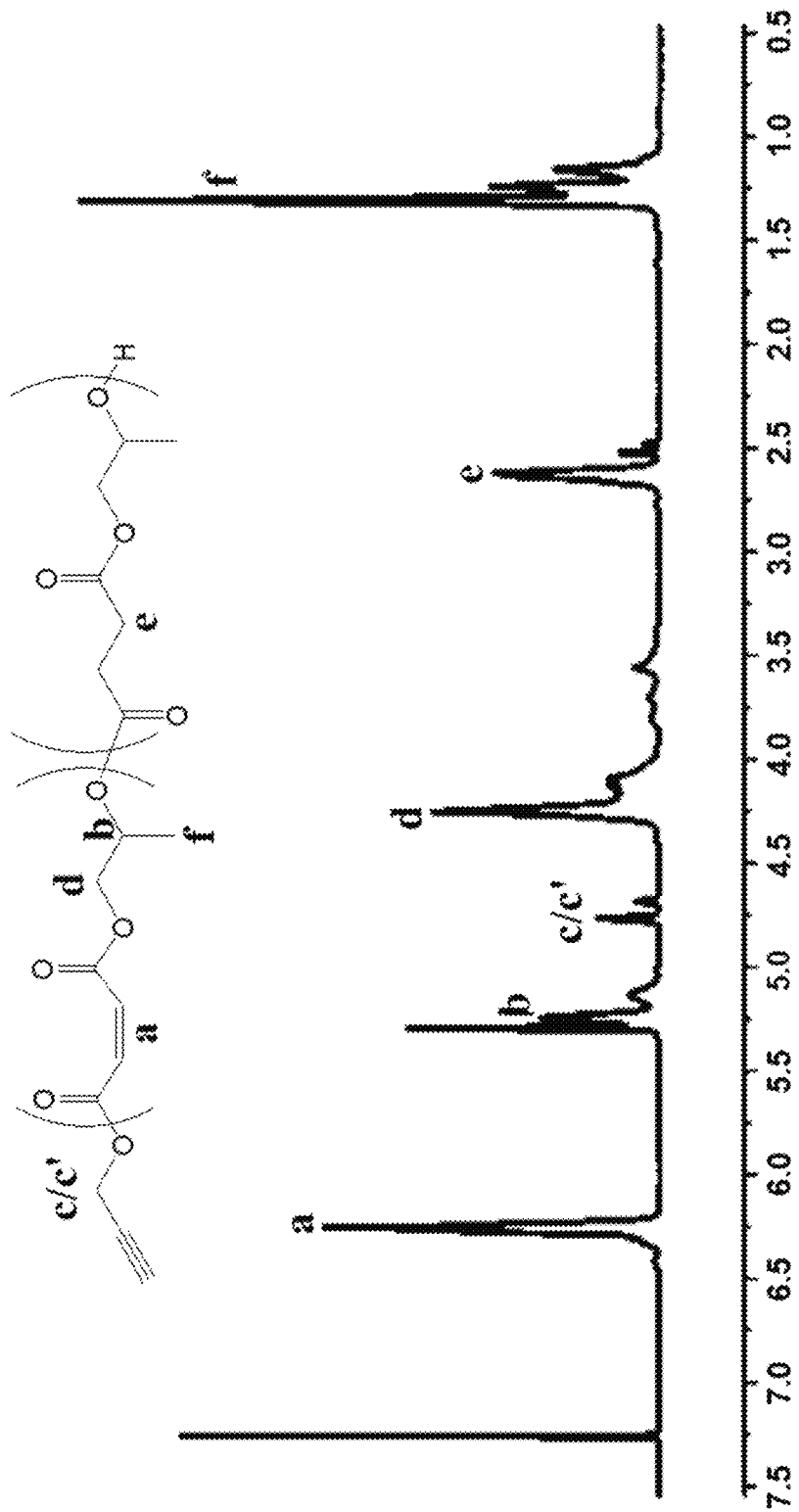
FIG. 6 is an $^1$H NMR analysis of the reduction of PPM using AcOH/Zn with a chloroform or dichloromethane cosolvent under sonication. The total succinate content can be established from the integrations of the alkene resonance at δ~6.25 PPM to the integration of the reduced succinate resonance at δ~2.66 PPM and the first subunit of the PPM polymer is reduced, the initiator methylene peak denoted "c" shifts upfield from δ~4.78 PPM to the resonance at δ~4.70 denoted "c'"
Figure 12:
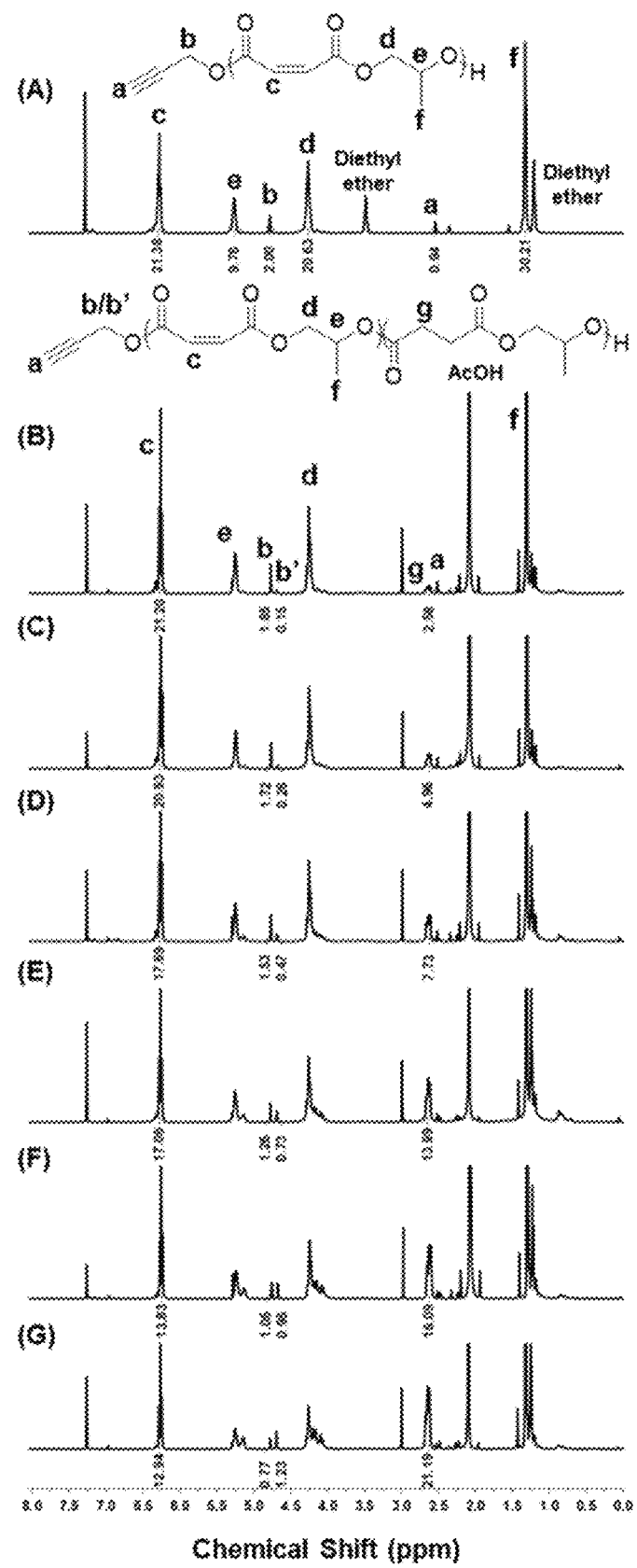
FIG. 12 is a comparison of $^1$H NMR spectra of (A) PPM and PPMPS synthesized by a modified Clemmensen reduction using 2.0 eq. Zn to alkene under sonication for (B) 1 min, (C) 2 min, (D) 5 min, (E) 10 min, (F) 15 min, and (G) 30 min.
Figure 13:
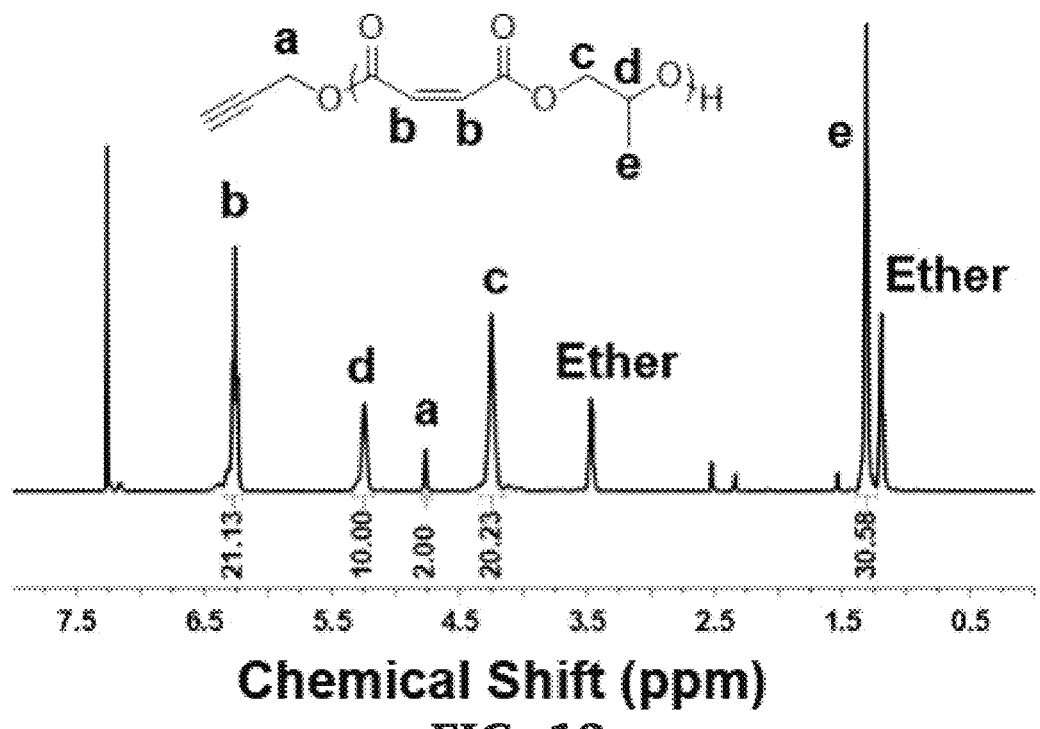
FIG. 13 is an annotated $^1$H NMR spectra (CDCl$_3$) of poly(propylene maleate)
Figure 14:
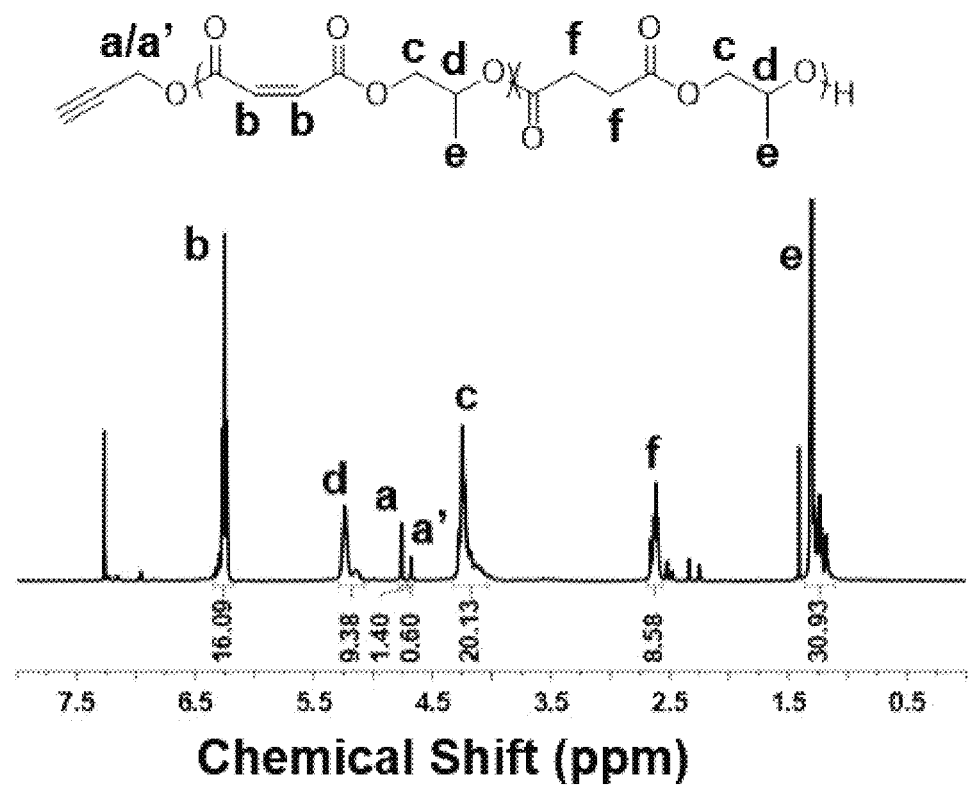
FIG. 14 is an annotated $^1$H NMR spectra (CDCl$_3$) of poly(propylene maleate-co-propylene succinate) containing 20% succinate synthesized by the Zn/AcOH reduction method.
Figure 15:
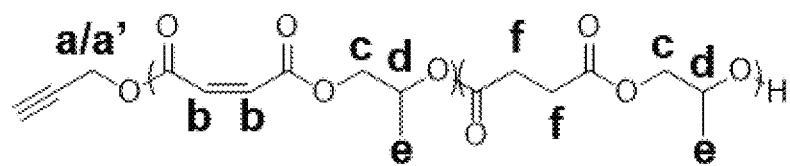
FIG. 15 is an annotated $^1$H NMR spectra (CDCl$_3$) of poly(propylene maleate-co-propylene succinate) containing 40% succinate synthesized by the Zn/AcOH reduction method.
Figure 15:
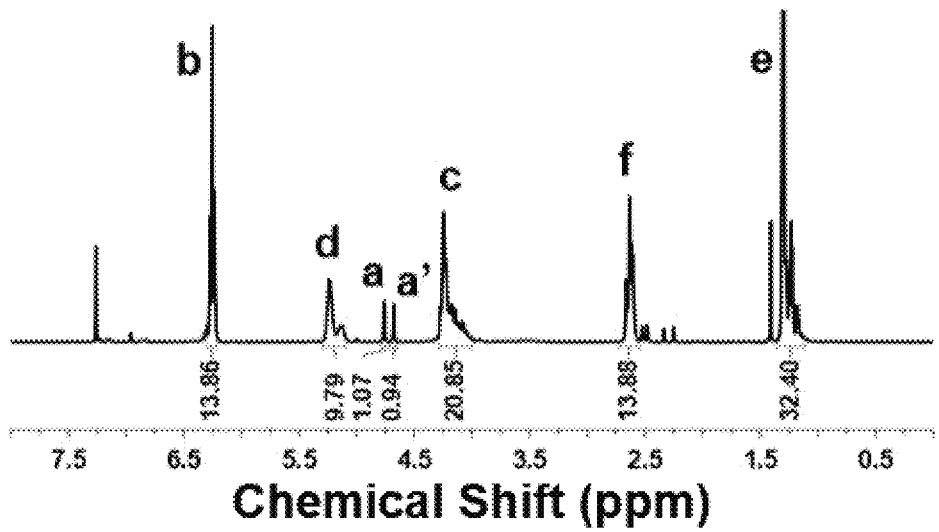
Figure 16:
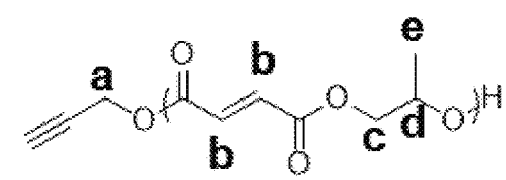
FIG. 16 is an annotated $^1$H NMR spectra (CDCl$_3$) of poly(propylene fumarate) synthesized by the Zn/AcOH reduction method.
Figure 16:
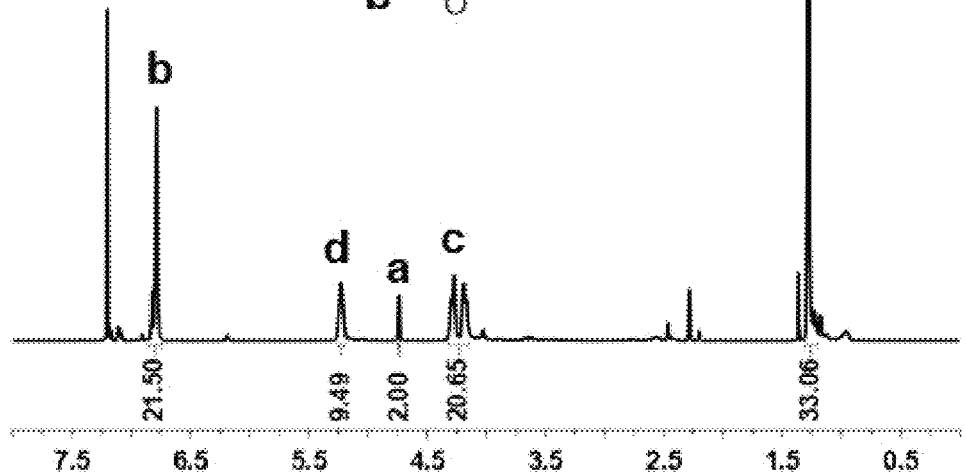
Figure 17:
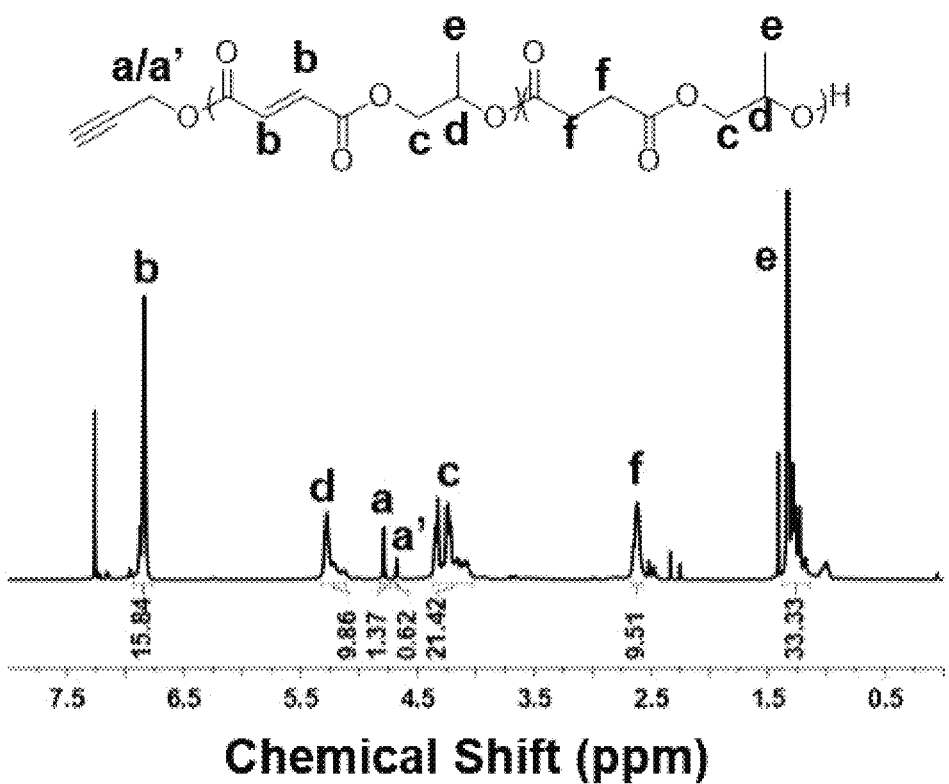
FIG. 17 is an annotated $^1$H NMR spectra (CDCl$_3$) of poly(propylene fumarate-co-propylene succinate) containing 20% succinate synthesized by the Zn/AcOH reduction method.
Figure 18:
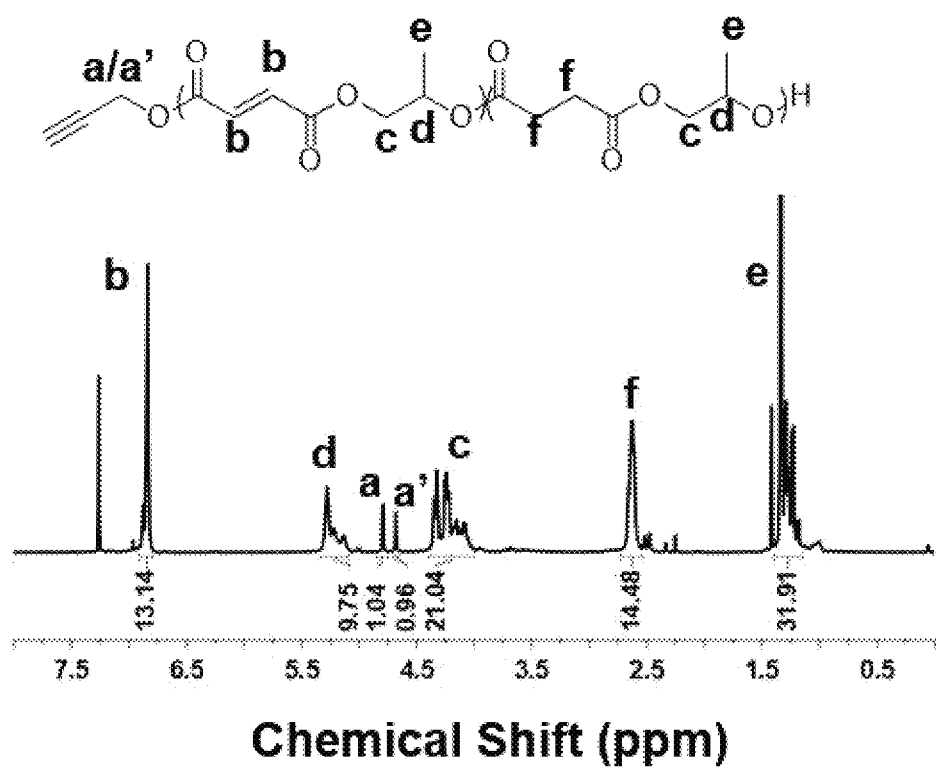
FIG. 18 is an annotated $^1$H NMR spectra (CDCl$_3$) of poly(propylene fumarate-co-propylene succinate) containing 40% succinate synthesized by the Zn/AcOH reduction method.
Figure 19:
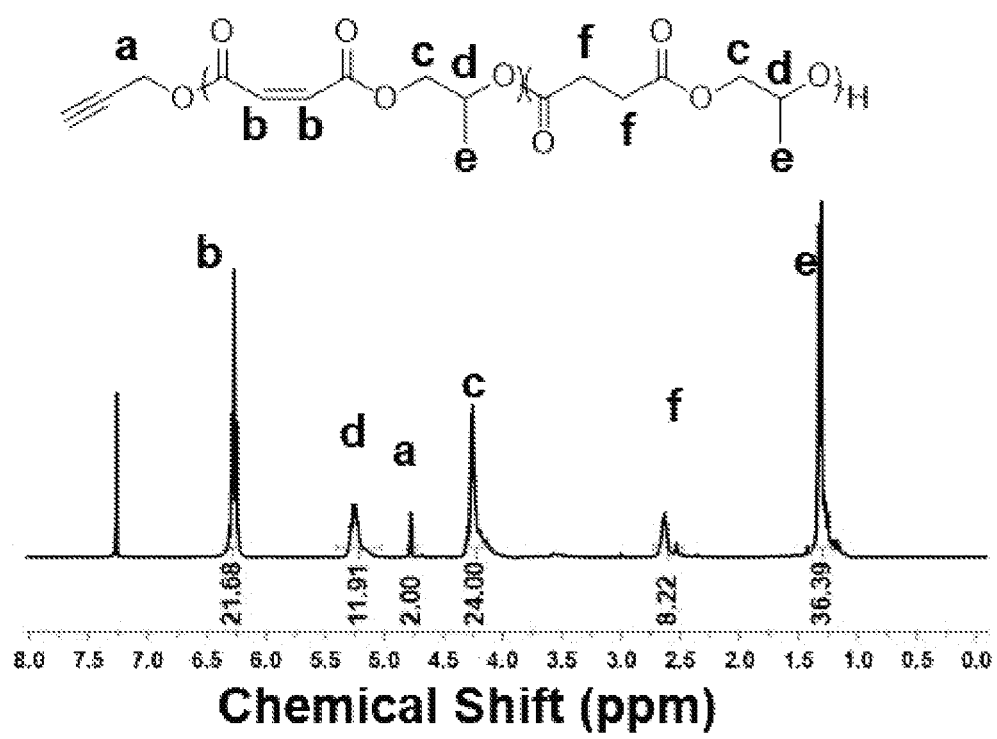
FIG. 19 is an annotated $^1$H NMR spectra (CDCl$_3$) of poly(propylene maleate-co-propylene succinate) containing 20% succinate synthesized by the one pot method described by Shin et al.
Figure 20:
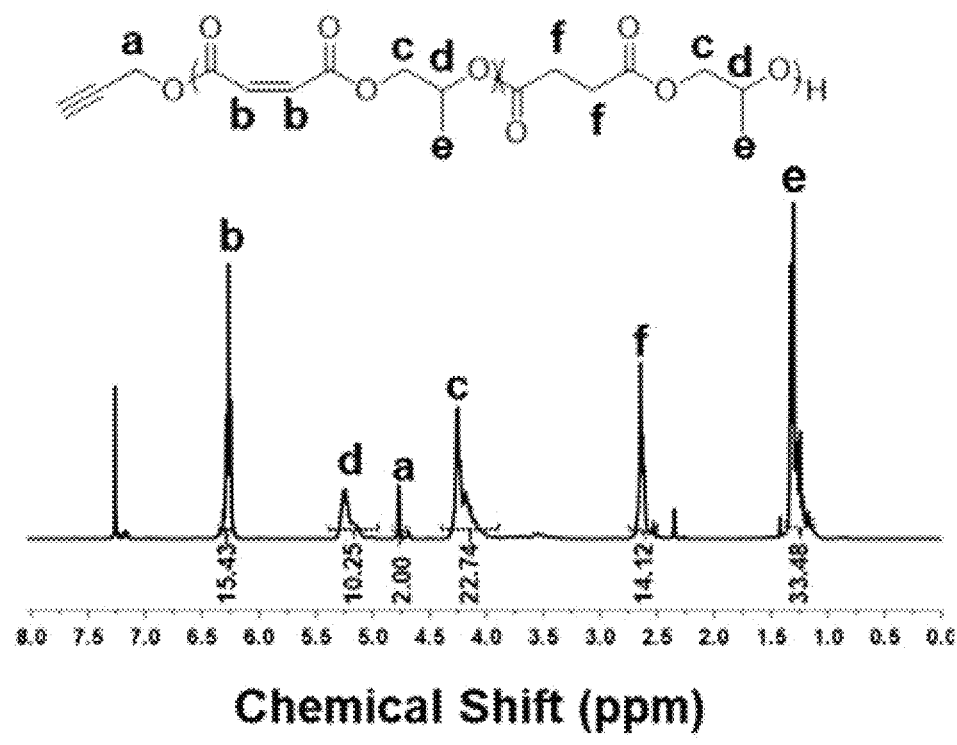
FIG. 20 is an annotated $^1$H NMR spectra (CDCl$_3$) of poly(propylene maleate-co-propylene succinate) containing 40% succinate synthesized by the one pot method described by Shin et al.
Figure 21:
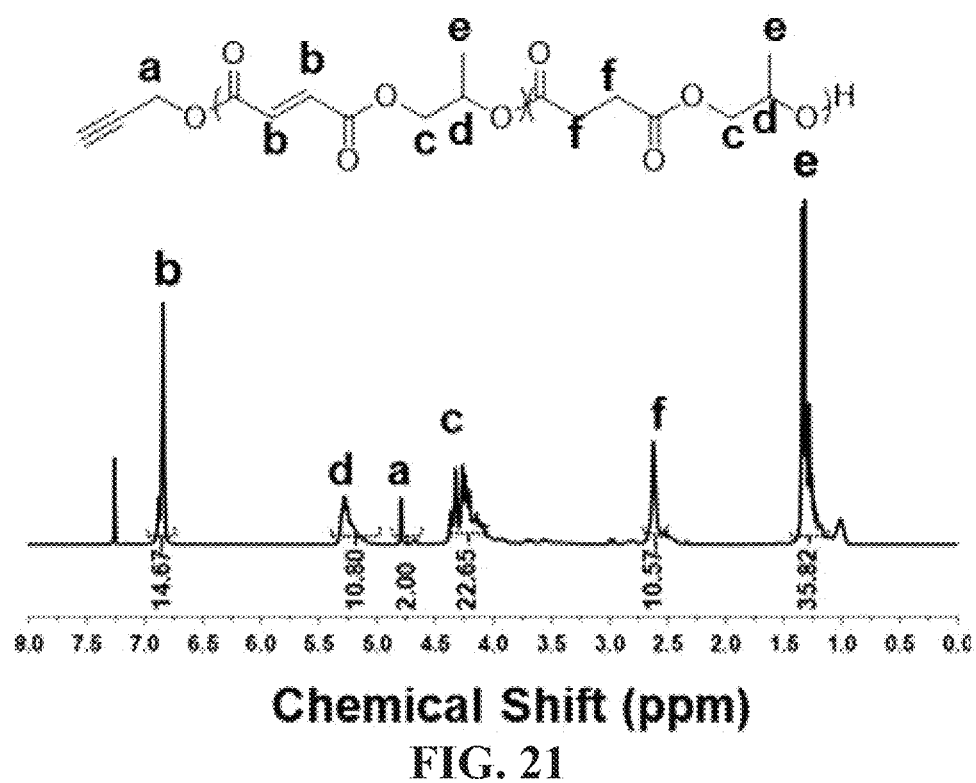
FIG. 21 is an annotated $^1$H NMR spectra (CDCl$_3$) of poly(propylene fumarate-co-propylene succinate) containing 20% succinate synthesized by the one pot method described by Shin et al.
Figure 22:
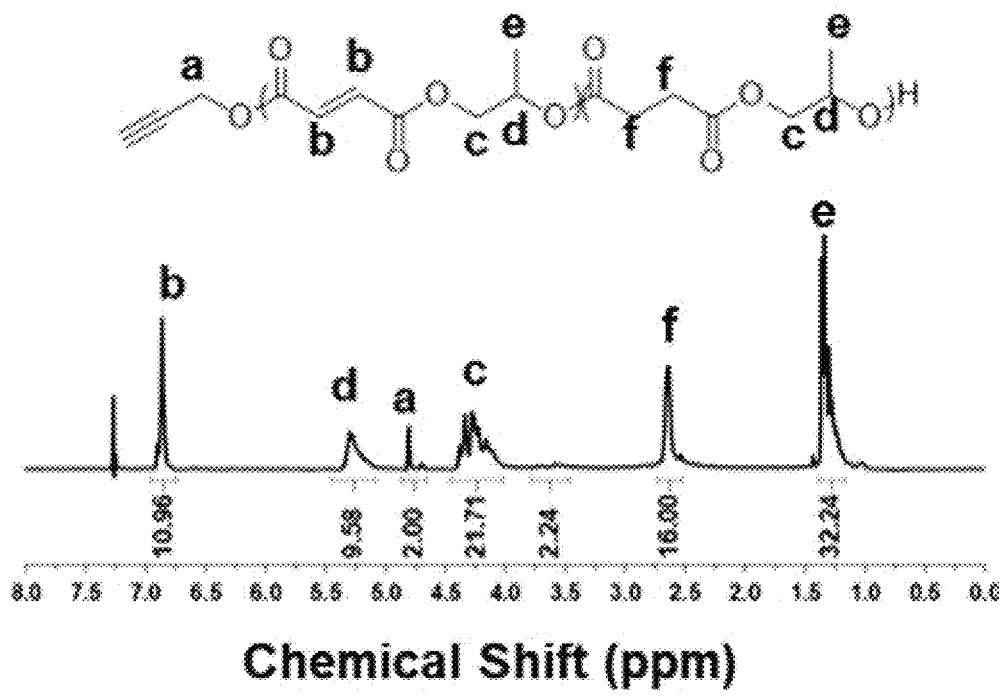
FIG. 22 is an annotated $^1$H NMR spectra (CDCl$_3$) of poly(propylene fumarate-co-propylene succinate) containing 40% succinate synthesized by the one pot method described by Shin et al.

Lastly, a bulk AcOH system was investigated. (See. FIGS. 5A-B) While 1.0 eq. of zinc showed no noticeable difference in the total succinate content and the $M_1$ subunit succinate content, the reaction was only able to achieve ca. 20% total succinate content, limiting the scope of the reduction. At 2.0 eq. of Zn, succinate content reduction to ca. 45% was achieved. While a slight disparity between the total succinate content and the $M_1$ subunit succinate content was observed, the system was chosen for scale-up due to ease of purification and close agreement between the two succinate measurements. The $^1$H NMR spectra of the kinetic experiments using 2.0 eq. of Zn to alkene in bulk AcOH are shown in FIG. 12. Notably, a resonance was observed at δ=3.01 ppm in the kinetic experiments which was not present in the $^1$H NMR spectra of the copolymers after isomerization and purification (FIGS. 13-18). To compare the properties of the copolymers synthesized by the Zn/AcOH reduction method to the previously reported one-pot method, PPMPS and PPFPS copolymers were synthesized as described by Shin et al. (See, Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosure of which is incorporated herein by reference). The $^1$H NMR spectra of the respective copolymers are shown in FIGS. 19-22.

Figure 23:
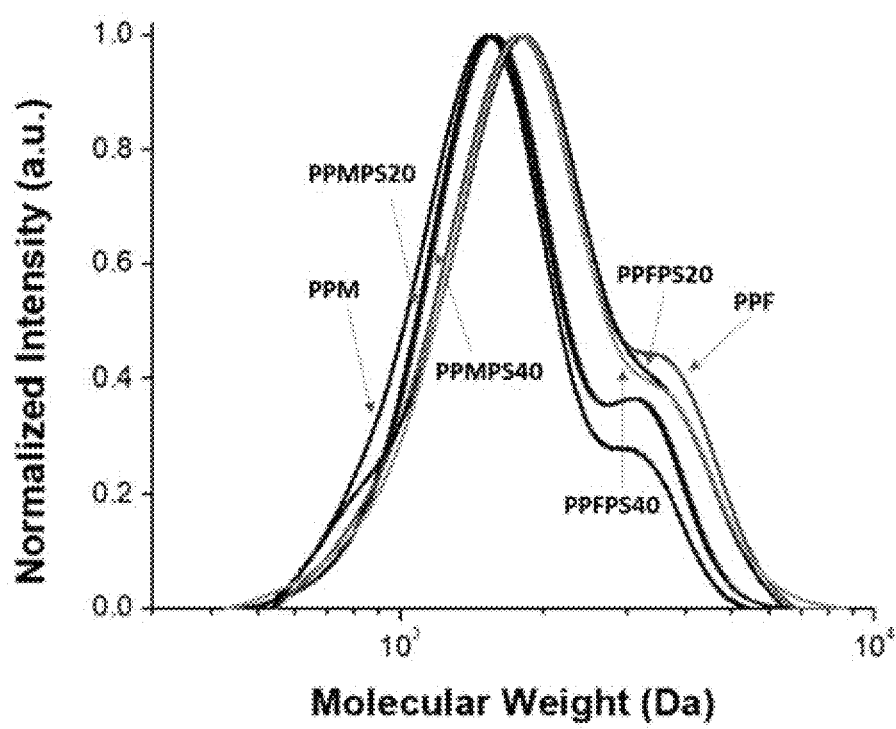
FIG. 23 is a graph showing molecular mass distribution of (black) poly(propylene maleate), poly(propylene maleate-co-propylene succinate) containing 20% and 40% succinate, poly(propylene fumarate), and poly(propylene fumarate-co-propylene succinate) containing 20% and 40% succinate content. Molecular masses were determined using a refractive index detector against polystyrene using THF as the eluent.
Figure 24:
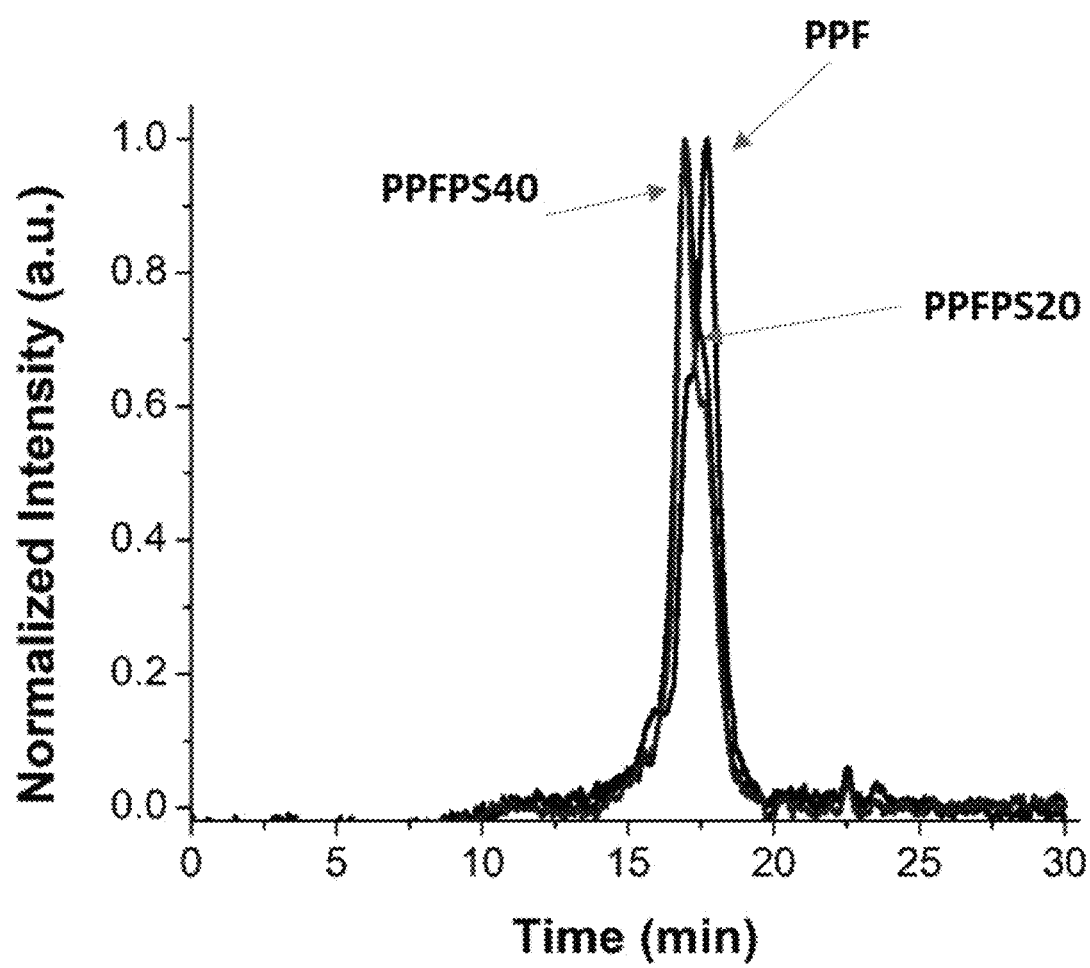
FIG. 24 is a graph comparing Size exclusion chromatography (SEC) traces of PPF, PPFPS20, and PPFPS40 using a MALS detector with THF as the eluent.

Copolymers containing 20% succinate (PPMPS20) and 40% succinate (PPMPS40) were each synthesized on a 150 g scale, isomerized to yield PPFPS20 and PPFPS40, and characterized by $^1$H NMR spectroscopy and SEC. The $^1$H NMR spectra show consistent degrees of polymerization before and after the reduction (FIGS. 13-18). SEC measurements using both refractive index (RI) and multi-angle light scattering (MALS) detectors demonstrated that each polymer has narrow and consistent molecular mass distributions (Đ$_m$=1.2) (FIGS. 23-24). The slight differences in the relative SEC molecular weights of each polymer indicate more favorable solvent-polymer interactions in THF when moving from maleate to succinate to fumarate content. Significantly, these characterization data indicate no chain-scission events occurred during the reduction (Table 1).

TABLE 1

Characterization of PPM, PPMPS, and PPFPS copolymers synthesized by the post-polymerization reduction method.

| Polymer | DP$_n$[a] | M$_n$[b] (KDa) | Đ$_m$[b] | M$_n$[c] (KDa) | Đ$_m$[c] | T$_g$[d] (°C.) | Total Succinate Content[a] (%) | M$_1$ Succinate Content[a] (%) |
|---|---|---|---|---|---|---|---|---|
| PPM | 11 | 1.5 | 1.2 | — | — | — | 0 | 0 |
| PPMPS20 | 10 | 1.6 | 1.2 | — | — | — | 21 | 30 |
| PPMPS40 | 11 | 1.6 | 1.2 | — | — | — | 34 | 47 |
| PPF | 11 | 1.8 | 1.2 | 1.8 | 1.1 | −2.7 | 0 | 0 |
| PPFPS20 | 10 | 1.7 | 1.2 | 1.9 | 1.1 | −7.3 | 23 | 31 |
| PPFPS40 | 10 | 1.7 | 1.2 | 2.0 | 1.2 | 18.7 | 36 | 48 |

[a]Determined by $^1$H NMR spectroscopy (Total/M$_1$ Subunit).
[b]Determined by RI SEC in THF.
[c]Determined by MALS SEC in THF.
[d]Determined by differential scanning calorimetry.

The characterization of PPMPS and PPFPS copolymers synthesized by the one-pot method are shown in Table 2. Notably, lower, and more consistent Đ$_m$ values were seen in the reduction method (Đ$_m$=1.1-1.2) compared to those in the one-pot method (Đ$_m$=1.3-1.7), indicating that the post-polymerization reduction method avoids drawbacks intrinsic to the comonomer feed route.

TABLE 2

Characterization of PPMPS and PPFPS copolymers synthesized by the one pot method.

| Polymer | DP$_n$[a] | M$_n$[b] (KDa) | Đ$_m$[b] | T$_g$[c] (°C.) | Total Succinate Content[a] (%) |
|---|---|---|---|---|---|
| PPMPS20 | 12 | 1.6 | 1.3 | — | 16 |
| PPMPS40 | 10 | 1.4 | 1.7 | — | 32 |
| PPFPS20 | 11 | 1.8 | 1.4 | −6.9 | 26 |
| PPFPS40 | 10 | 1.4 | 1.6 | −13.6 | 42 |

Figure 25:
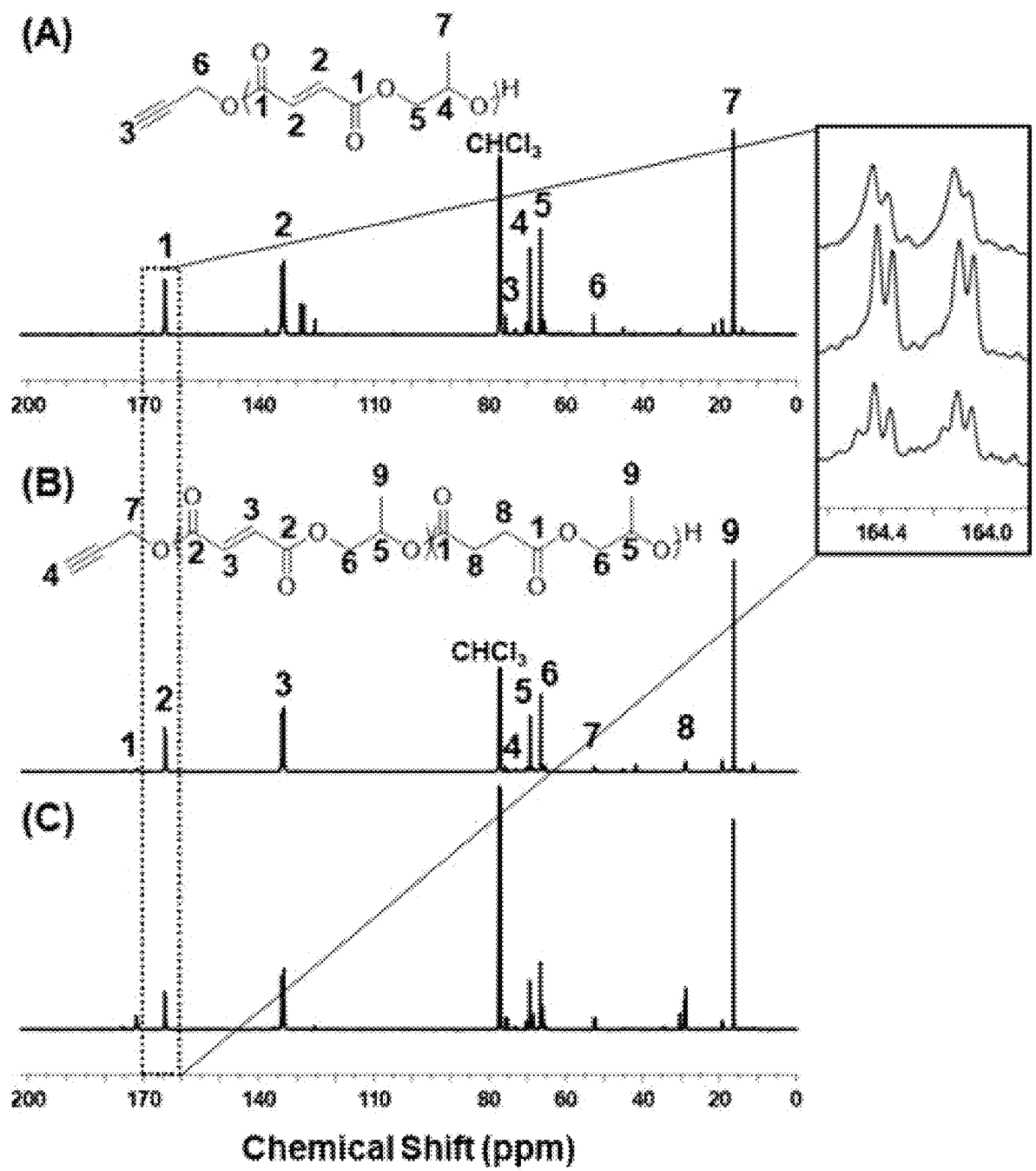
FIG. 25 is a comparison of $^{13}$C NMR spectra (CDCl$_3$) of (A) PPF, (B) PPFPS20, and (C) PPFPS40. (Inset) Magnification of the carbonyl carbon resonance at δ=164-165 ppm displaying significant peak broadening indicative of a random copolymer structure.
Figure 26:
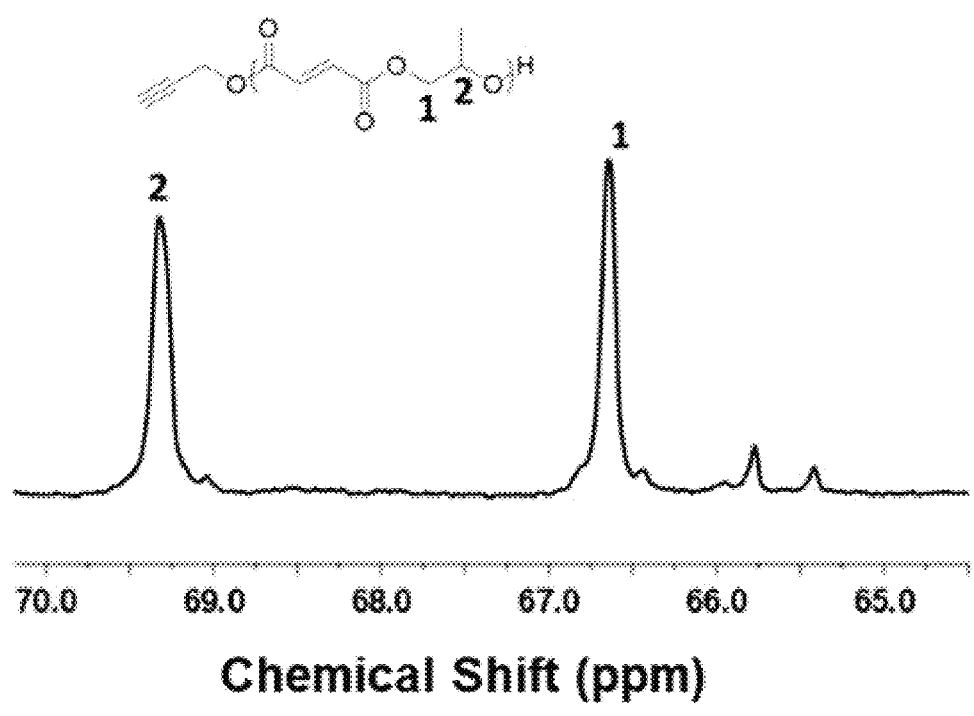
FIG. 26 is an annotated $^{13}$C NMR spectra (CDCl$_3$) of poly(propylene fumarate) propylene resonances.
Figure 27:
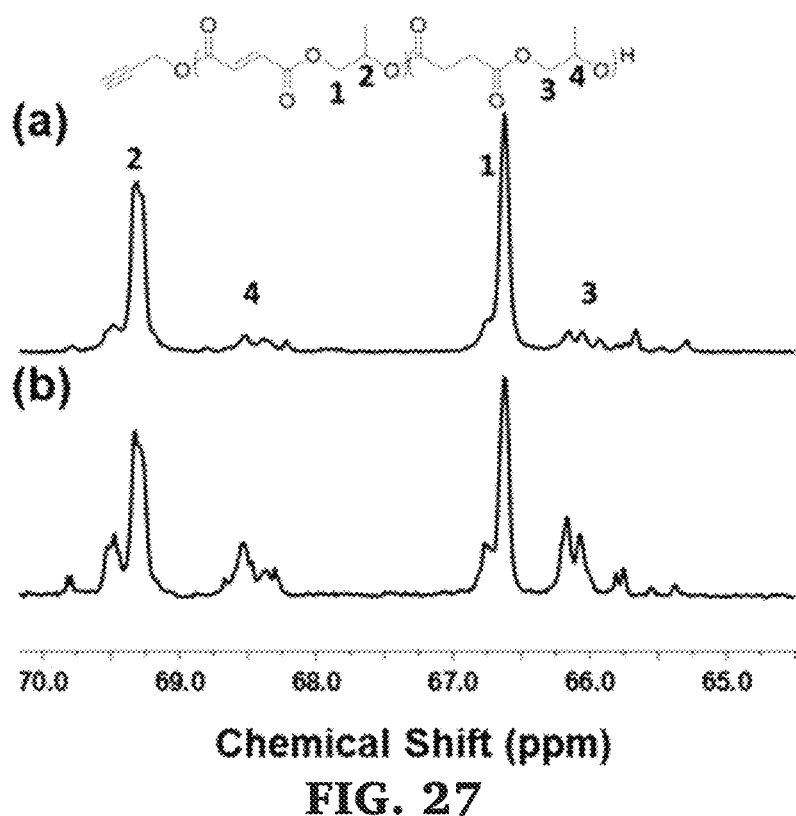
FIG. 27 is an annotated $^{13}$C NMR spectra (CDCl$_3$) of poly(propylene fumarate-co-propylene succinate) propylene resonances containing (a) 20% and (b) 40% succinate content.

[a]Determined by $^1$H NMR spectroscopy (Total/M$_1$ Subunit)
[b]Determined by RI SEC in THF
[c]Determined by RI SEC in THF To further elucidate the copolymer structure, $^{13}$C NMR spectroscopy was used to evaluate PPF, PPFPS20, and PPFPS40 (FIG. 25). The successful reduction of alkenes present in maleate to succinate was confirmed by the appearance of resonances at δ=171.8 ppm and δ=28.9 ppm corresponding to the succinate carbonyl and succinate methylene units, respectively. Furthermore, the appearance of a significant shoulder and broadening in the carbonyl carbon resonances in maleate indicates a random copolymer structure as displayed in the inset in FIG. 25. A similar effect was observed in the propylene methine and methylene resonances at δ=65.5-70.0 ppm wherein broad, bimodal character was observed in the polymers with increasing succinate content (FIGS. 26-27).

Figure 28:
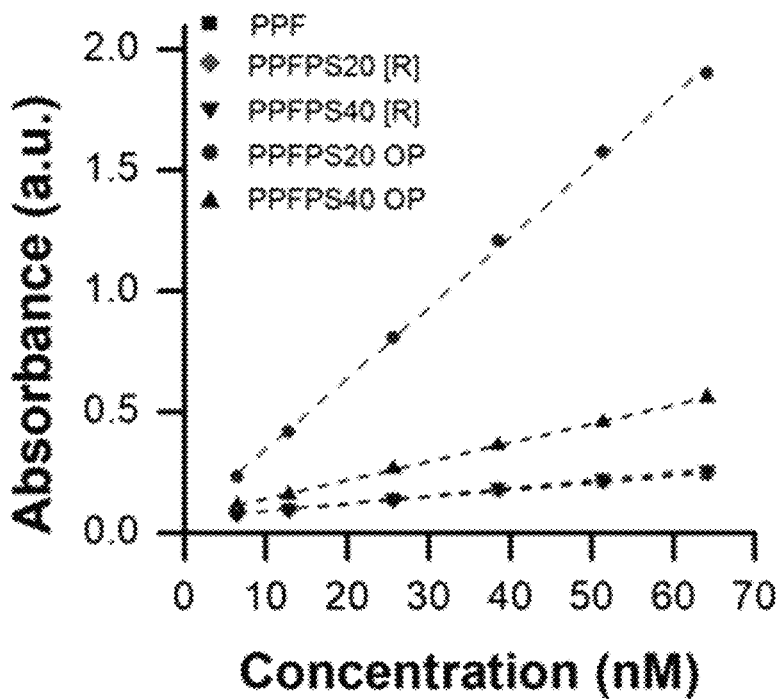
FIG. 28 is a graph showing UV-visibility absorbance profiles of (■) PPF, (♦) PPFPS20 and (▼) PPFPS40 as synthesized by the post-polymerization Zn/AcOH reduction [R] method, and (●) PPFPS20 and (▲) PPFPS40 synthesized by the three monomer one-pot (OP) method.

Qualitatively, it was observed that batches of PPFPS synthesized by reduction were consistently lighter in color as compared to those synthesized by the previous one-pot method. To quantify this, UV-visible spectroscopy was used to determine the molar extinction coefficients (ε) of PPF and batches of PPFP20 and PPFPS40 synthesized by each method (FIG. 28) at several different polymer concentrations. Emission at λ=400 nm was chosen as this closely matches the excitation λ of most DLP systems, wherein a low ε would be advantageous within a resin system as it allows light to penetrate the reservoir. Greater light penetration affords more efficient printing as more energy is absorbed by the photoinitiators per unit volume.

Results of the UV-visible spectroscopy experiments demonstrate that the ε values of PPF (ε=3.02 $M^{-1}$ $cm^{-1}$), PPFPS$_{20}$ (ε=3.14 $M^{-1}$ $cm^{-1}$), and PPFPS$_{40}$ (ε=3.31 $M^{-1}$ $cm^{-1}$) prepared by the reduction methods of the present invention are significantly lower at equivalent polymer concentrations and more consistent than the PPFPS20 (ε=30.5 $M^{-1}$ $cm^{-1}$) and PPFPS$_{40}$ (ε=8.08 $M^{-1}$ $cm^{-1}$) prepared by the one-pot method. The similar ε values of PPF to PPFPS copolymers synthesized through the reduction method indicate that this procedure can circumvent intrinsic discoloration and high ε issues present in the one-pot method.

Figure 29A:
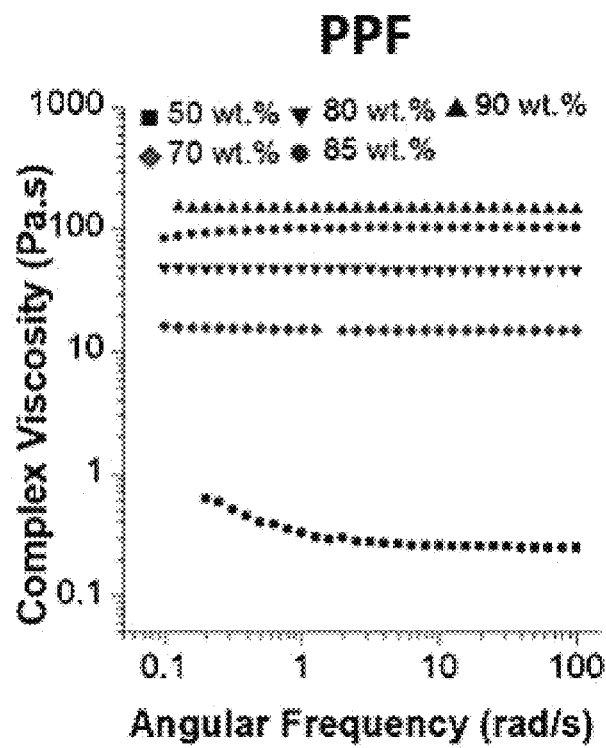
FIGS. 29A-C are graphs showing complex viscosities of poly(propylene fumarate) (PPF) (FIG. 28A) and poly(propylene fumarate-co-propylene succinate) (PPFPS) copolymers at 20 wt. % (FIG. 29B) and 40 wt. % (FIG. 29C) succinate loadings in diethyl fumarate.
Figure 29B:
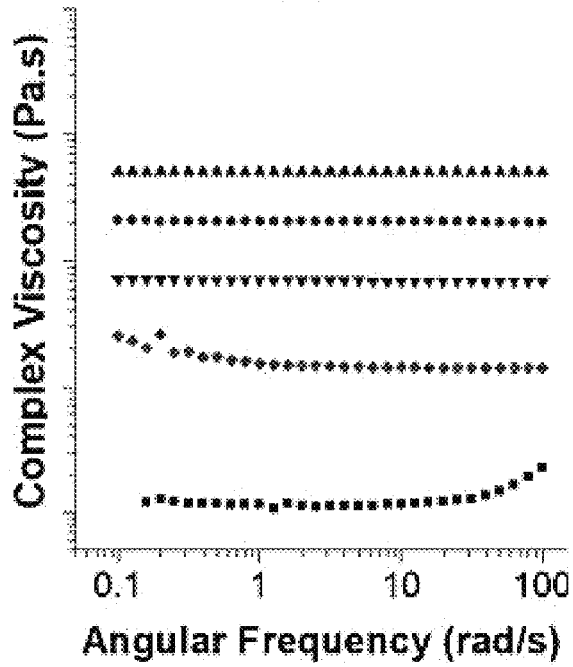
Figure 29C:
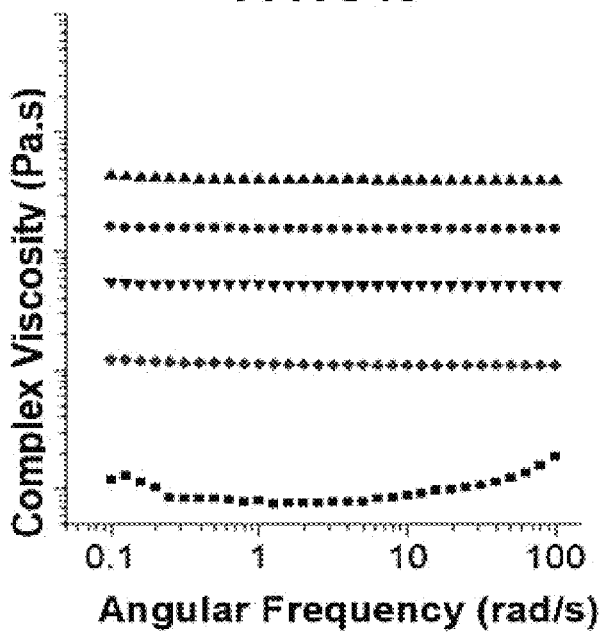
Figure 30:
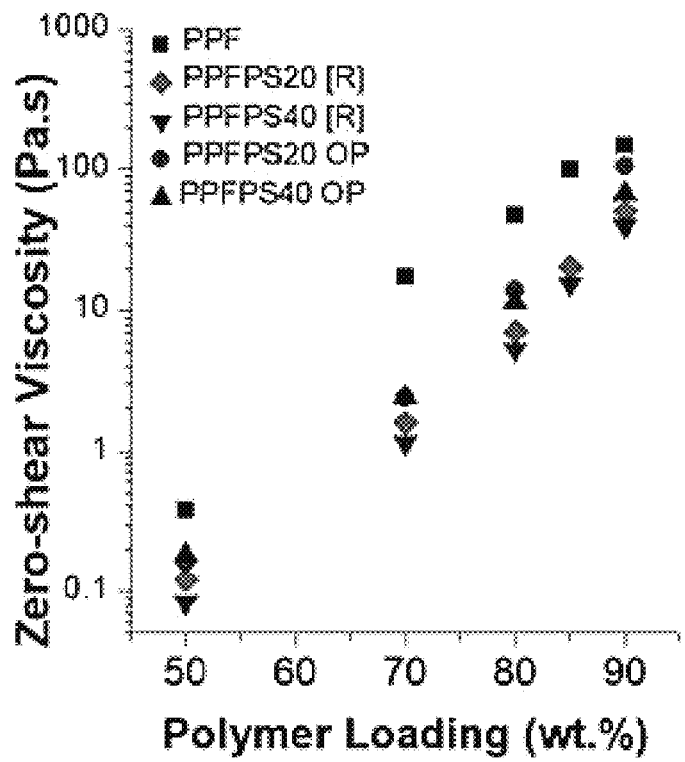
FIG. 30 is graph comparing zero-shear viscosities of (■) PPF and poly(propylene fumarate-co-propylene succinate) copolymers by the reduction method containing (♦) 20% and (▼) 40% succinate or the by one-pot method containing (●) 20% succinate and (▲) 40% succinate at various weight loadings in diethyl fumarate.

Next, complex viscosities of PPF and PPFPS at various wt. % in DEF were measured (FIGS. 29A-C) and the zero-shear viscosities were calculated by extrapolation (FIG. 30) to zero frequency. Both PPF and PPFPS copolymers show decreasing viscosities with increasing DEF content. As expected, PPFPS$_{40}$ displays a lower viscosity profile at each wt. % loading as compared to PPFPS20 or unmodified PPF, confirming the viscosity reducing characteristics of SA incorporation. Zero-shear viscosities at polymer loadings up to 80 wt. % in DEF were under the empirically derived CLIP printing limit of 10 Pa·s, allowing the PPFPS polymers to be printed with increased loadings of 30 wt. % and 10 wt. % as compared to PPF and the one-pot PPFPS synthesis, respectively. The results of the rheological investigation are summarized in Table 3.

TABLE 3

Zero shear viscosities (Pa · s) of PPF and PPFPS copolymers at various wt. % loading in DEF as synthesized by the reduction ([R]) and one-pot (OP) methods.

| Polymer | wt. % Polymer in DEF | | | | |
|---|---|---|---|---|---|
| | 50% | 70% | 80% | 85% | 90% |
| PPF | 0.38 | 17.4 | 47.7 | 99.8 | 150 |
| PPFPS20 [R] | 0.12 | 1.6 | 7.1 | 20.5 | 50.5 |
| PPFPS40 [R] | 0.08 | 1.1 | 5.3 | 15.6 | 40.4 |
| PPFPS20 OP | 0.16 | 2.4 | 13.8 | — | 110 |
| PPFPS40 OP | 0.18 | 2.4 | 11.4 | — | 68 |

Figure 31:
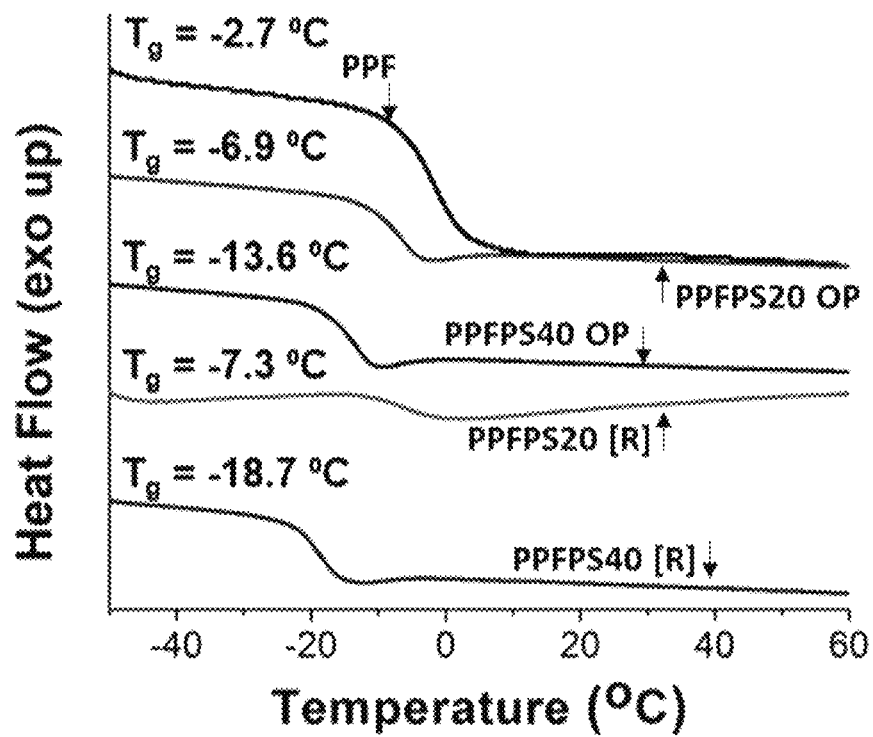
FIG. 31 Differential scanning calorimetry thermograms of poly(propylene fumarate), poly(propylene fumarate-co-propylene succinate containing 20% and 40% succinate as synthesized by the one-pot method (OP), and poly(propylene fumarate-co-propylene succinate) containing 20% and 40% succinate as synthesized by the reduction method.

To examine the origin of the viscosity reduction in the succinate containing copolymers, differential scanning calorimetry (DSC) was used to determine the glass transition temperature ($T_g$) of PPF and PPFPS copolymers (FIG. 31). The results of the DSC experiments show a decreasing $T_g$ with increasing succinate content, where PPF showed a $T_g$ of −2.7° C. while the randomly reduced PPFPS20 and PPFPS40 showed $T_g$ values of −7.3° C. and −18.7° C., respectively. Additionally, the $T_g$ values of the PPFPS copolymers synthesized by the reduction method show a slight decrease in $T_g$ compared to their one-pot analogues containing 20% ($T_g$=−6.9° C.) and 40% ($T_g$=−13.6° C.) succinate content. Thus, the lower viscosity properties of the reduced PPFPS copolymers can be attributed to lowered $T_g$ values by random incorporation of succinate units in the polymer chain.

Figure 32:
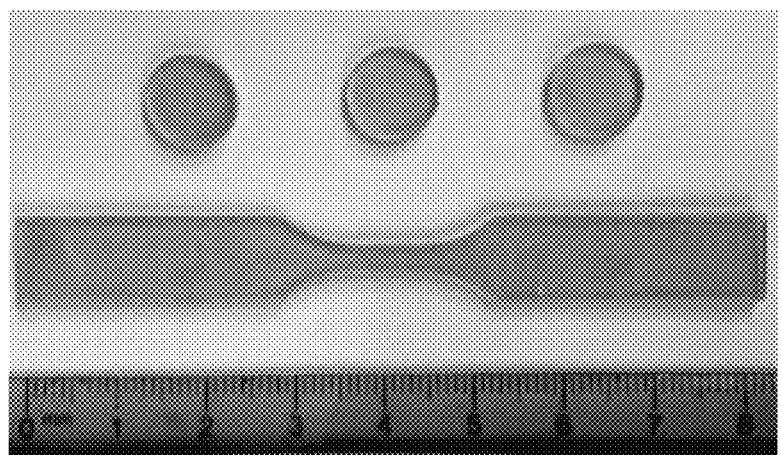
FIG. 32 is an image showing 3D-printed tensile bar and discs (h=2 mm) printed using poly(propylene fumarate-co-propylene succinate) according to embodiments of the present invention containing 20% succinate at 50 wt. % in diethyl fumarate.
Figure 33A:
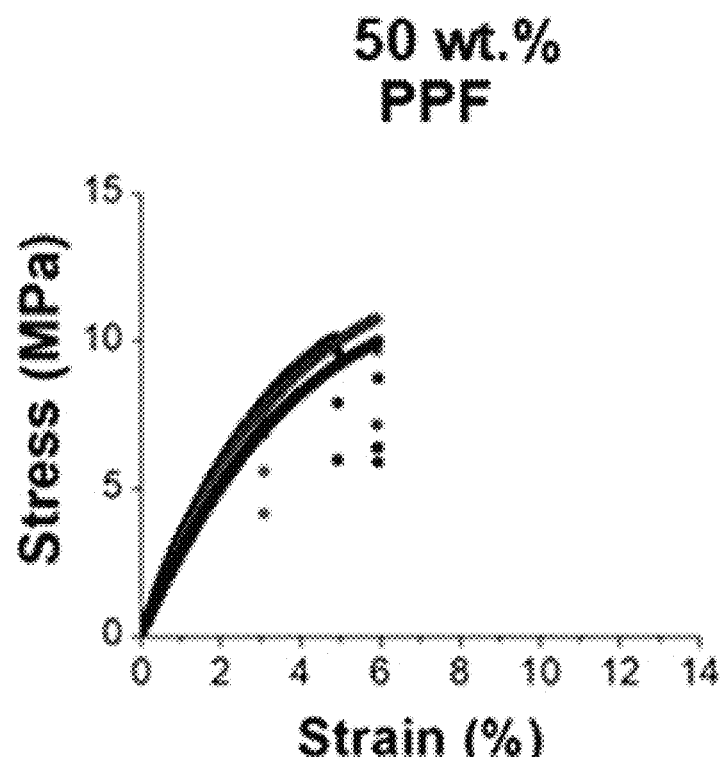
FIGS. 33A-C are stress-strain curves poly(propylene fumarate) (FIG. 33A) and poly(propylene fumarate-co-propylene succinate) (FIGS. 33B-C) polymers 3D printed at 50 wt. % loading in diethyl fumarate.
Figure 33B:
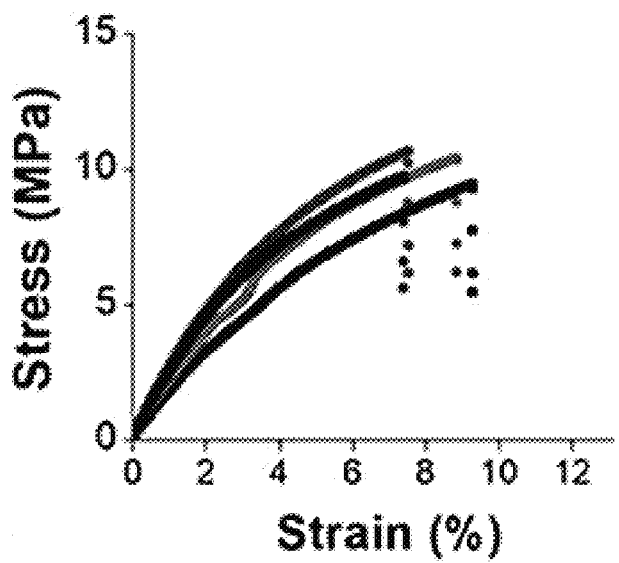
Figure 33C:
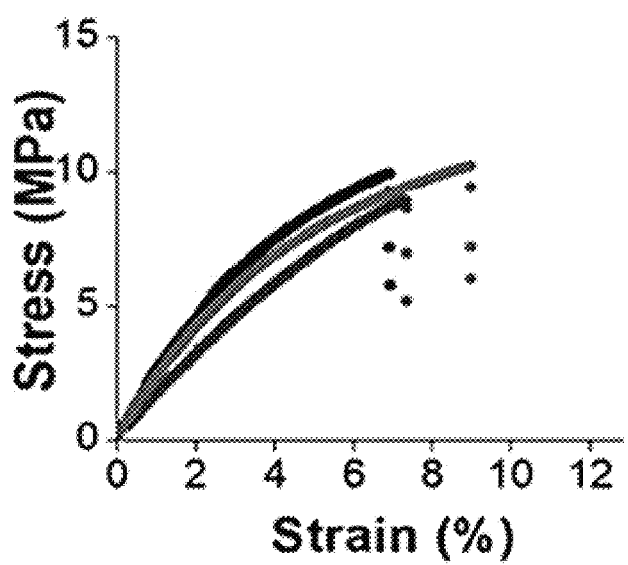
Figure 34A:
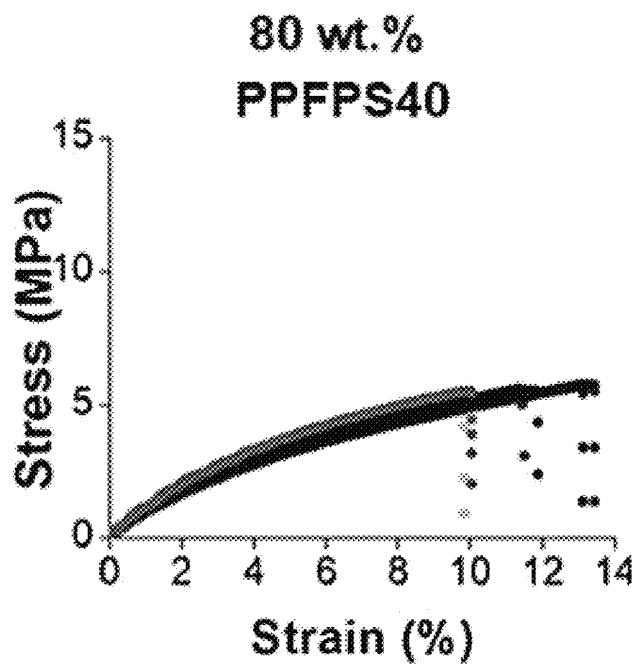
FIGS. 34A-B are stress-strain curves poly(propylene fumarate-co-propylene succinate) polymers containing 20% succinate (FIG. 34A) and 40% succinate (FIG. 34B) 3D printed at 80 wt. % loading in diethyl fumarate.
Figure 34B:
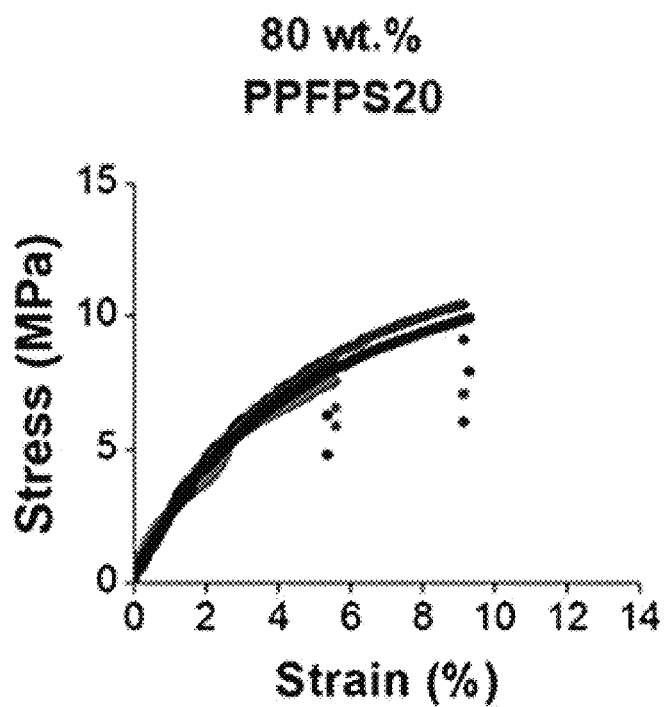

CLIP was then used to print discs (H=2 mm, D=10 mm) and tensile bars according to ASTM D638 type V (FIG. 32) on a Carbon M2 printer. The tensile properties of 3D-printed PPF and PPFPS were investigated under typical PPF resin formulations (50 wt. % in DEF) and at resin formulations with maximum loadings for the PPFPS systems (80 wt. % in DEF) (FIGS. 33A-C, 34A-B). The elastic modulus ($E_o$) was calculated as the slope of the linear region over 1-3% strain as determined by a video extensometer. At 50 wt. % loadings, the $E_o$ is significantly lower for the PPFPS20 (158±25 MPa) and PPFPS40 (165±22 MPa) than for PPF (217±10 MPa). The ultimate tensile strength (UTS) is 9.5±1.6 MPa for PPF, 10.1±0.6 MPa for PPFPS20, and 9.7±0.7 MPa for PPFPS40 at 50 wt. % loading, showing no significant difference between each sample. The extension at break ($\varepsilon_{break}$) for PPF ($\varepsilon_{break}$=5.0±1.3%) is significantly lower than both for PPFPS20 ($\varepsilon_{break}$=8.3±1.0%) and for PPFPS40 ($\varepsilon_{break}$=7.8±1.1%) at 50 wt. % loading. While these results show that at 50 wt. % polymer loading both PPFPS systems had higher $\varepsilon_{break}$ values and had a lower $E_o$ than PPF, there is no significant difference between PPF and PPFPS polymer systems regarding the UTS. Furthermore, there is no significant difference between the PPFPS20 and PPFPS40 specimens in $E_o$, UTS, or $\varepsilon_{break}$.

Figure 35:
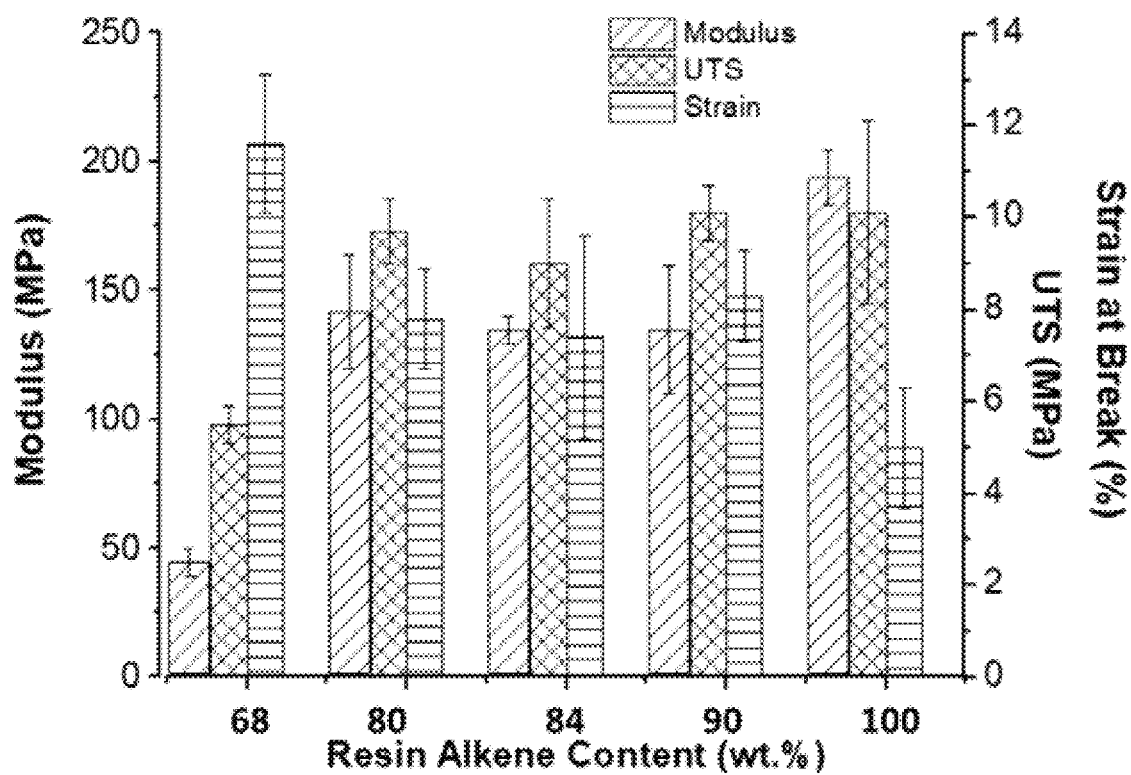
FIG. 35 is a graph comparing mechanical properties of poly(propylene fumarate) and poly(propylene fumarate-co-propylene succinate) copolymers as a function of total cross-linkable alkene content in each resin formulation.

While PPFPS20 showed no mechanical dependence on DEF content, PPFPS40 saw a significant lowering of $E_o$ and UTS values and a corresponding increase in $\varepsilon_{break}$ at 80 wt. % compared to 50 wt. % loading. Comparing the mechanical properties of PPFPS40 printed at 50 wt. % and at 80 wt. % in DEF, $E_o$ decreased from 165±22 MPa to 68±5.3 MPa and the UTS decreased from 9.7±0.7 MPa to 5.5±0.4 MPa, while the $\varepsilon_{break}$ increased from 7.8±1.1% to 11.6±1.5%. To justify the mechanical data obtained, the mechanical properties can be presented as a function of total cross-linkable alkene content in the resin (FIG. 35). The results of the mechanical testing are summarized in Table 4.

TABLE 4

Tensile mechanical properties of PPF and PPFPS containing 20% or 40% succinate content printed at 50 wt. % or 80 wt. % polymer loading in DEF.

| | 50 wt. % Polymer | | | 80 wt. % Polymer | | |
|---|---|---|---|---|---|---|
| Polymer | $E_o$ (MPa) | $\varepsilon_{break}$ (%) | UTS (MPa) | $E_o$ (MPa) | $\varepsilon_{break}$ (%) | UTS (MPa) |
| PPF | 217 ± 11 | 5.0 ± 1.3 | 10.1 ± 2.0 | — | — | — |
| PPFPS20 | 158 ± 25 | 8.3 ± 1.0 | 10.1 ± 0.6 | 158 ± 5.3 | 7.4 ± 2.2 | 9.0 ± 1.4 |
| PPFPS40 | 165 ± 22 | 7.8 ± 1.1 | 9.7 ± 0.7 | 68 ± 5.3 | 11.6 ± 1.5 | 5.5 ± 0.4 |

Figure 36:
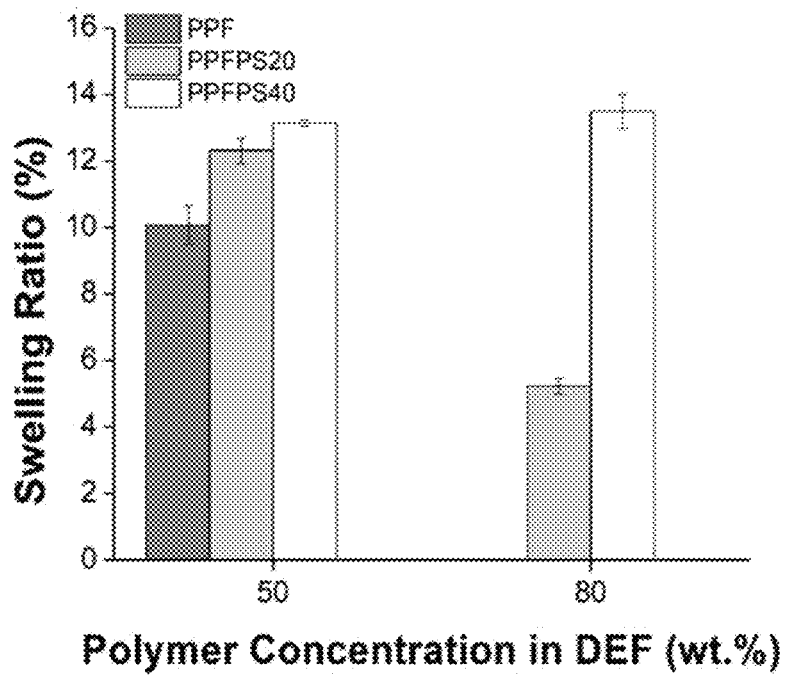
FIG. 36 is a graph showing swelling ratios of 3D printed discs of (dark grey) poly(propylene fumarate) and poly (propylene fumarate-co-propylene succinate) polymers containing (grey) 20% and (white) 40% succinate content as a function of wt. % loading in diethyl fumarate.

To probe the origin of the mechanical differences, swelling ratios (SR) were measured according to previous reports and methodologies. See, e.g., Fisher, J. P.; Dean, D.; Mikos, A. G., Photocrosslinking characteristics and mechanical properties of diethyl fumarate/poly(propylene fumarate) biomaterials. *Biomaterials* 2002, 23 (22), 4333-4343 and Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosures of which are incorporated herein by reference in their entirety.) Increased swelling ratio values of PPFPS20 (12.3±0.4%) and PPFPS40 (13.1±0.1%) at 50 wt. % compared to PPF (10.1±0.6%) indicates lower cross-link density as the cause of the lower modulus. However, at 80 wt. %, the SR of PPFPS20 (5.2±0.2%) decreased significantly while PPFPS40 (13.5±0.5%) remained constant (FIG. 36). A direct comparison of the swelling ratio values between wt. % loadings is not applicable given the significant reliance on polymer-polymer cross-linking at 80 wt. %. However, the sharp decrease in the swelling ratio of PPFPS20 demonstrates that solely increasing succinate content does not significantly alter the mechanical properties. Comparatively, PPFPS40 has significantly less cross-linking in addition to a higher mechanical contribution of succinate. This is corroborated by examining the modulus as a function of alkene content shown in FIG. 35.

To further elucidate the mechanical property differences between formulations, crosslink densities were assessed by calculating the mass between crosslinks ($M_c$) for each of the printed materials (See, Table 5; See also, Eq. 3, below).

TABLE 5

Calculated $M_c$ of 3D printed discs of PPF and PPFPS at various resin formulations.

| | wt. % of polymer in the resin | φ | $M_c$ |
|---|---|---|---|
| PPF | 50 | 10.1 | 50 |
| PPFPS20 | 50 | 12.3 | 59 |
| PPFPS20 | 80 | 13.1 | 63 |
| PPFPS40 | 50 | 5.2 | 31 |
| PPFPS40 | 80 | 13.5 | 64 |
| PPFPS20 OP | 50 | 11.7 | 56 |
| PPFPS40 OP | 50 | 11.9 | 57 |

Using PPF printed at 50 wt. % in DEF as a baseline, the molecular mass between crosslinks was calculated to be 50 Da. When printing PPFPS20 and PPFPS40 copolymers at 50 wt. % in DEF, the $M_c$ values increased to 59 Da and 63 Da, respectively, indicating that the lowered mechanical strength is due largely to decreased crosslink densities. However, when printing PPFPS20 at 80 wt. % in DEF, $M_c$ decreased dramatically to 31 Da. Given that the mechanical properties were nearly identical at 50 wt. % and 80 wt. % in DEF, this implies that the succinate content in PPFPS20 prints was not significant enough to affect the material properties. The increased crosslink density likely resulted from a reliance on polymer-polymer crosslinks, which in turn resembles the PPFPS20/DEF network at 50 wt. %.

However, when comparing PPFPS20 printed at 50 wt. % ($M_c$=63 Da) and 80 wt. % ($M_c$=64 Da), no significant difference was seen in the $M_c$ values. Thus, while the PPFPS40 network at 80 wt. % also requires significant polymer-polymer crosslinking, the contribution of succinate monomers in the network is enough to affect the modulus and UTS values with a subsequent increase in the $\varepsilon_{break}$. The smaller values of $M_c$ compared to the molecular weight of the polymer repeat units are attributed to the high crosslinking within the networks and the nature of crosslinking that go through carbon-carbon bond of alkenes of PPF and DEF.

This is believed to be the first example of a Zn/AcOH mediated Clemmensen reduction of alkenes in a degradable polyester. The solvent was shown to significantly impact the regioselectivity and conversion of the reduction along the polymer backbone. The PPFPS polymers synthesized by this method show improved properties over the previous one-pot method including lower viscosities and molar extinction coefficient profiles, both of which are critical to 3D printability. Resins were printable at increased polymer content (80 wt. %) in DEF compared to PPF and PPFPS systems used previously, and the mechanical properties of 3D-printed objects were tunable based on the total crosslinking content available in the print. Lastly, this system allows for efficient post-polymerization variation in succinate content, removing the need for multiple polymerizations.

EXAMPLES

The following examples are offered to illustrate the invention more fully but are not to be construed as limiting the scope thereof. Further, while some of examples may include conclusions about the way the invention may function, the inventors do not intend to be bound by those conclusions but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

All reagents were purchased from Sigma-Aldrich. Solvents (ACS grade) were purchased from Fisher. Anhydrous, degassed solvents were prepared from distillation over CaH2 followed by three freeze-pump-thaw cycles. Propylene oxide and propargyl alcohol were purified by distillation over CaH2. All other chemicals were used as received.

Characterization

Proton ($^1$H NMR, 500 MHz) and carbon ($^{13}$C NMR, 125 MHz) nuclear magnetic resonance spectra were recorded using a Bruker AVANCE NEO NMR spectrometer. Chemical shifts were recorded in parts per million (ppm) relative to the chloroform solvent at δ=7.26 ppm.

Size exclusion chromatography was performed using an HLC-8420GPC (Tosoh Bioscience) equipped with a TSKgel GMHHR-M column with THF as the eluent at a flow rate of 0.35 mL/min. Molecular masses and molecular mass distributions were determined against polystyrene standards using a refractive index (RI) detector. Light scattering experiments were performed using a Wyatt Dawn EOS multi-angle light scattering (MALS) detector. The dn/dc values were calculated by the integration of the RI signal assuming 100% mass recovery.

UV-visible spectra were recorded in a 96-well quartz plate on a BioTek Synergy HTX Multi-Mode Reader. Absorbances were recorded in 10 nm intervals over 300-500 nm wavelengths and molar extinction coefficients were determined at 400 nm.

Complex viscosity measurements were collected using a Discovery HR2 rheometer (TA instruments). Resin formulations were placed between 25 mm diameter parallel plates and a frequency sweep was performed from 0.1 rad/s to 100 rad/s at 25° C. under 10% strain. The zero-shear viscosity was calculated by extrapolation to the y-intercept.

Resins were 3D-printed on a Carbon-3D M2 printer (Redwood City, CA) and post-cured for 5 minutes in a B9Creations Model Cure UV-oven.

Example 1

Synthesis of Mg(BHT)$_2$(THF)$_2$ Catalyst

Prior Art

Using standard Schlenk techniques, an oven-dried 1 L, 2-neck round-bottom flask equipped with a stir bar was cooled under vacuum and back-filled with N$_2$. To the flask was added 2,6-bis(1,1-dimethylethyl)-4-methylphenol (BHT) (6.61 g, 30.0 mmol, 2 eq.) and the BHT was dried under vacuum for 2 hours. The BHT was dissolved in anhydrous degassed THF (20.00 mL, 246 mmol, 16 eq.) and cooled to 0° C. Using an oven-dried addition funnel, n-butyl-sec-butylmagnesium (21.4 mL, 0.7 M in hexane, 15 mmol) was added drop-wise to maintain the temperature below 20° C. After the addition was complete the reaction was warmed to room temperature and stirred for 1 hour. The residual THF was removed under reduced pressure and the catalyst was dried under vacuum overnight to yield a white solid.

Example 2

Synthesis of Poly(Propylene Maleate) (PPM)

Prior Art

PPM was synthesized as previously reported. (See, Wilson, J. A.; Luong, D.; Kleinfehn, A. P.; Sallam, S.; Wesdemiotis, C.; Becker, M. L., Magnesium Catalyzed Polymerization of End Functionalized Poly(propylene maleate) and Poly(propylene fumarate) for 3D Printing of Bioactive Scaffolds. *J. Am. Chem. Soc.* 2018, 140 (1), 277-284, the disclosure of which is incorporated herein by reference in its entirety). Under an inert atmosphere the Mg(BHT)$_2$(THF)$_2$ catalyst of Example 1 was dissolved in anhydrous degassed toluene (425 mL) and anhydrous degassed propylene oxide (105 mL, 1.50 mol) was added. Anhydrous, degassed propargyl alcohol initiator (8.66 mL, 0.15 mol) was added, followed by the addition of powdered maleic anhydride (147.0 g, 1.50 mol). The reaction was heated to 80° C. to begin the polymerization, and aliquots were removed to check conversion of the maleic anhydride. Upon full conversion (ca. 45 h), the polymerization was cooled and quenched by the addition of 3 mL of CHCl$_3$. The polymer was precipitated into cold hexanes and dried to afford a yellow-orange viscous liquid. $^1$H NMR: (500 MHz, CDCl$_3$), δ (ppm): 6.34-6.24 (m, 20H, OC(=O)—CH=CH—C(=O)O), 5.32-5.22 (s, br, 10H CH$_2$—CH(CH$_3$)—O), 4.78 (s, HC≡C—CH$_2$—O), 4.35-4.24 (m, 20H, CH$_2$CH(CH$_3$)O), 2.54 (s, 1H, HC≡C—CH$_2$—O), 1.35-1.32 (d, 30H, CH$_3$). $^{13}$C NMR: (125 MHz, CDCl$_3$), δ (PPM): 166.7 (C=O), 131.6 (OC(=O)—CH=CH—C(=O)O), 75.8 (HC≡C—CH$_2$), 70.1 (CH$_2$CH(CH$_3$)O), 69.1 (CH$_2$CH(CH$_3$)O), 51.1 (HC≡C—CH$_2$), 16.2 (CH$_3$).

Example 3

Isomerization of Poly(Propylene Maleate) to Poly(Propylene Fumarate) (PPF)

Prior Art

Poly(propylene maleate) (10.00 g, 6.18 mmol, 61.8 mmol alkene) was dissolved in 40 mL of CHCl$_3$. Diethylamine (0.96 mL, 9.28 mmol, 0.15 eq to alkene) was added and the mixture was refluxed overnight. After full conversion, the solution was washed twice with saturated sodium phosphate buffer (pH=6) and concentrated under reduced pressure to afford poly(propylene fumarate). $^1$H NMR: (500 MHz, CDCl$_3$), δ (PPM): 6.84-6.64 (m, OC(=O)—CH=CH—C(=O)O), 5.32-5.22 (s, br, 10H CH$_2$—CH(CH$_3$)—O), 4.78 (s, HC≡C—CH$_2$—O), 4.35-4.24 (m, 20H, CH$_2$CH(CH$_3$)O), 2.54 (s, 1H, HCCCH$_2$), 1.35-1.32 (d, 30H, CH$_3$). $^{13}$C NMR: (125 MHz, CDCl$_3$), δ (PPM): 164.3 (C=O), 133.7 (OC(=O)—CH=CH—C(=O)O), 75.7 (HC≡C—CH$_2$), 69.3 (CH$_2$CH(CH$_3$)O), 66.6 (CH$_2$CH(CH$_3$)O), 52.8 (HC≡C—CH$_2$), 16.4 (CH$_3$).

Example 4

Synthesis of Poly(Propylene Maleate-Co-Propylene Succinate) (PPMPS

Prior Art

PPMPS was synthesized as previously reported. (See, Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosure of which is incorporated herein by reference in their entirety.) Under an inert atmosphere the Mg(BHT)$_2$(THF)$_2$ catalyst of Example 1, above (0.35 g, 0.572 mmoles) was dissolved in anhydrous degassed toluene (16.4 mL) and anhydrous degassed propylene oxide (4.00 mL, 57.2 mmoles) was added. Anhydrous, degassed propargyl alcohol initiator (0.66 mL, 5.72 mmoles) was added, followed by the addition of powdered maleic anhydride (5.05 g, 51.4 mmoles). The reaction was heated to 80° C. to begin the polymerization, and aliquots were removed to check conversion of the maleic anhydride. Upon full conversion (ca. 45 h), the polymerization was cooled and quenched by the addition of 1 mL of $CHCl_3$. The polymer was precipitated into cold hexanes and dried to afford a yellow-orange viscous liquid. $^1$H NMR: (500 MHz, $CDCl_3$), δ (ppm): 6.34-6.24 (m, 16H, OC(=O)—CH=CH—C(=O)O), 5.32-5.22 (s, br, 10H $CH_2$—CH($CH_3$)—O), 4.78 (s, HC≡C—$CH_2$—O), 4.35-4.24 (m, 20H, $CH_2CH(CH_3)O$), 2.66 (m, 8H, OC(=O)—$CH_2$—$CH_2$—C(=O)O), 2.54 (s, 1H, HC≡C—$CH_2$—O), 1.35-1.32 (d, 30H, $CH_3$).

Example 5

Method 1: Reduction in Glacial Acetic Acid

Poly(propylene maleate) (65.00 g, 47.1 mmoles, 471 mmoles alkene) was dissolved in 600 mL of glacial acetic acid in a 1 L Erlenmeyer flask. Zinc dust (typically 0.5-5.0 equivalents to the alkene) was added to the solution and the flask was covered with foil. The reaction mixture was sonicated for the desired amount of time (typically 1-60 minutes). The reaction was diluted with chloroform and filtered into a separatory funnel. Water was added until phase separation occurred, and the organic layer was extracted. The aqueous layer was further extracted with dichloromethane or chloroform and the combined organic layer was washed with saturated aqueous $NaHCO_3$ until no gas formation was seen. The organic layer was then washed with brine, dried over sodium sulfate, and the solvent removed under reduced pressure. (See FIG. 4, 5A-B).

Example 6

Method 2: Reduction in DCM or $CHCl_3$ Cosolvent

Poly(propylene maleate) (65.00 g, 47.1 mmoles, 471 mmoles alkene) was dissolved in 300 mL of dichloromethane or chloroform in a 1 L Erlenmeyer flask and 300 mL of glacial acetic acid was added. Zinc dust (typically 0.5-5.0 equivalents to the alkene) was added to the solution and the flask was covered with foil. The reaction mixture was sonicated for the desired amount of time (typically 1-60 minutes). The mixture was filtered and diluted with water until phase separation occurred. The aqueous layer was extracted with dichloromethane or chloroform and the combined organic layer was washed with saturated aqueous $NaHCO_3$ until no gas formation was seen. The organic layer was then washed with brine, dried over sodium sulfate, and the solvent removed under reduced pressure or the organic layer was brought through subsequent reactions in chloroform. (See FIGS. 6, 7A-B).

Example 7

Method 3: Reduction in Toluene Cosolvent

To poly(propylene maleate) (65.00 g, 47.1 mmoles, 471 mmoles alkene) in 300 mL of toluene in a 1 L Erlenmeyer flask was added 300 mL of glacial acetic acid. Zinc dust (typically 0.5-5.0 equivalents to the alkene) was added to the solution and the flask was covered with foil. The reaction mixture was sonicated for the desired amount of time (typically 1-60 minutes). The mixture was filtered and diluted with aqueous sodium chloride until phase separation occurred and the organic layer was further washed with aqueous $NaHCO_3$ to remove residual acetic acid. The product was either precipitated into cold diethyl ether or brought through subsequent reactions in toluene. (See, FIGS. 8A-B, 9A-C]).

Example 8

Isomerization of Poly(Propylene Maleate-Co-Succinate) to Poly(Propylene Fumarate-Co-Succinate (Method 4)

Poly(propylene maleate-co-succinate) (1.0 g, ~5.25 mmoles alkene) was dissolved into chloroform (typically ~10 mL). Diethylamine (84 μL, ~0.15 mol. eq. to olefin) was added to the solution and refluxed for 24 h under a nitrogen atmosphere. After cooling to room temperature, the organic solution was washed with phosphate buffer solution (150 mL, pH=6) and the polymer was either dried or recovered through precipitation from hexanes. (See FIG. 10).

Example 9

Characterization of Reduction of Poly(Propylene Maleate): (Methods 1-3

NMR spectra were recorded using a Varian NMRS 500 spectrometer in $CDCl_3$. All chemical shifts were recorded in parts per million (ppm) relative to the reference peak of chloroform solvent at δ=7.26. The reduction progress was determined by comparing the integrations of two sets of peaks. First, the maleate alkene peak (δ=6.28 ppm) was compared to the succinate $CH_2$ peak (δ=2.66 ppm). Second, the methylene peaks on the propargyl initiator group were compared. A reduction at the first monomer unit results in a shift of the methylene peak from δ=4.78 ppm to δ=4.70 ppm. (See FIGS. 1, 4, 6, 8A-B, 10, 11).

Example 10

Reduction of Poly(Propylene Fumarate) to Poly(Propylene Fumarate-Co-Succinate) (Method 5)

The reduction of poly(propylene fumarate) to poly(propylene fumarate-co-succinate) was performed as in methods 1 or 2 with poly(propylene fumarate) instead of poly(propylene maleate). Accordingly, the total succinate content was calculated by the $^1$H NMR integration of the trans alkene (δ=~6.84-6.64 PPM) in the fumarate groups compared to the $^1$H NMR integration of the reduced succinate methylene units (δ=2.66 PPM). (See FIGS. 6, 11).

Example 11

Characterization of UV-Vis Properties of Poly(Propylene Fumarate) and Poly(Propylene Fumarate-Co-Succinate) (Method 6)

Figure 37:
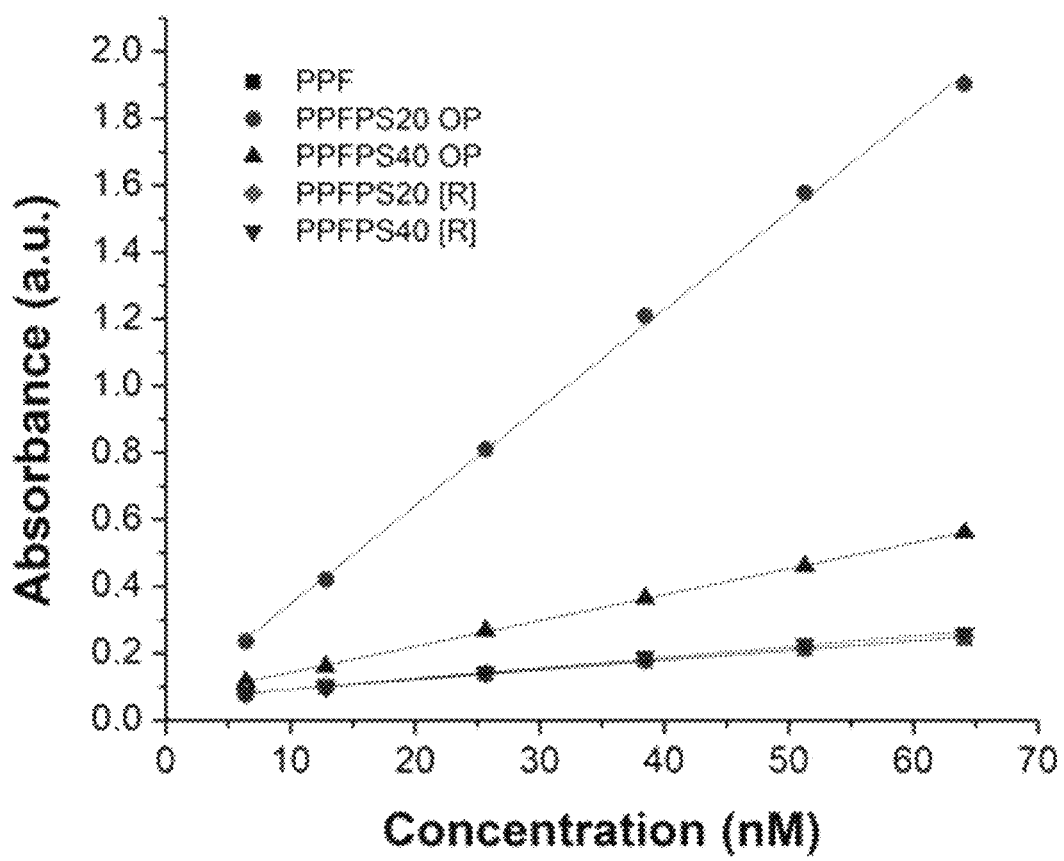
FIG. 37 is a graph showing an UV-vis analysis of poly (propylene fumarate) and poly(propylene fumarate-co-succinate) derivatives synthesized by the traditional one-pot method or the reduction as in methods 1-4. Absorbance data shown is at 400 nm wavelength, representing a commonly used wavelength for 3D-printing.

Poly(propylene maleate-co-succinate) (PPMS) derivatives were prepared by either the reduction method ("[R]") described in method 1 or the traditional three-monomer method to synthesize the PPMS copolymer, designated as the One-pot method. The PPMS polymers were then isomerized as in method 4 to afford poly(propylene fumarate-cosuccinate) (PPFS) with various succinate content. PPFS copolymers were then dissolved in CHCl$_3$ at a concentration of 100 mg/mL, and serial dilutions were prepared at 80, 60, 40, 20, and 10 mg/mL concentrations. To a 96-well quartz plate was added, in triplicate, 300 µL of the solutions and the UV-Vis absorbance was measured from 300 nm to 500 nm wavelengths in 10 nm increments on a BioTek Synergy Mx plate reader. The molar concentrations were calculated and plotted against absorbance at 400 nm. The slope was used to determine the molar extinction coefficient (ε). (See, FIG. 37).

TABLE 6

| Polymer | ε (M$^{-1}$cm$^{-1}$) | R$^2$ |
|---|---|---|
| PPF | 3.02 | 0.998 |
| PPFS20 One Pot | 30.5 | 0.999 |
| PPFS40 One Pot | 8.08 | 0.999 |
| PPFS20 [R] | 3.14 | 0.999 |
| PPFS40 [R] | 3.31 | 0.998 |

Table 6 shows the calculated molar extinction coefficients (ε) of PPF and PPFS derivatives synthesized by either the traditional one-pot method or the reduction method ([R]), where PPFS20 and PPFS40 indicate a total succinate content of 20% or 40%, respectively.

Example 12

Synthesis of Poly(Propylene Maleate-Co-Propylene Succinate) (PPMPS)

Prior Art

PPMPS was synthesized as previously reported. (See, Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosure of which is incorporated herein by reference in their entirety.) Under an inert atmosphere the Mg(BHT)$_2$(THF)$_2$ catalyst of Example 1, above (0.35 g, 0.572 mmoles) was dissolved in anhydrous degassed toluene (16.4 mL) and anhydrous degassed propylene oxide (4.00 mL, 57.2 mmoles) was added. Anhydrous, degassed propargyl alcohol initiator (0.66 mL, 5.72 mmoles) was added, followed by the addition of powdered maleic anhydride (5.05 g, 51.4 mmoles). The reaction was heated to 80° C. to begin the polymerization, and aliquots were removed to check conversion of the maleic anhydride. Upon full conversion (ca. 45 h), the polymerization was cooled and quenched by the addition of 1 mL of CHCl$_3$. The polymer was precipitated into cold hexanes and dried to afford a yellow-orange viscous liquid. $^1$H NMR: (500 MHz, CDCl$_3$), δ (ppm): 6.34-6.24 (m, 16H, OC(=O)—CH=CH—C(=O)O), 5.32-5.22 (s, br, 10H CH$_2$—CH(CH$_3$)—O), 4.78 (s, HC≡C—CH$_2$—O), 4.35-4.24 (m, 20H, CH$_2$CH(CH$_3$)O), 2.66 (m, 8H, OC(=O)—CH$_2$—CH$_2$—C(=O)O), 2.54 (s, 1H, HC≡C—CH$_2$—O), 1.35-1.32 (d, 30H, CH$_3$). See, Table 2, above.

Example 13

Isomerization of Poly(Propylene Maleate-Co-Propylene Succinate) to Poly(Propylene Fumarate-Co-Succinate) (PPFPS)

Poly(propylene maleate-co-succinate) (10.00 g, 6.18 mmol, 37.1 mmol alkene) was dissolved in 40 mL of CHCl$_3$. Diethylamine (0.58 mL, 5.57 mmol, 0.15 eq to alkene) was added and the mixture was refluxed overnight. After full conversion, the solution was washed twice with saturated sodium phosphate buffer (pH=6) and concentrated under reduced pressure to afford poly(propylene fumarate). $^1$H NMR: (500 MHz, CDCl$_3$), δ (PPM): 6.84-6.64 (m, 12H OC(=O)—CH=CH—C(=O)O), 5.32-5.22 (s, br, 10H CH$_2$—CH(CH$_3$)—O), 4.78 and 4.70 (s, HC≡C—CH$_2$—O), 4.35-4.24 (m, 20H, CH$_2$CH(CH$_3$)O), 2.70-2.62 (m, 16H OC(=O)—CH$_2$—CH$_2$—C(=O)O), 2.54 (s, 1H, HC≡C—CH$_2$—O), 1.35-1.32 (d, 30H, CH$_3$). $^{13}$C NMR: (125 MHz, CDCl$_3$), δ (PPM): 171.8 (C=O, succinate), 164.3 (C=O, fumarate), 133.7 (OC(=O)—CH=CH—C(=O)O), 75.7 (HC≡C—CH$_2$), 69.3 (CH$_2$CH(CH$_3$)O), 66.6 (CH$_2$CH(CH$_3$)O), 52.8 (HC≡C—CH$_2$), 28.9 (OC(=O)—CH$_2$—CH$_2$—C(=O)O), 16.4 (CH$_3$). See, Table 2, above.

Example 14

Kinetic Studies of Zn/AcOH Reduction of Poly(Propylene Maleate) to Poly(Propylene Maleate-Co-Propylene Succinate) (PPMPS)

In a 20 mL scintillation vial, poly(propylene maleate) (1.00 g, 0.618 mmol, 6.18 mmol alkene) was dissolved in 2 mL of glacial acetic acid and 2 mL of either CHCl$_3$ cosolvent, toluene cosolvent, or additional glacial acetic acid was added. The appropriate amount of zinc dust was then added to the flask and the vial was sonicated. At the appropriate time points the vial was homogenized by shaking and an aliquot was removed. The aliquot was filtered to remove the zinc dust and a $^1$H NMR was taken for conversion analysis. The amount of total succinate content was determined by the integrations of the maleate peak and the succinate peak at δ=6.28 ppm and 2.66 ppm, respectively. This was compared to the amount of reduction in the M$_1$ subunit by the integration ratio of the initiator methylene unit at δ=4.78 ppm and δ=4.70 ppm. $^1$H NMR: (500 MHz, CDCl$_3$), δ (PPM): 6.34-6.24 (m, 12H OC(=O)—CH=CH—C(=O)O), 5.32-5.22 (s, br, 10H CH$_2$—CH(CH$_3$)—O), 4.78 and 4.70 (s, HC≡C—CH$_2$—O), 4.35-4.24 (m, 20H, CH$_2$CH(CH$_3$)O), 2.66 (m, 16H, OC(=O)—CH$_2$—CH$_2$—C(=O)O), 2.54 (s, 1H, HC≡C—CH$_2$—O), 1.35-1.32 (d, 30H, CH$_3$). $^{13}$C NMR: (125 MHz, CDCl$_3$), δ (PPM): 171.8 (C=O, succinate), 166.7 (C=O, maleate), 131.6 (OC(=O)—CH=CH—C(=O)O), 75.8 (HC≡C—CH$_2$), 70.1 (CH$_2$CH(CH$_3$)O), 69.1 (CH$_2$CH(CH$_3$)O), 51.1 (HC≡C—CH$_2$), 28.9 (OC(=O)—CH$_2$—CH$_2$—C(=O)O), 16.4 (CH$_3$).

Example 15

Isomerization of Poly(Propylene Maleate) to Poly(Propylene Fumarate) (PPF)

Poly(propylene maleate) (10.00 g, 6.18 mmol, 61.8 mmol alkene) was dissolved in 40 mL of CHCl$_3$. Diethylamine (0.96 mL, 9.28 mmol, 0.15 eq to alkene) was added and the mixture was refluxed overnight. After full conversion, the solution was washed twice with saturated sodium phosphate buffer (pH=6) and concentrated under reduced pressure to afford poly(propylene fumarate). $^1$H NMR: (500 MHz, CDCl$_3$), δ (PPM): 6.84-6.64 (m, OC(=O)—CH=CH—C(=O)O), 5.32-5.22 (s, br, 10H CH$_2$—CH(CH$_3$)—O), 4.78 (s, HC≡C—CH$_2$—O), 4.35-4.24 (m, 20H, CH$_2$CH(CH$_3$)O), 2.54 (s, 1H, HCCCH$_2$), 1.35-1.32 (d, 30H, CH$_3$). $^{13}$C NMR: (125 MHz, CDCl$_3$), δ (PPM): 164.3 (C=O), 133.7 (OC (=O)—CH=CH—C(=O)O), 75.7 (HC≡C—CH$_2$), 69.3 (CH$_2$CH(CH$_3$)O), 66.6 (CH$_2$CH(CH$_3$)O), 52.8 (HC≡C—CH$_2$), 16.4 (CH$_3$).

Example 16

UV-Visible Spectroscopy Characterization of PPF and PPFPS Derivatives

PPF and PPFPS as synthesized by the three-monomer feed method, or the reduction method were dissolved at 100 mg/mL in CHCl3. Serial dilutions were made at 80 mg/mL, 60 mg/mL, 40 mg/mL, 20 mg/mL, and 10 mg/mL. To a 96-well quartz plate was added 300 µL of each solution for a single polymer in triplicate. Each polymer was analyzed separately to minimize evaporation effects. The UV-vis spectra were recorded in 10 nm intervals from 300 nm to 500 nm. To account for path length, 300 µL of deionized water was placed in each well used and the absorbance at 977 nm and 900 nm recorded. The difference between the two absorbance values was divided by 18 to calculate the true path length. The absorbance of each polymer solution at 400 nm was averaged and divided by the effective path length. The molar extinction coefficient was determined by plotting absorbance at 400 nm against concentration and calculating the slope of the line. To determine the path length an identical volume of water was added to the well plate and the absorbance at 977 nm and 900 nm were measured and divided by 0.18 (Eq. 1), allowing for calculation of the true molar extinction coefficient (ε). The results are reported in Table 6, above. See, FIG. 28.

$$l = \frac{A_{977} - A_{900}}{0.18} \quad \text{Eq. 1}$$

96-well plate path length correction

Example 17

Rheological Measurements

PPF and PPFPS resin formulations were prepared by dissolving the polymer in the required amount of diethyl fumarate. The sample was loaded onto a 25 mm parallel plate and equilibrated to 25° C. A frequency sweep was conducted over 0.1 to 100 rad/s, and extrapolation of the complex viscosity to zero angular frequency was used to determine the zero-shear viscosity of each PPF or PPFPS system. The results are reported in Table 3 above. See, FIGS. 29A-C, 30.

Example 18

Differential Scanning Calorimetry

Differential scanning calorimetry (DSC) measurements were performed on a TA instruments Discover 250 differential scanning calorimeter under nitrogen. To erase thermal history, samples were cooled from room temperature to −60° C. followed by heating to 70° C. at a ramp rate of 10° C./min. After a 3 min isotherm, samples were cooled to −60° C. and subsequently heated to 70° C. at 10° C./min. The glass transition temperature (T$_g$) was determined as the endotherm midpoint of the second heating cycle. The results are reported in Table 1, above. See FIG. 31.

Example 19

3D-Printing of PPF and PPFPS Tensile Bars and Discs

PPF and PPFPS derivatives were dissolved at the respective DEF mass fractions. Then, 3 wt. % of phenylbis(2,4,6-trimethylbenzoyl)phosphine oxide (BAPO), 0.7 wt. % of oxybenzone (OB), and 0.4 wt. % of Irgacure-784 were added. When fully dissolved, the dosage to cure (Dc) and photoinitiator absorptivity (αPI) parameters were determined by cure testing according to previously reported methodologies. (See, Tumbleston, J. R., et al., Continuous liquid interface production of 3D objects. *Science* 2015, 347 (6228), 1349, the disclosure of which is incorporated herein by reference in its entirety. Finally, the resin was used to print tensile bars according to ASTM D638 type V and discs 2 mm in height and 10 mm in diameter.

Excess resin was blotted off using a Kimwipe, and the printed objects were washed in isopropyl alcohol for 20 seconds. The objects were then submerged in DIH$_2$O and post-cured for 5 minutes in a B9 Model Cure UV-oven (B9Creations) followed by drying in a vacuum oven at 40° C. for 48 h.

Example 20

Mechanical Testing

Tensile tests were conducted on an Instron Model 5800 Series equipped with a 10 kN load cell at a rate of 5 mm/min. The bars (n=6) were marked with a paint pen at the approximate gauge length of 7.62 mm. The samples were then clamped in a 5800 series Instron (Instron, Norwood, MA) and a video extensometer was used to calculate the true gauge length and monitor strain %. Samples were then pulled at a rate of 5 mm/min until break. The modulus was calculated over the 1-3% strain regime as all tensile curves were linear in this range. Mechanical values reported were the average and standard deviation of all tensile bars which failed between the gauge markers. Statistical analysis was performed using a one-way ANOVA with post-hoc Tukey HSD test. The results are reported in Table 4 above. See also, FIGS. 33A-C, 24A-B.

Example 21

Swelling Measurements

Swelling ratios of the 3D-printed discs were measured accord to previous reports. See, Fisher, J. P.; Dean, D.; Mikos, A. G., Photocrosslinking characteristics and mechanical properties of diethyl fumarate/poly(propylene fumarate) biomaterials. *Biomaterials* 2002, 23 (22), 4333-4343 and Shin, Y.; Becker, M. L., Alternating ring-opening copolymerization of epoxides with saturated and unsaturated cyclic anhydrides: reduced viscosity poly(propylene fumarate) oligomers for use in cDLP 3D printing. *Polym. Chem.* 2020, 11 (19), 3313-3321, the disclosure of which are incorporated herein by reference in their entirety.) Briefly, the discs were placed in a 20 mL scintillation vial and submerged in toluene. After 24 hours excess toluene was removed by blotting with a Kimwipe and the swollen weight (ws) was measured. The samples were then dried until a constant weight was achieved (typically 72 hours) the dried weight (wd) was measured. The swelling ratio was calculated by:

$$\text{Swelling Ratio (\%)} = \left(\frac{w_s - w_d}{w_s}\right) * 100 \qquad \text{Eq. 2}$$

Swelling ratio calculation

Example 22

The Average Molecular Weight Between Crosslinking ($M_c$) Calculations $M_c$ were calculated accord to previous reports. (See, Peppas, N. A.; Merrill, E. W., Crosslinked Polyvinyl-Alcohol) Hydrogels as Swollen Elastic Networks. *J Appl Polym Sci* 1977, 21 (7), 1763-1770, the disclosure of which is incorporated herein by reference in its entirety). φ is the volume fraction of the polymer in swollen state. $V_1$ (molar volume of solvent) is 106 cm³/mole for toluene. υ (specific volume of bulk polymer) measured from 50 wt. % polymer resin in DEF (1.13) is used for all calculation. $M_n$ (the number average molecular weight of primary chains) was obtained by MALS SEC. χ (Flory polymer-solvent interaction parameter) is estimated as 0.35.

$$\frac{1}{M_c} = \frac{2}{M_n} - \frac{\frac{\upsilon}{V_1}[\ln(1-\varphi) + \varphi + \chi\varphi^2]}{\varphi^{1/3} - \frac{\varphi}{2}} \qquad \text{Eq. 3}$$

$M_c$ calculation

The results are reported in Table 5, above.

Considering the foregoing, it should be appreciated that the present invention significantly advances the art by providing a PPFS copolymer that is structurally and functionally improved in several ways. While particular embodiments of the invention have been disclosed in detail herein, it should be appreciated that the invention is not limited thereto or thereby, inasmuch as variations on the invention herein will be readily appreciated by those of ordinary skill in the art. The scope of the invention shall be appreciated from the claims that follow.

What is claimed is:

1. A method for making poly(propylene fumarate-co-succinate) polymer comprising the time-dependent partial reduction of poly(propylene maleate) double bonds by sonication mediated by zinc and acetic acid to form a poly(propylene maleate-co-succinate) intermediate, followed by isomerization of the poly(propylene maleate-co-succinate) intermediate using an organic base to produce the poly(propylene fumarate-co-succinate) polymer.

2. The method for producing a poly(propylene fumarate-co-succinate) polymer of claim 1 comprising:
   A) obtaining or synthesizing poly(propylene maleate) and. dissolving it in acetic acid or a solvent combination comprising acetic acid;
   B) adding zinc to the poly(propylene maleate) solution;
   C) sonicating the combination of step B to reduce at least some of the maleate groups in the poly(propylene maleate) to succinate groups to form a poly(propylene maleate-co-succinate) intermediate; and
   D) dissolving the poly(propylene maleate-co-succinate) intermediate in a solvent and isomerizing it with the organic base wherein said organic base is selected from the group consisting of diethylamine, trimethylamine, pyridine, and combinations thereof, to produce a poly(propylene fumarate-co-succinate) polymer.

3. The method of claim 2 wherein the acetic acid is glacial acetic acid.

4. The method of claim 2 wherein the solvent combination comprising acetic acid in step A comprises glacial acetic acid and a solvent selected from the group consisting of dichloromethane, chloroform, toluene, and combinations thereof.

5. The method of claim 2 wherein. the solvent combination comprising acetic acid in step A is a co--solvent solution of glacial acetic acid and toluene.

6. The method of claim 2 wherein the solvent combination comprising acetic acid in step A is a co-solvent solution of glacial acetic acid and one of dichloromethane, chloroform, or both dichloromethane and chloroform.

7. The method of claim 2 wherein the step of combining (step B) comprises adding an amount of zinc that is from about 0.5 to about 5.0 equivalents relative to the alkene bonds in the poly(propylene maleate) polymer.

8. The method of claim 2 wherein the step of adding zinc (step B) comprises adding an amount of zinc that is from about 0.5 to about 3.0 equivalents relative to the alkene bonds in the poly(propylene maleate) polymer.

9. The method of claim 2 wherein the step of sonication comprises sonicating the combination of step C for from about 1 to about 60 minutes.

10. The method of claim 2 wherein the step of sonication comprises sonicating the combination of step C until a desired mole percent of succinate groups is present in the poly(propylene maleate-co-succinate) polymer produced.

11. The method of claim 2 wherein the solvent in the step of dissolving (step D) is an organic solvent.

12. The method of claim 2 wherein the solvent in the step of dissolving (step D) is selected from the group consisting of chloroform, dichloromethane and combinations thereof.

* * * * *